(12) United States Patent
Wu et al.

(10) Patent No.: US 12,439,000 B1
(45) Date of Patent: Oct. 7, 2025

(54) UNIVERSAL DOCKING STATION WITH HIGH-SPEED DATA TRANSMISSION AND HIGH RESOLUTION

(71) Applicant: JIANGXI KINGTRON TECHNOLOGY CO., LTD., Ganzhou (CN)

(72) Inventors: Zhibo Wu, Xiangyang (CN); Xiurong Liang, Xiangyang (CN)

(73) Assignee: JIANGXI KINGTRON TECHNOLOGY CO., LTD., Ganzhou (CN)

( * ) Notice: Subject to any disclaimer, the term of this patent is extended or adjusted under 35 U.S.C. 154(b) by 0 days.

(21) Appl. No.: 18/981,648

(22) Filed: Dec. 16, 2024

(30) Foreign Application Priority Data

Jan. 30, 2024 (CN) .......................... 202410129659.0

(51) Int. Cl.
*H04N 7/01* (2006.01)
*G06F 13/38* (2006.01)
*G06F 13/42* (2006.01)

(52) U.S. Cl.
CPC .......... *H04N 7/0125* (2013.01); *G06F 13/382* (2013.01); *G06F 13/4282* (2013.01); *G06F 2213/0042* (2013.01)

(58) Field of Classification Search
CPC ...... H04N 7/01; H04N 7/0125; G06F 13/382; G06F 13/4282; G06F 2213/0042
USPC ...................................................... 348/441
See application file for complete search history.

(56) References Cited

U.S. PATENT DOCUMENTS

| | | | | |
|---|---|---|---|---|
| 8,909,820 | B2* | 12/2014 | Lai | G06F 13/385 |
| | | | | 710/16 |
| 9,852,097 | B2* | 12/2017 | Steele | G06F 13/4022 |
| 10,127,181 | B2* | 11/2018 | Ghosh | H02J 7/00 |
| 10,663,542 | B2* | 5/2020 | Mori | G01R 33/385 |
| 10,749,714 | B2* | 8/2020 | Iyer | H04L 25/061 |
| 12,237,851 | B2* | 2/2025 | Chang | H04B 1/0078 |
| 12,347,655 | B2* | 7/2025 | Kim | H01J 37/32651 |
| 2011/0093623 | A1* | 4/2011 | Chen | G06F 1/1632 |
| | | | | 710/14 |
| 2022/0269630 | A1* | 8/2022 | Lee | G06F 3/1423 |
| 2024/0028458 | A1* | 1/2024 | Gautam | G06F 11/1466 |

* cited by examiner

*Primary Examiner* — Trang U Tran
(74) *Attorney, Agent, or Firm* — Li & Cai Intellectual Property Office

(57) ABSTRACT

A universal docking station with high-speed data transmission and high resolution is provided, including two parallel PCB circuit boards each connected to a TB4 upstream port, a TB4 downstream port, an HDMI port, a USBA 10 G port, and a USBC 10 G port. Each main control circuit is provided with a Thunderbolt 4 controller. A computer can be connected through the TB4 upstream port. The TB4 upstream port is connected to the TB4 downstream port through the main control circuit and PD control circuit. Through the TB4 downstream facing port, input and output video signals and data signals converted by the main control circuit and PD control circuit can be transmitted. Through the main control circuit and video conversion circuit connected to the HDMI port, video signals can be transmitted, and data information can be transmitted through the USBA 10 G port.

10 Claims, 64 Drawing Sheets

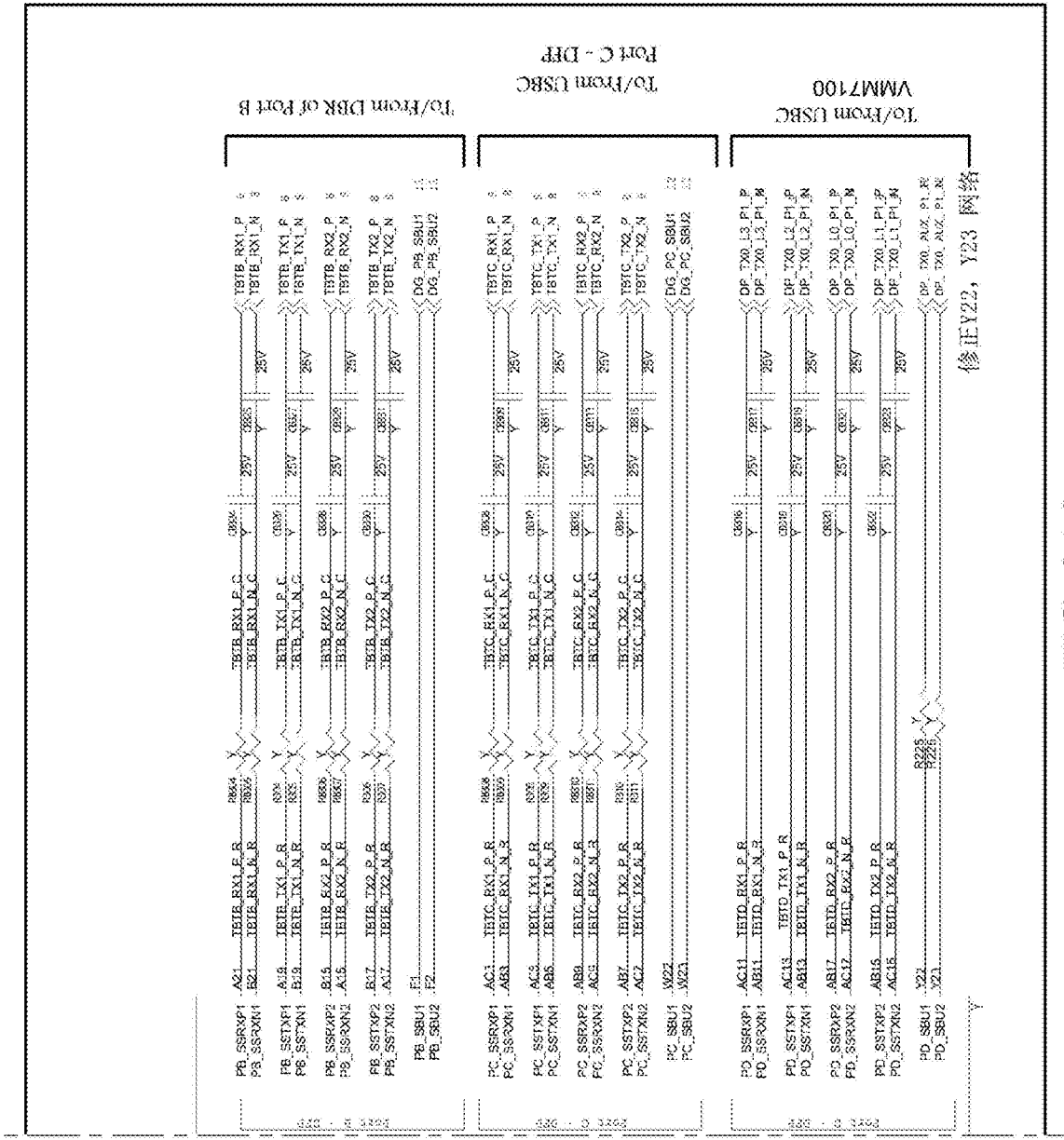
FIG. 2A2

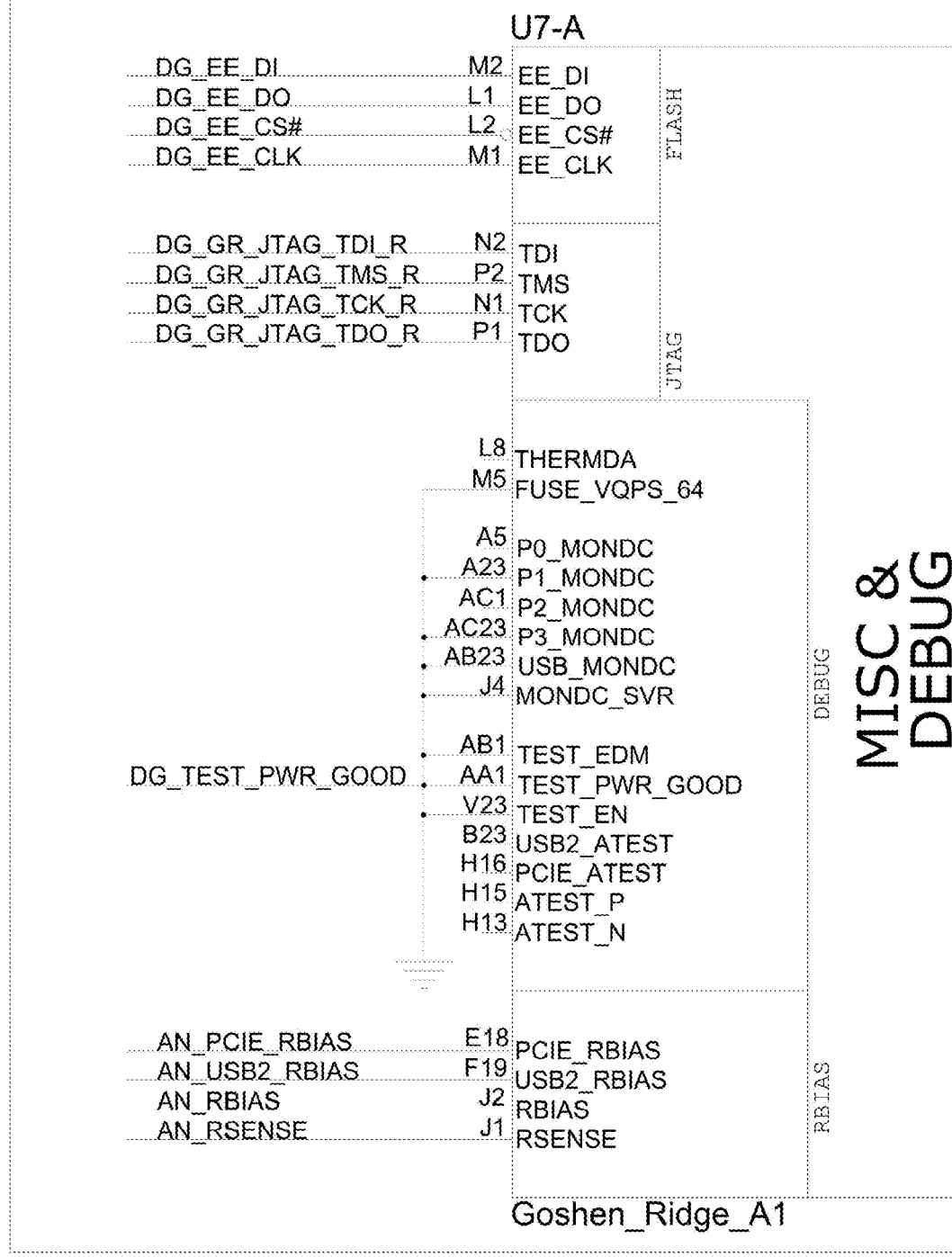
FIG. 2B1

| | | |
|---|---|---|
| LC GPIO | | |
| GPIO_0/PB_VBUS_EN | R1 | DG_PB_VBUS_EN |
| GPIO_1/PC_VBUS_EN | R2 | DG_PC_VBUS_EN |
| GPIO_2/PD_VBUS_EN | T1 | DG_PD_VBUS_EN |
| GPIO_3/TMU_CLKIN | T2 | DG_TMU_CLKIN |
| GPIO_4/PM_S0_EN | U1 | DG_PM_S0_EN |
| GPIO_5/PERST# | U2 | DG_PERST# |
| GPIO_6/PE_VBUS_EN | V1 | DG_PE_VBUS_EN |
| GPIO_7/SMB_ALERT# | V2 | |
| GPIO_8/TMU_CLKOUT | W1 | DG_TMU_CLKOUT |
| GPIO_9 | W2 | DG_GR_MSTR_SLV |
| GPIO_10 | Y1 | |
| POC GPIO | | |
| POC_GPIO_0/I2C_SCL | M23 | DG_I2C_SCL |
| POC_GPIO_1/I2C_SDA | M22 | DG_I2C_SDA |
| POC_GPIO_2/PA_VBUS_EN | N23 | DG_PA_VBUS_EN |
| POC_GPIO_3/FORCE_PWR | N22 | DG_GR_FORCE_PWR |
| POC_GPIO_4/PEWAKE# | P23 | DG_PEWAKE# |
| POC_GPIO_5/PM_S3_EN | P22 | DG_PM_S3_EN |
| POC_GPIO_6/PA_I2C_INT# | R23 | |
| POC_GPIO_7/PB_I2C_INT#/OVRCRNT# | R22 | |
| POC_GPIO_8/SMBUS_SCL | T23 | |
| POC_GPIO_9/SMBUS_SDA | T22 | |
| POC_GPIO_10/PE_OVRCRNT# | U23 | DG_PE_OVRCRNT# |
| POC_GPIO_11 | U22 | |
| POC_GPIO_12/PC_I2C_INT#/HPD/OVRCRNT# | M20 | DG_PC_I2CINT# |
| POC_GPIO_13/USB2_MXCTL | N20 | DG_USB2_MXCTL |
| POC_GPIO_14/PD_I2C_INT#/HPD/OVRCRNT# | R20 | DG_PD_I2CINT# |
| POC_GPIO_15/FLASH_BUSY# | T20 | DG_FLASH_BUSY# |
| Main | | |
| RESET# | E5 | DG_GR_RST# |
| XTAL_25_IN | D23 | AN_XTAL_25M_XI |
| XTAL_25_OUT | C23 | AN_XTAL_25M_XO |

FIG. 2B2

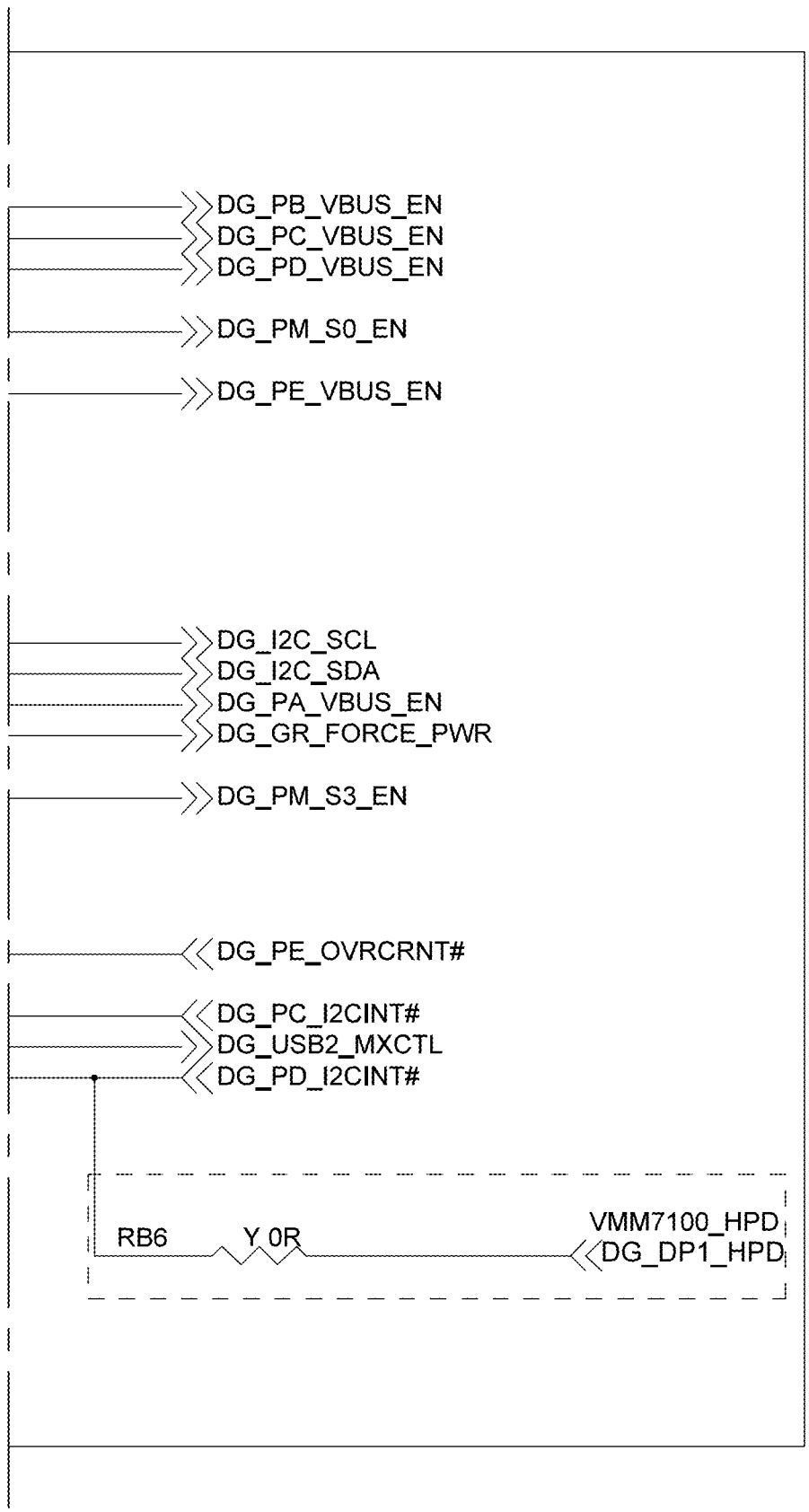
FIG. 2B3

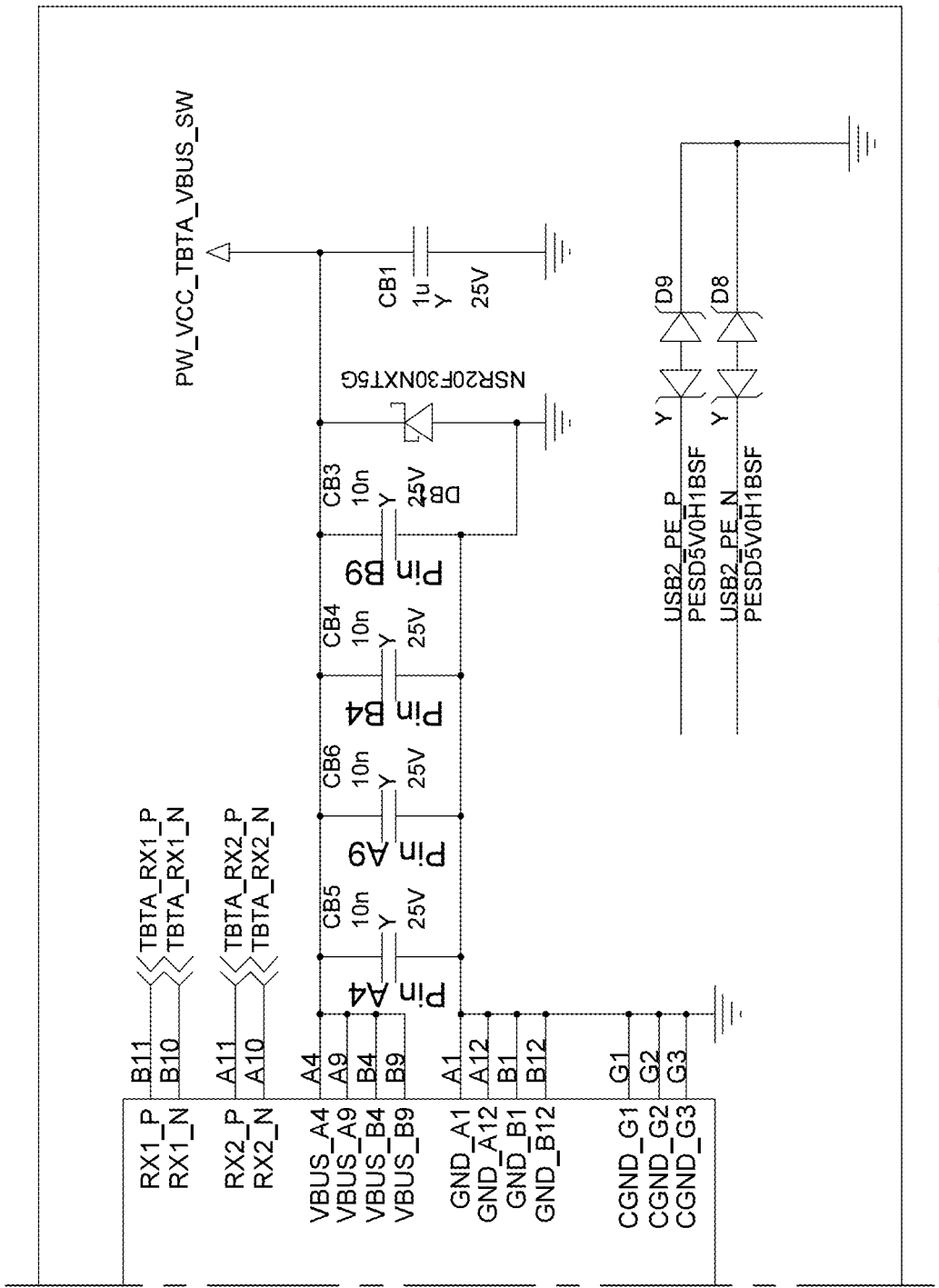
FIG. 3A2

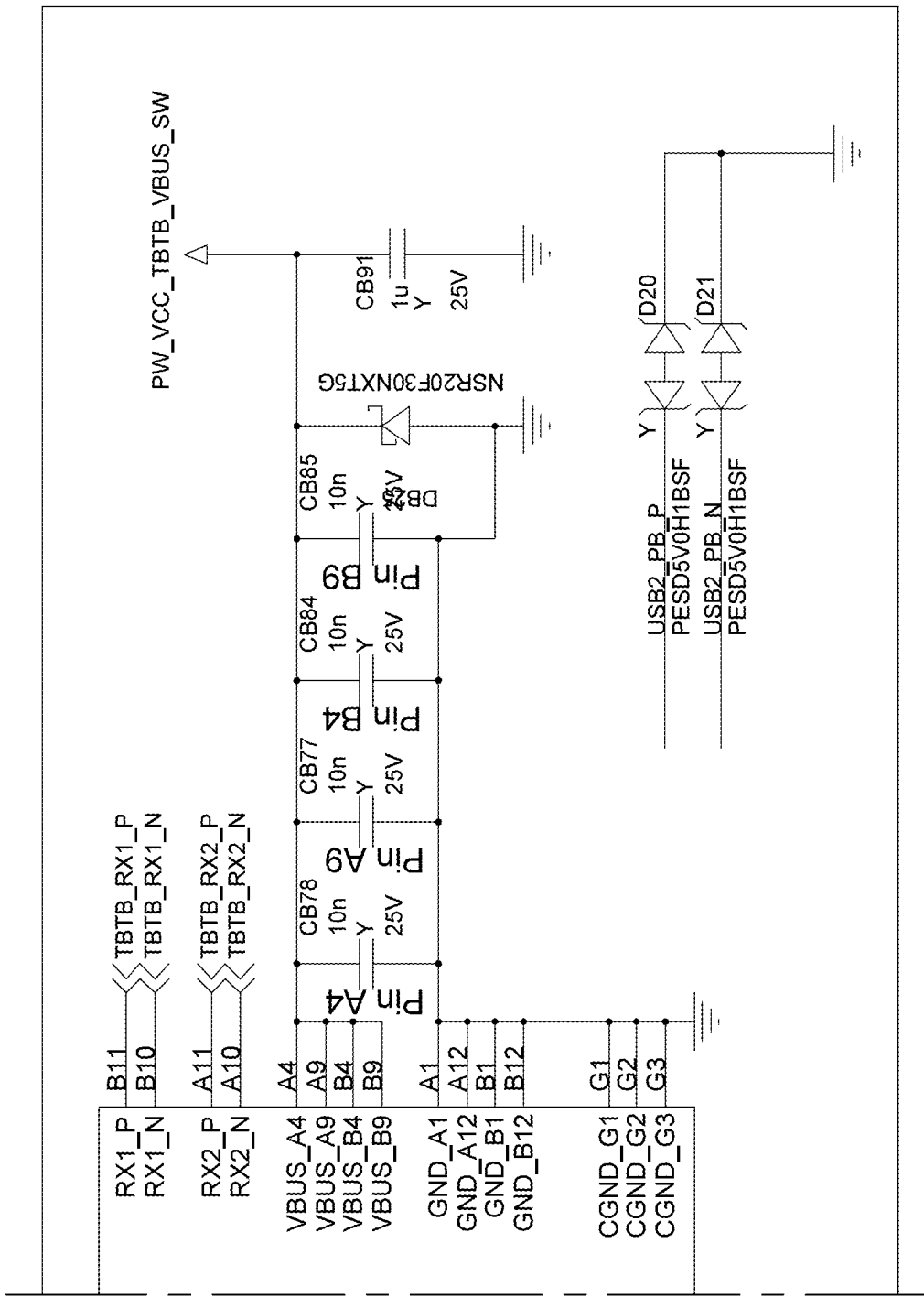
FIG. 3B2

FIG. 5A1 FIG. 5A2    FIG. 5A1

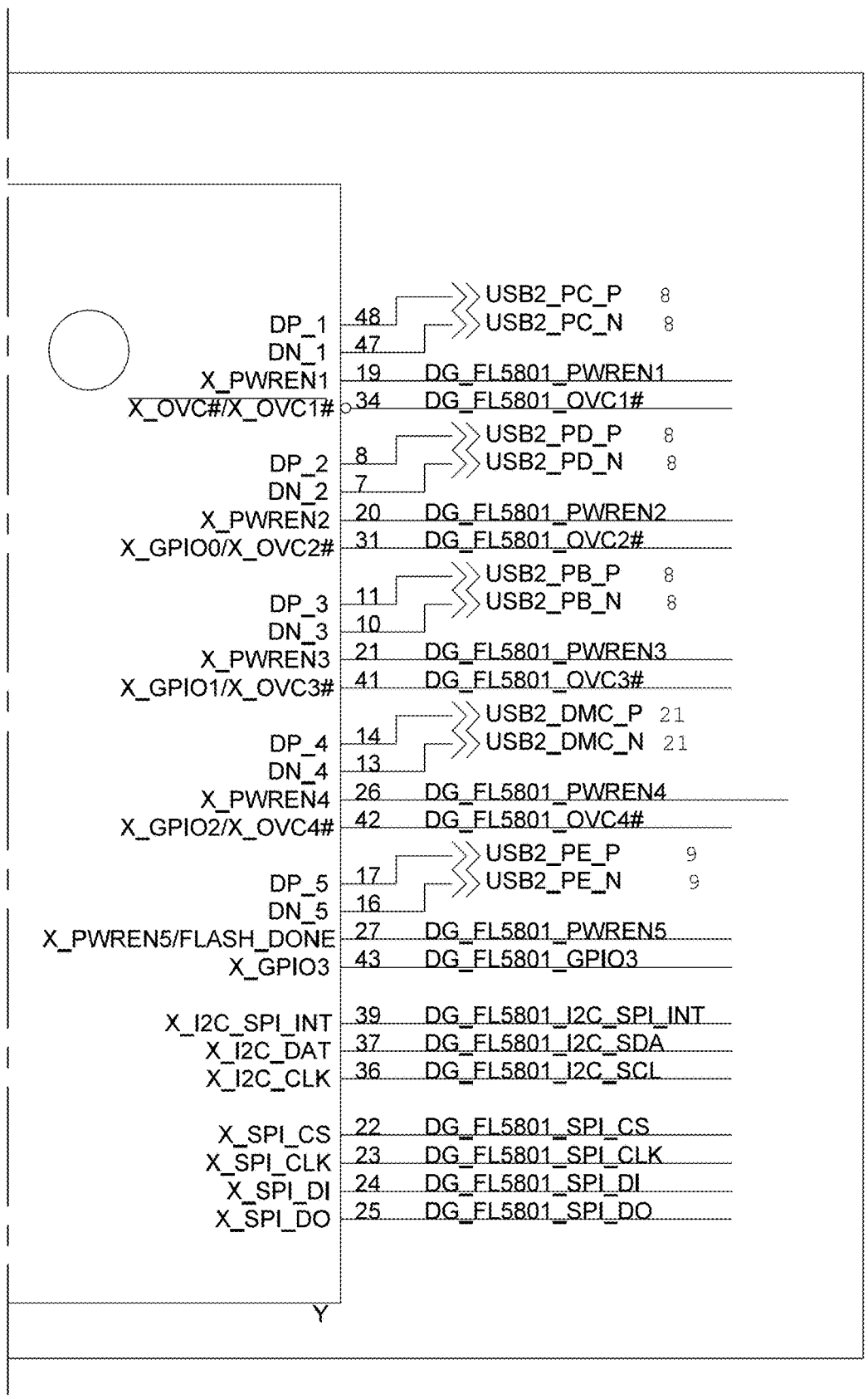
FIG. 5A2

USBC Source Path for PA, PB, PC & PD

PA Source Path

| FIG. 8B1 | FIG. 8B2 | FIG. 8B3 |

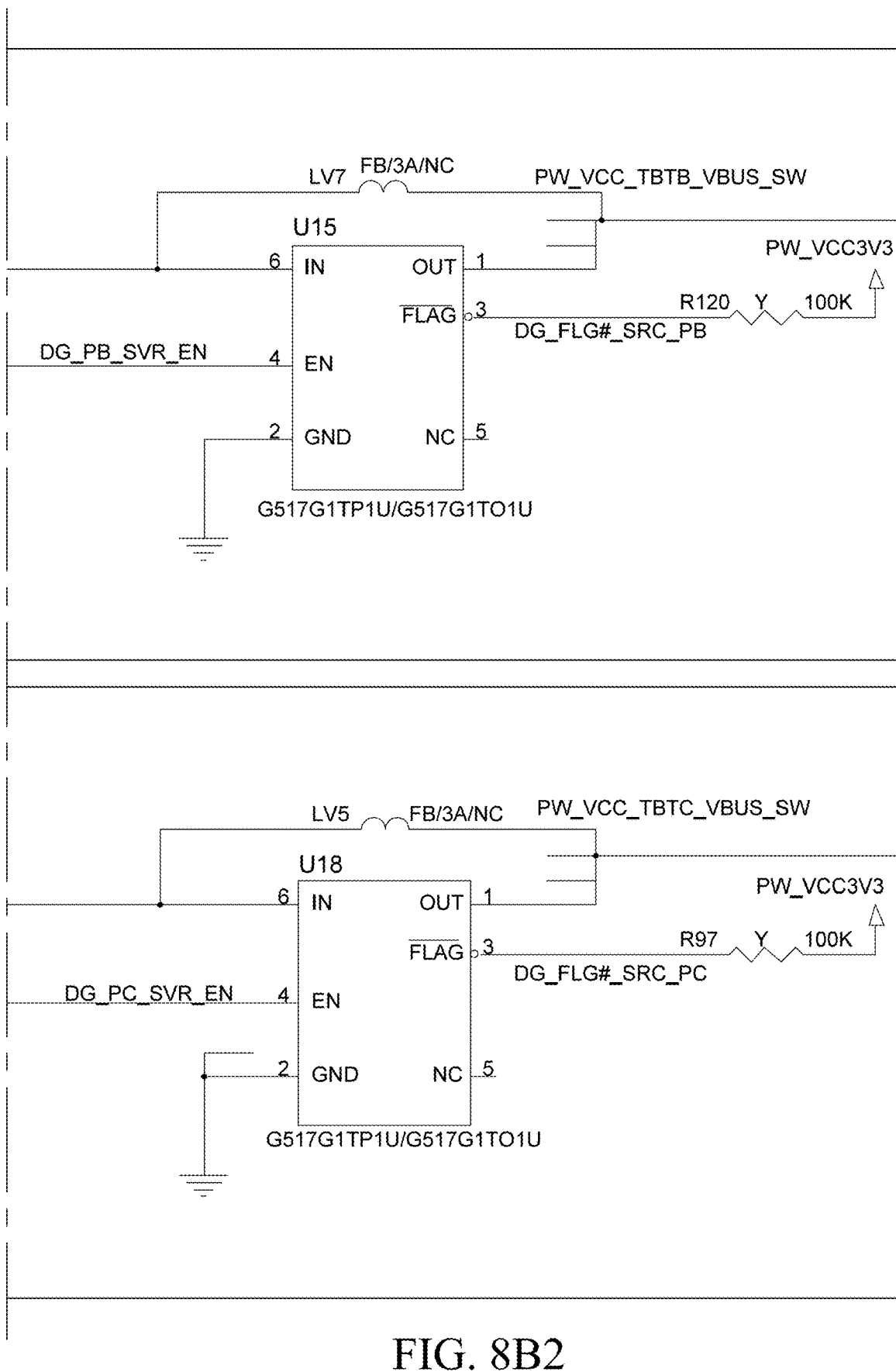
FIG. 8B2

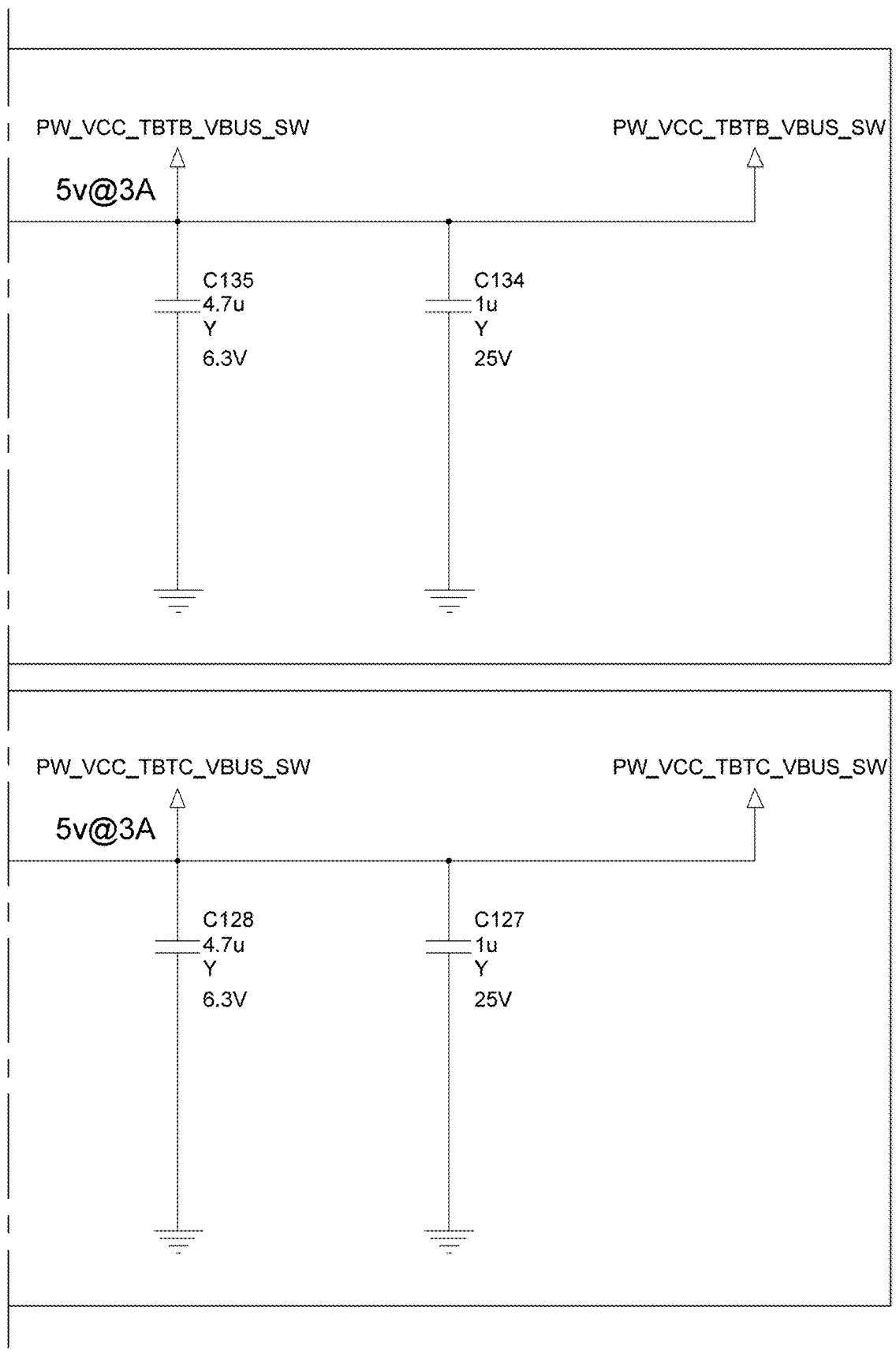
FIG. 8B3

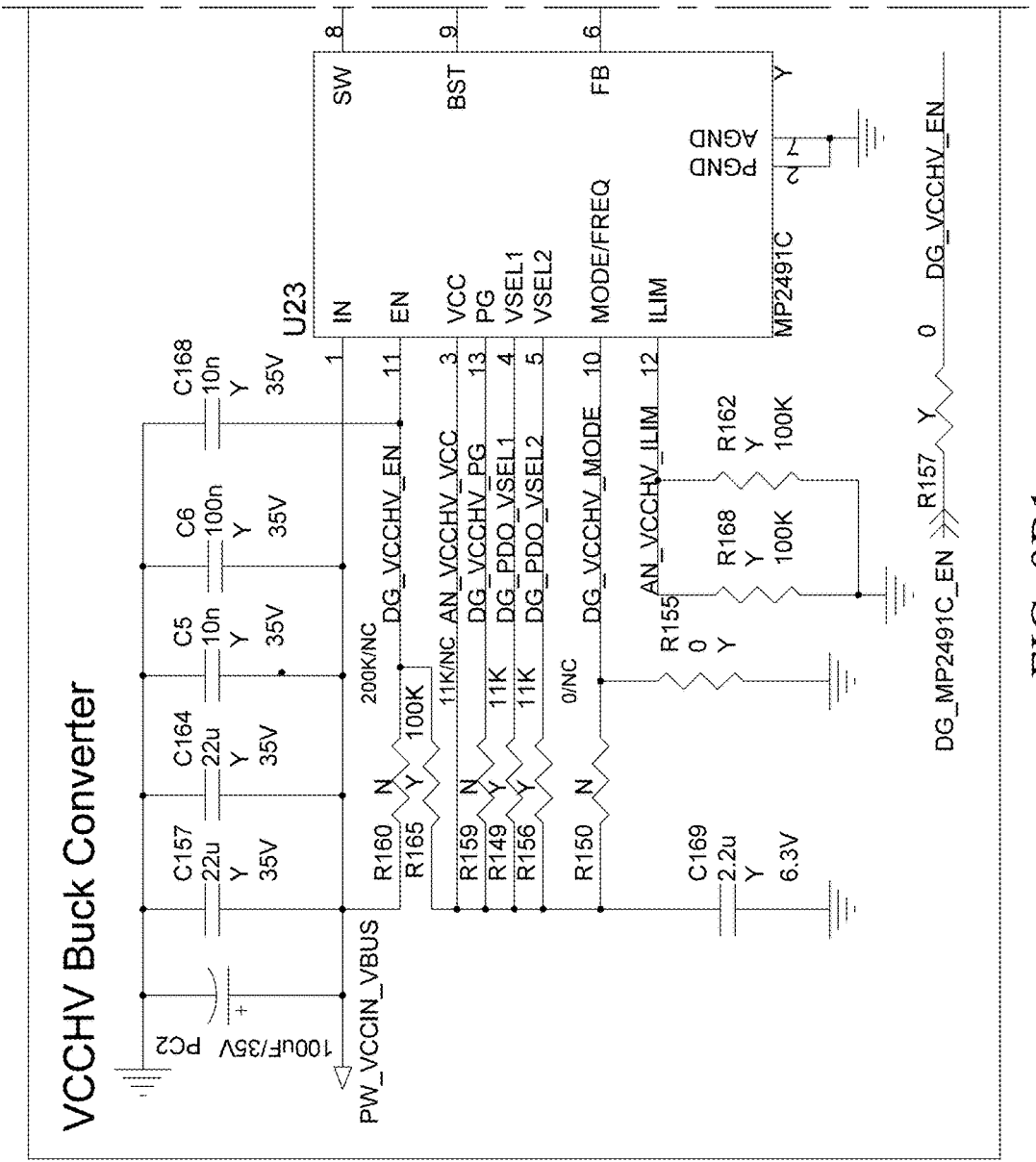

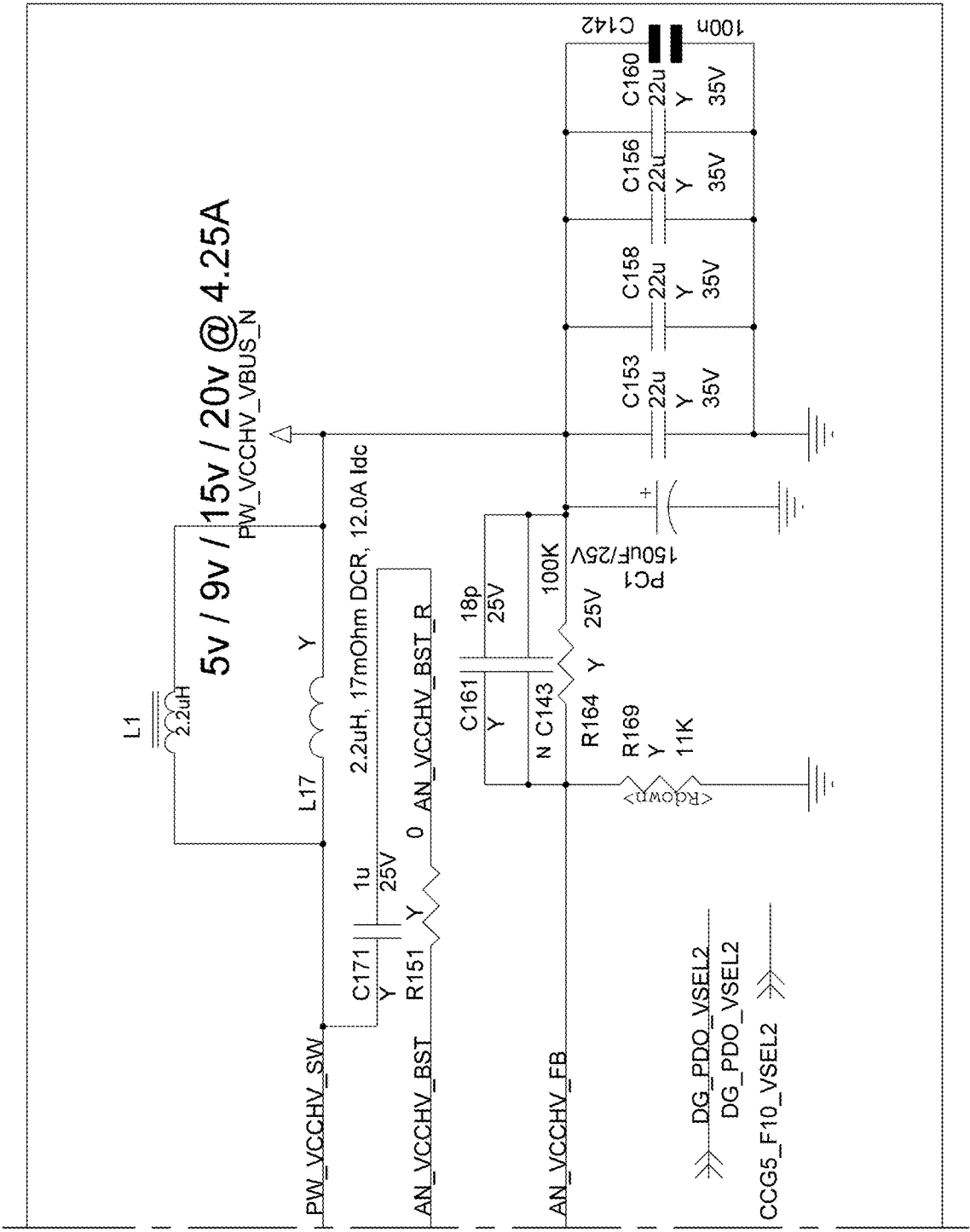
FIG. 9B2

FIG. 10A1

| FIG. 10A1 | FIG. 10A2 |

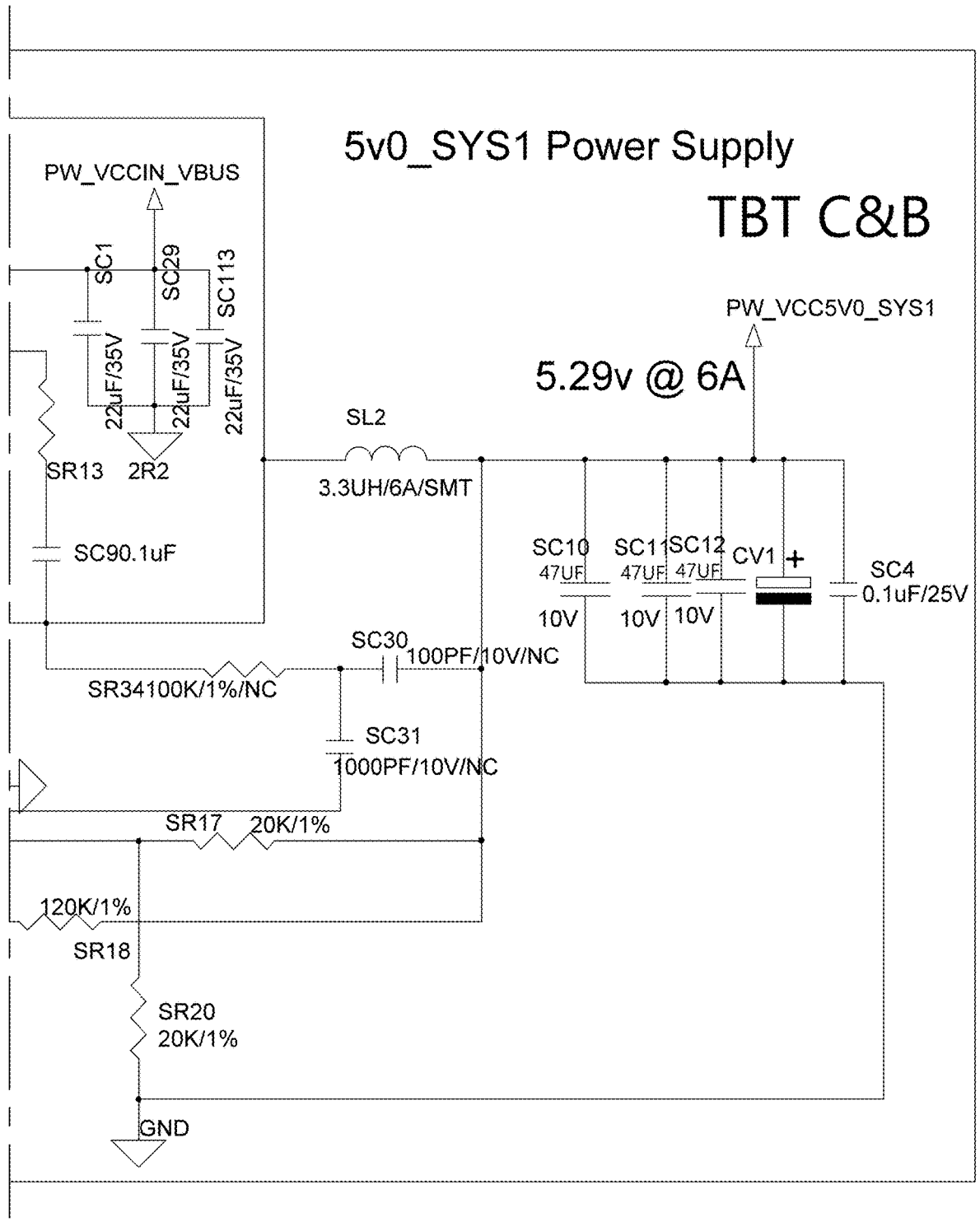
FIG. 10A2

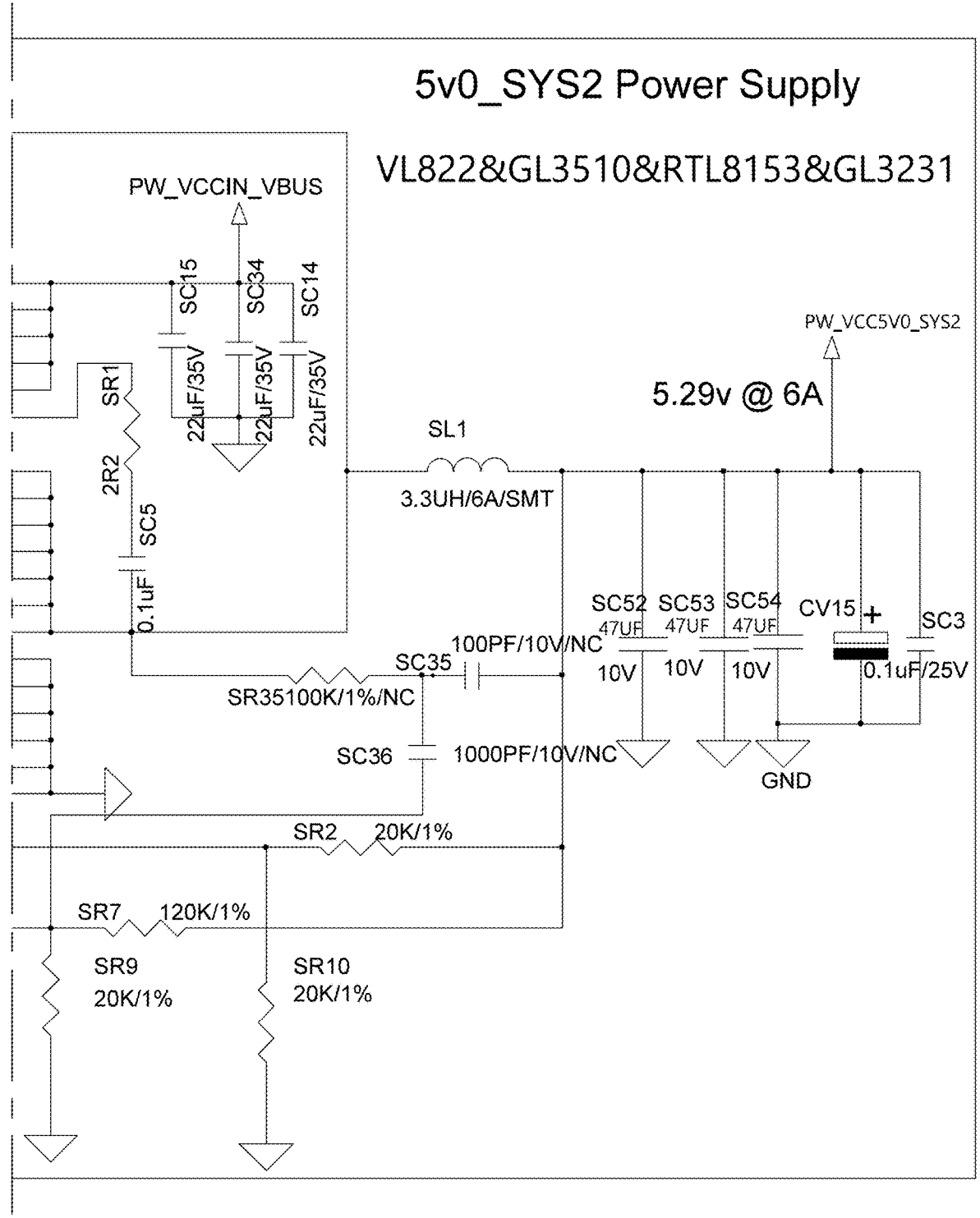
FIG. 10B2

FIG. 11A1

| FIG. 11A1 | FIG. 11A2 | FIG. 11A3 |

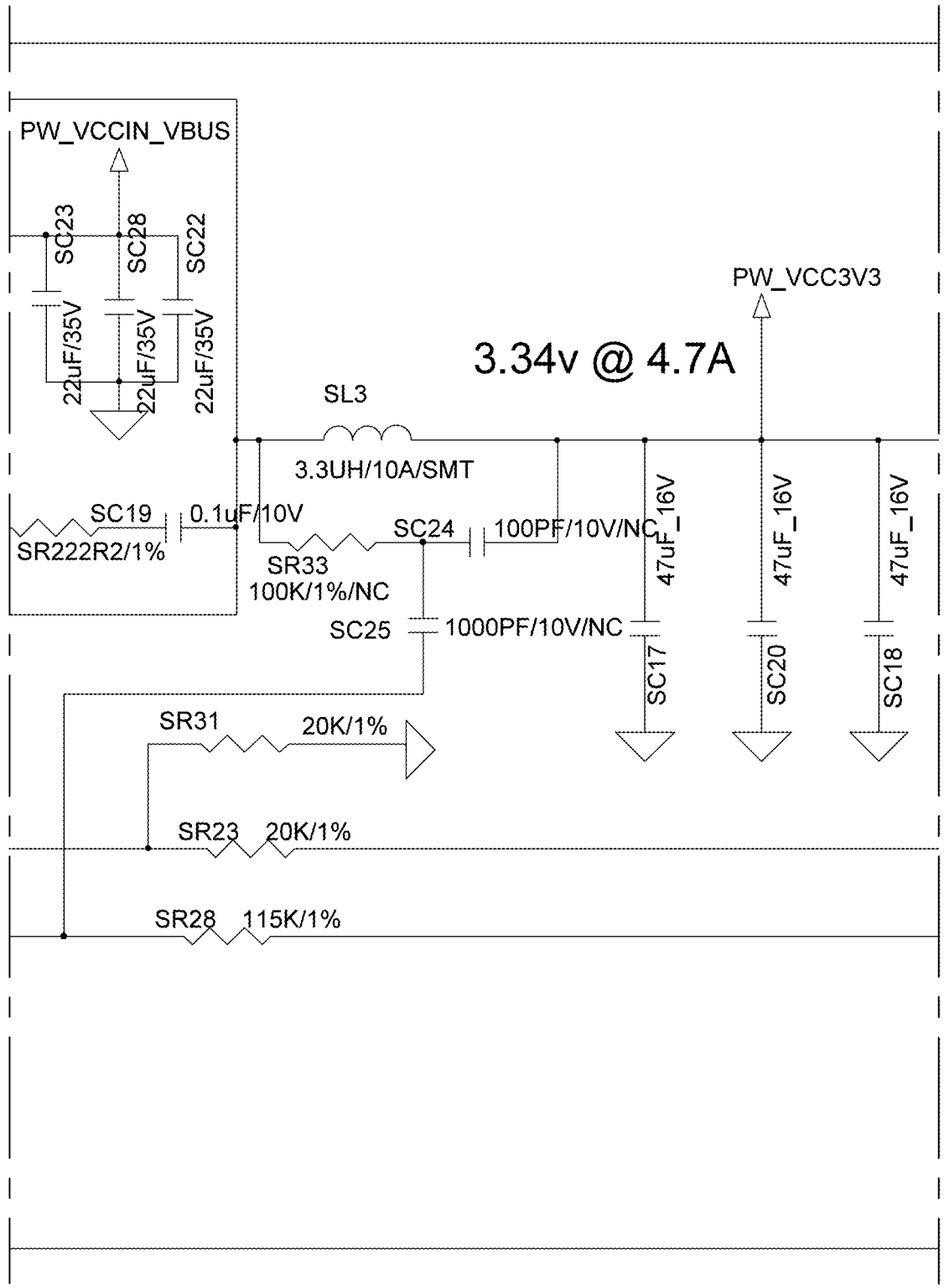
FIG. 11A2

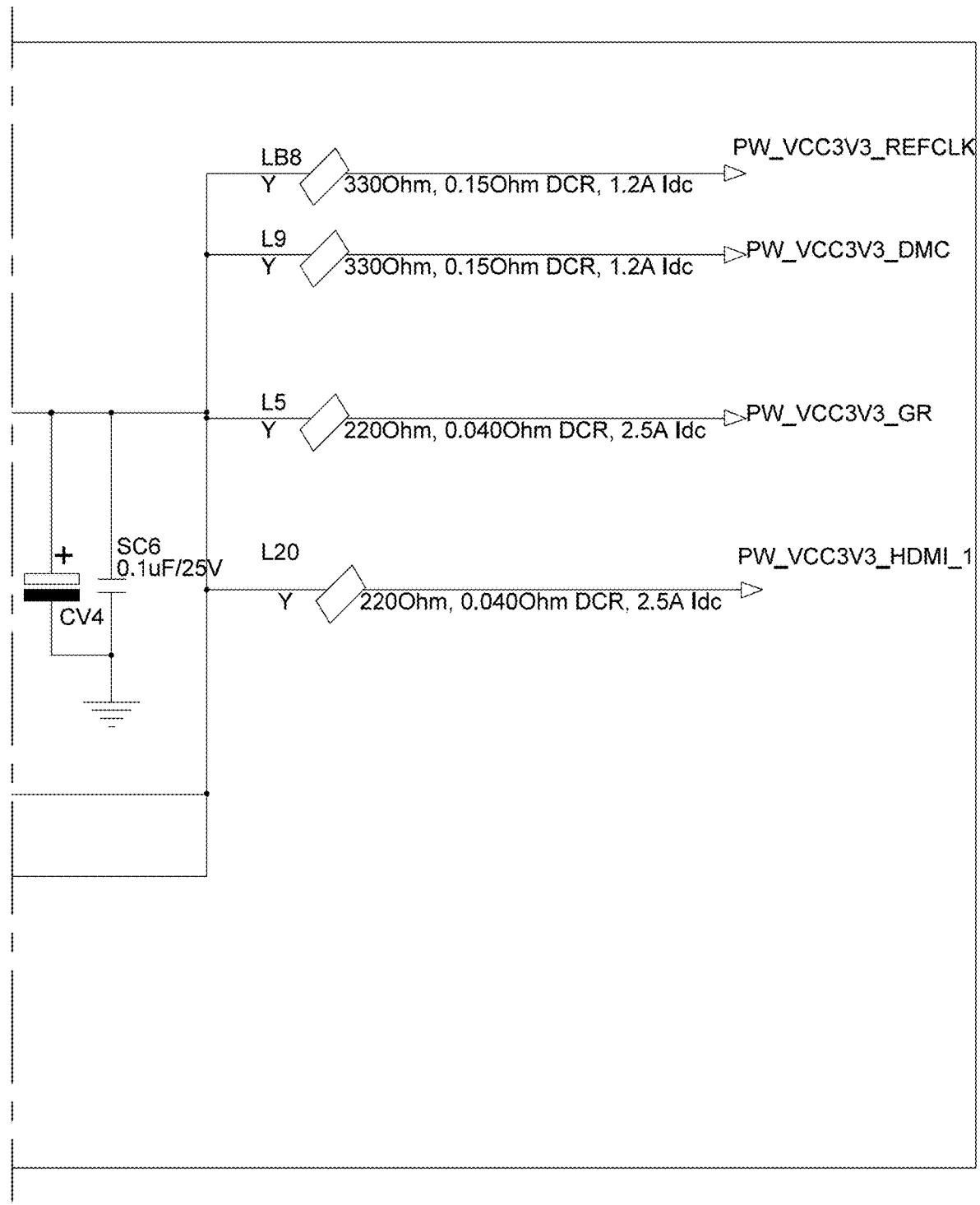
FIG. 11A3

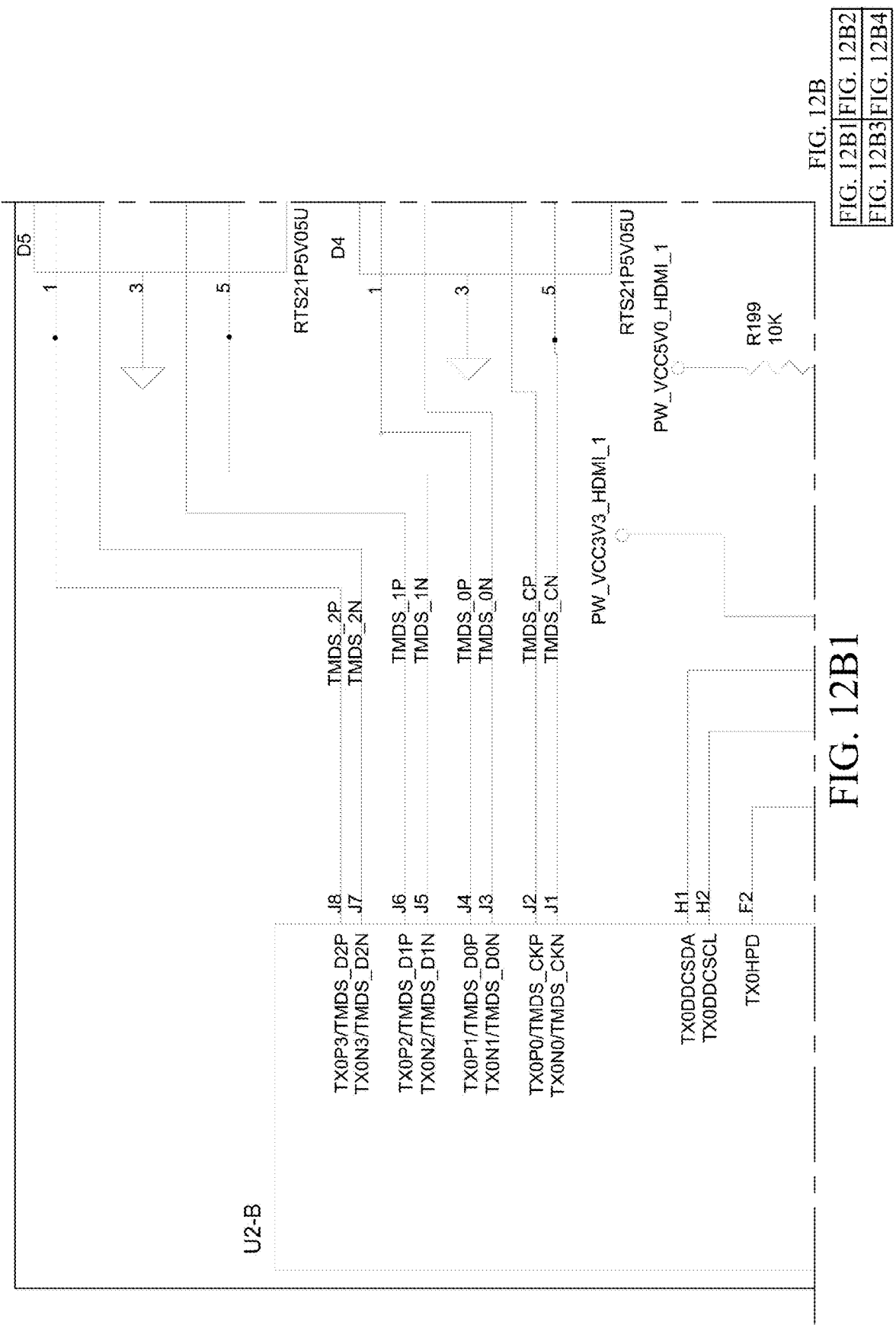
FIG. 12B1

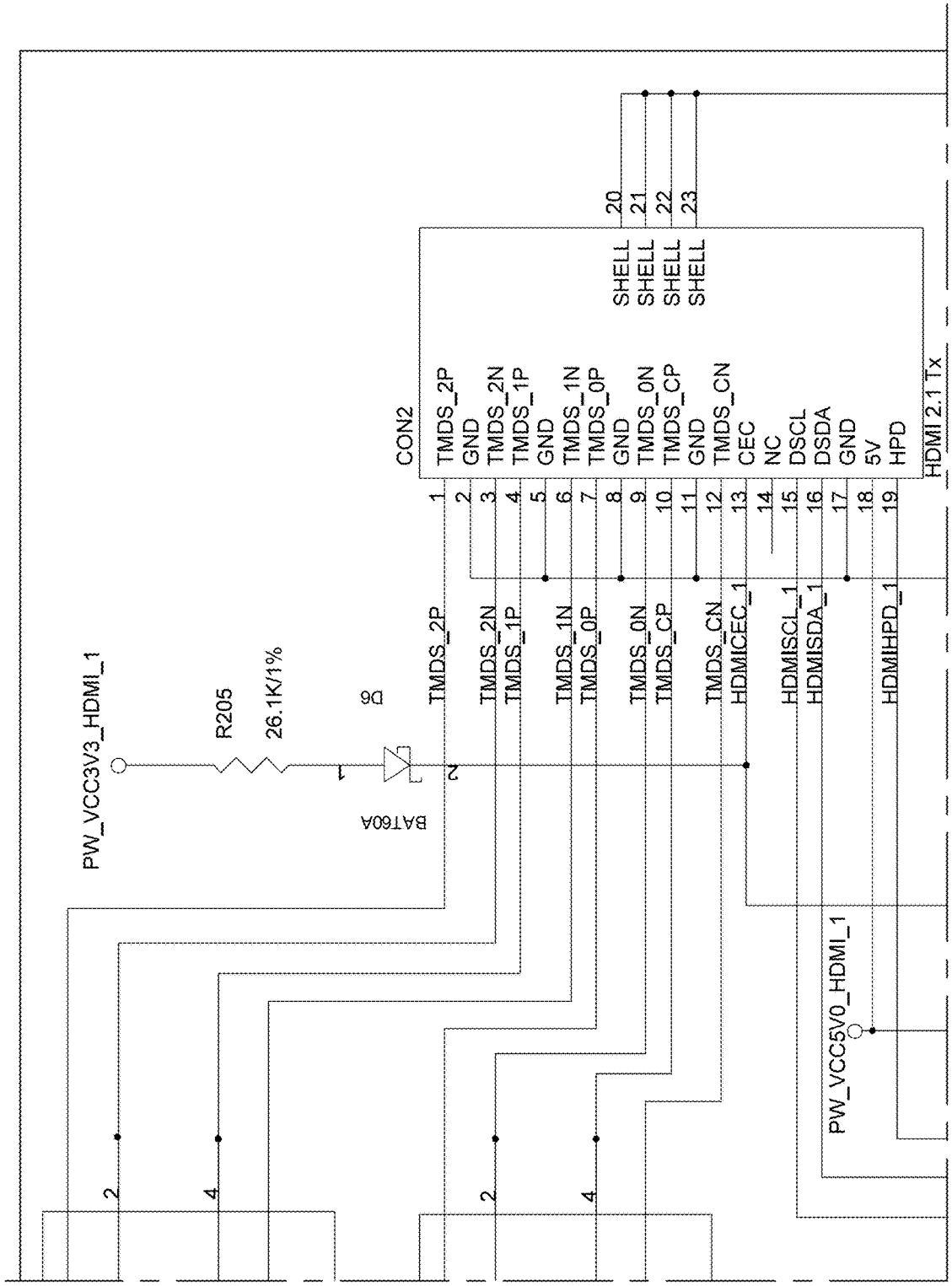
FIG. 12B2

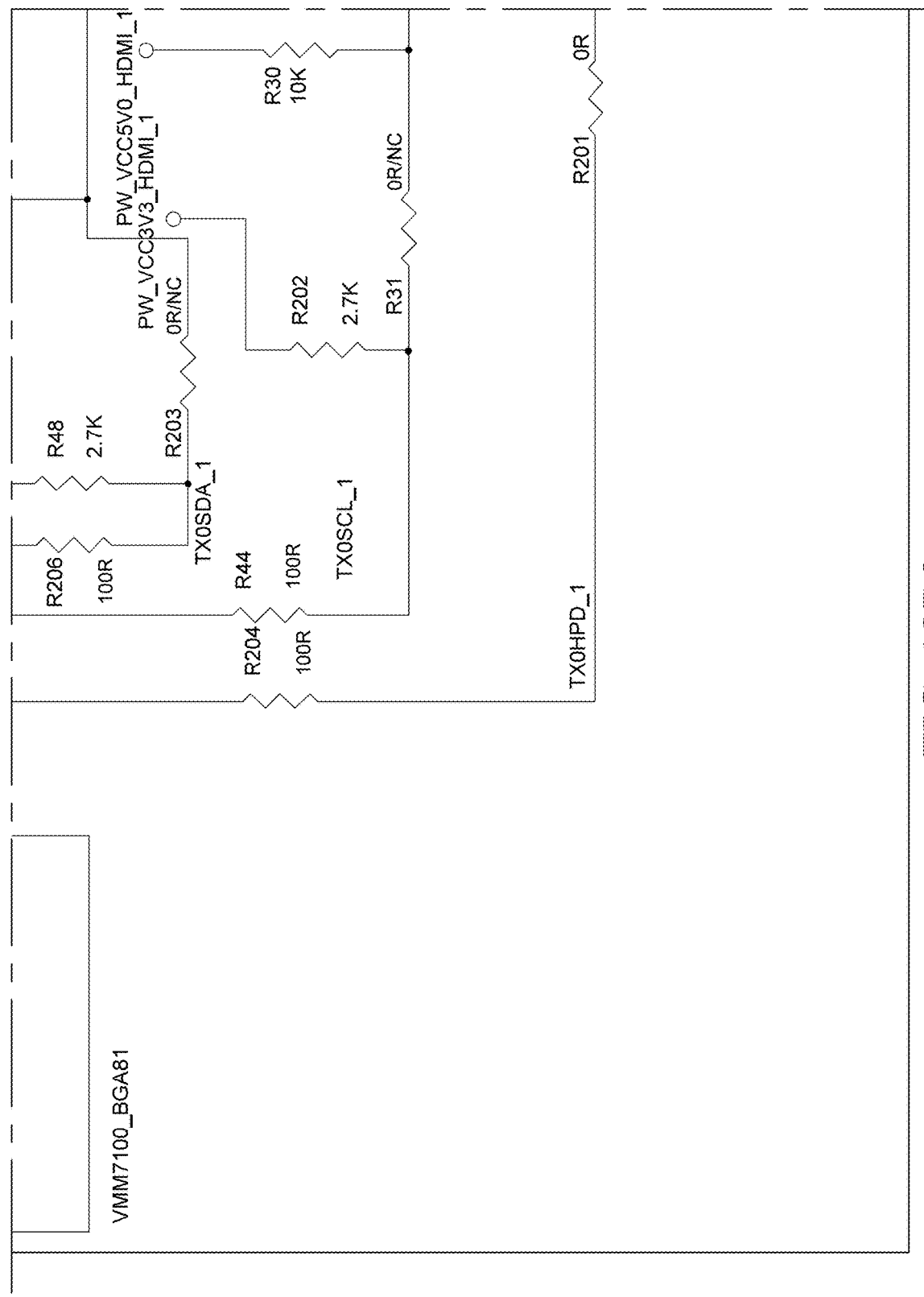
FIG. 12B3

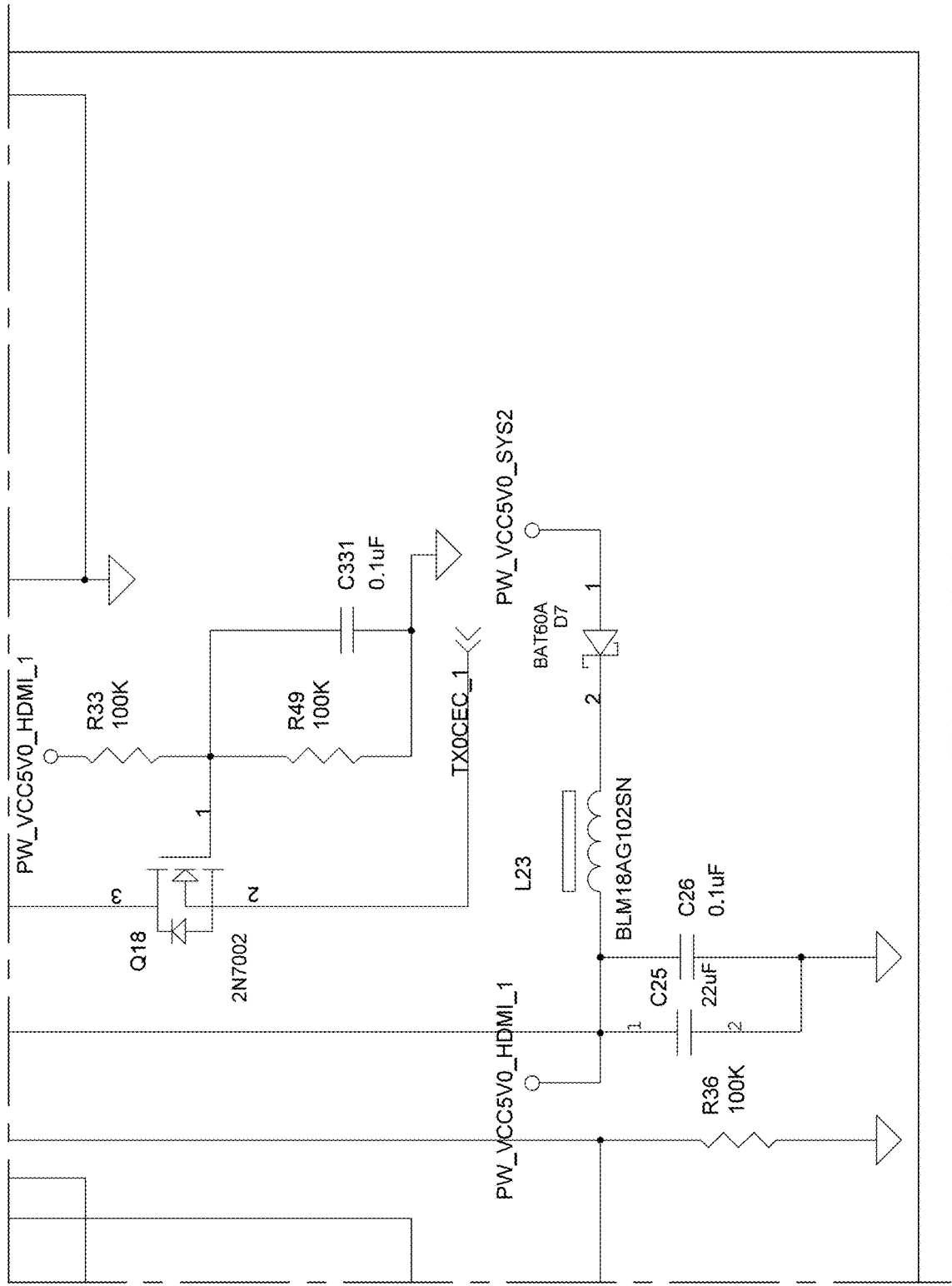
FIG. 12B4

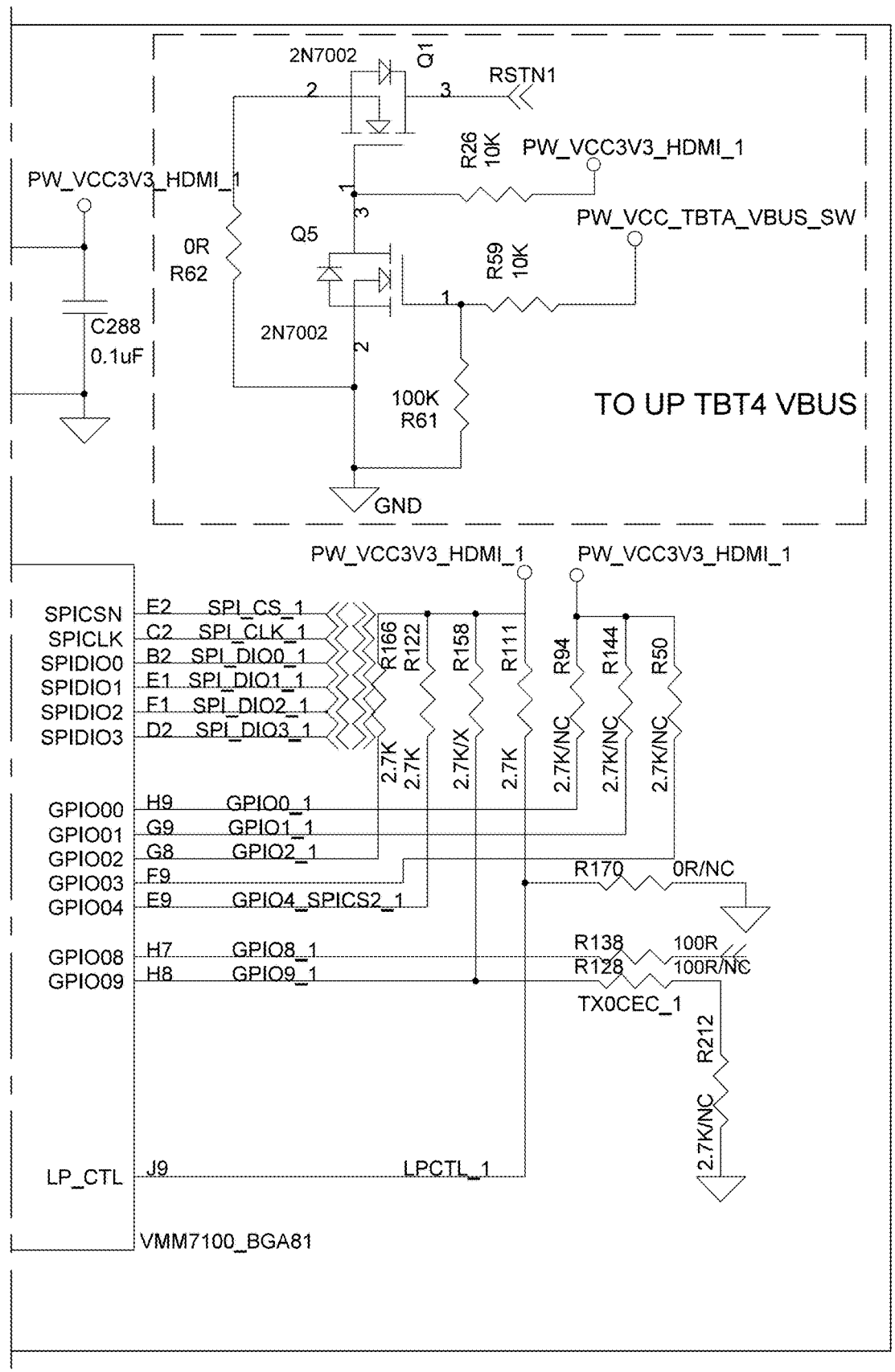
FIG. 12C2

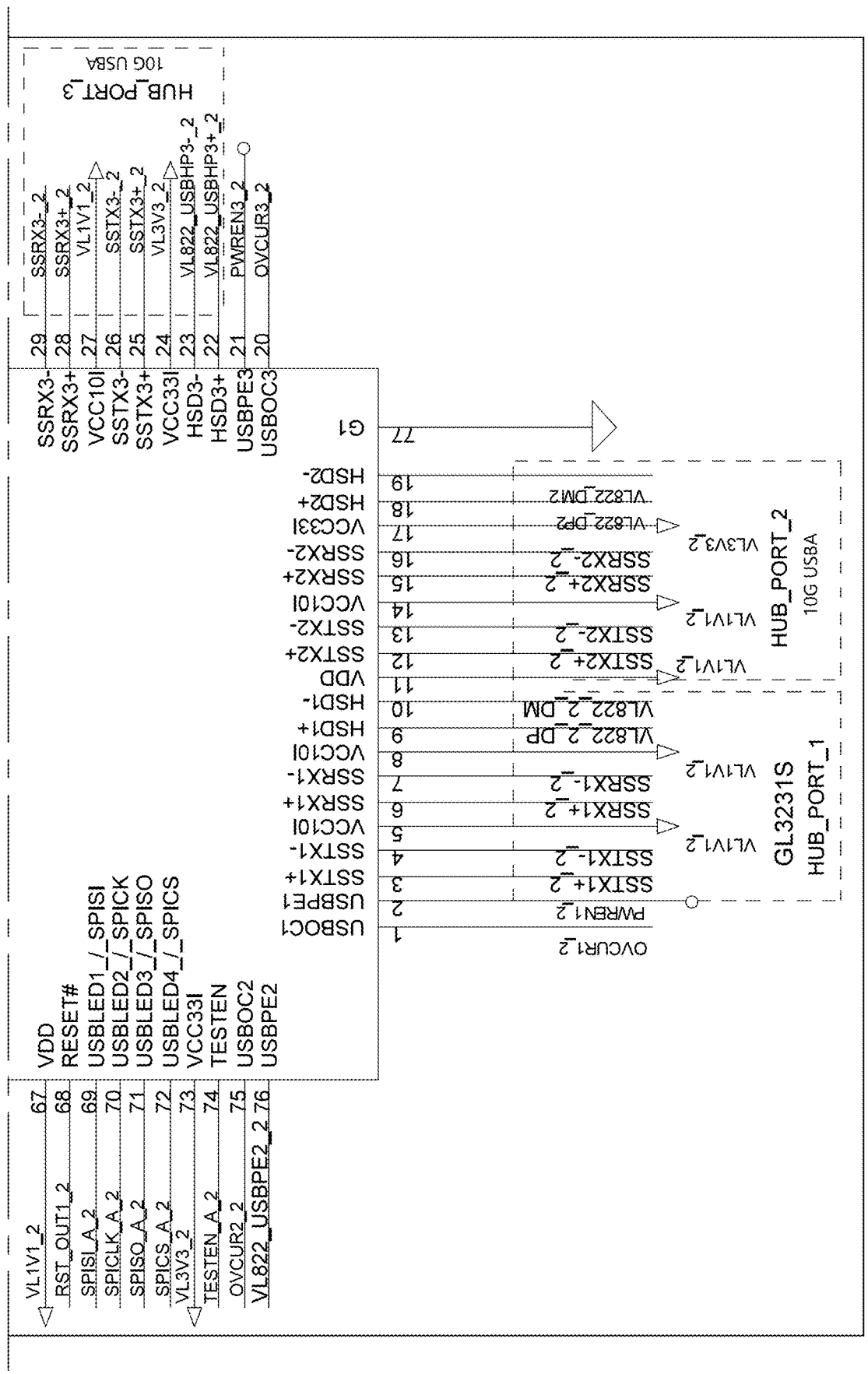
FIG. 16A2

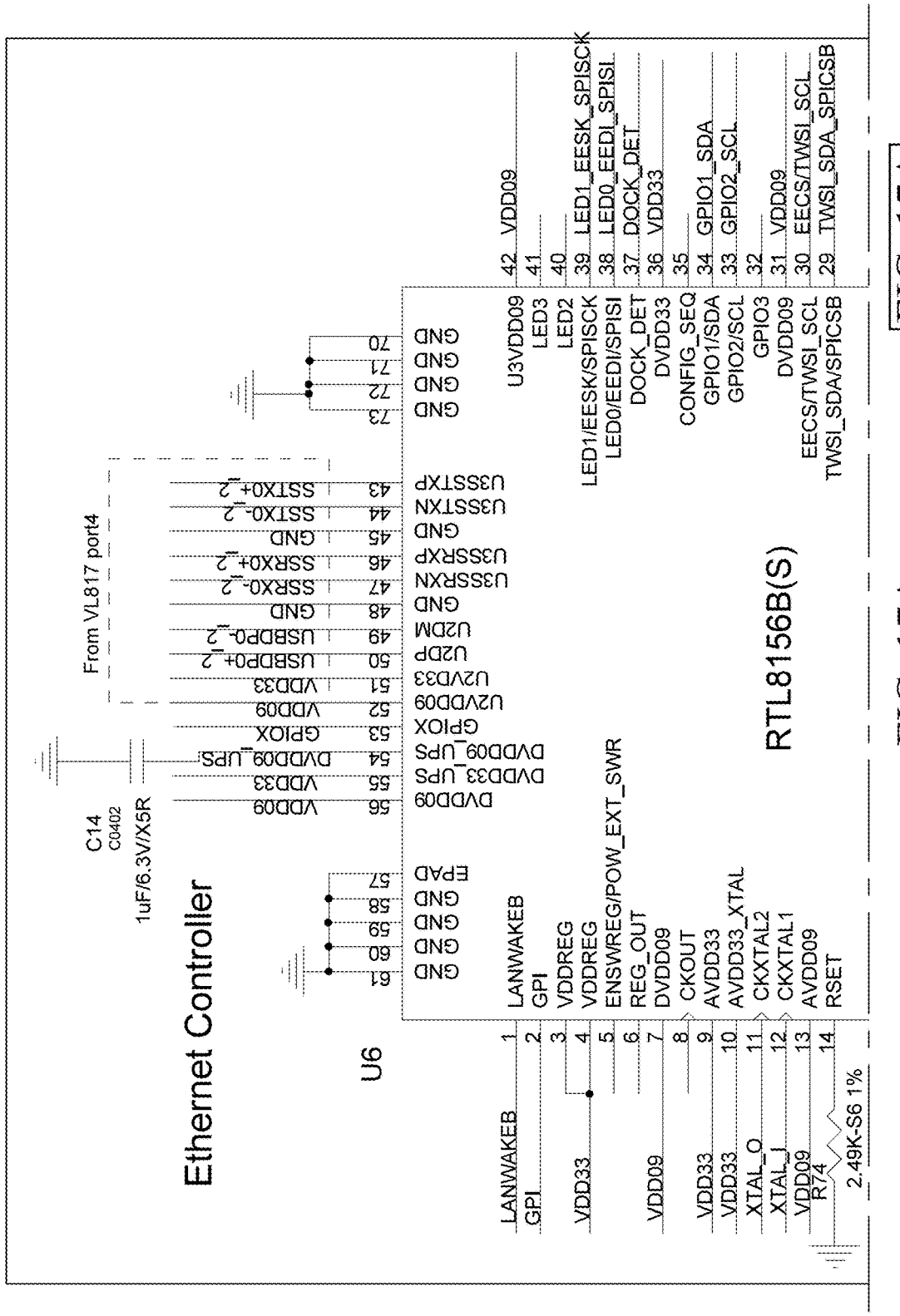

UNIVERSAL DOCKING STATION WITH HIGH-SPEED DATA TRANSMISSION AND HIGH RESOLUTION

FIELD OF THE DISCLOSURE

The present disclosure relates to the technical field of audio and video processing, data exchange, power charging and communication connection equipment of power electronic products, and more particularly to a universal docking station with high-speed data transmission and high resolution.

BACKGROUND OF THE DISCLOSURE

In 1996, the USB standard jointly designed by Intel, Microsoft, IBM, and other companies was released. Electronic products such as keyboards, mice, smartphones, and printers basically implement universal power supply and data transmission in accordance with the USB standard. After years of technological development, the USB interface is easy to use and has flexible connections, so it has basically replaced other similar standards. The interface type has also developed from USBA to USBC, the terminator of today's USB connectors, and the transmission rate has also increased from the original 150 Mbps/s to the current 40 Gbps/s. The video output has also increased from HD 720P to FHD 1080P, QHD 2560*1440, and UDH 4K and 8K video output.

The conventional technology lacks a universal docking station that can realize high-speed data transmission and high resolution for audio and video processing, data exchange, power charging and communication connection of computer peripheral products.

SUMMARY OF THE DISCLOSURE

For resolving the aforementioned technical problems, the purpose of the present disclosure is to provide a universal docking station with high-speed data transmission and high resolution that can realize high-speed data transmission, high-resolution audio and video processing, data exchange, power charging and communication connections for computer peripheral products.

The technical solution adopted by the present disclosure is to provide a universal docking station with high-speed data transmission and high resolution, which includes at least two PCB circuit boards arranged in parallel. Each of the at least two PCB circuit boards is correspondingly connected to at least one TB4 upstream port, one or more TB4 downstream ports, at least one HDMI port, one or more USBA 10 G ports, and one or more USBC 10 G ports. Each of the at least two PCB circuit boards is correspondingly provided with a main control circuit, a PD control circuit, a video conversion circuit, a USB3.0 control circuit, a USB2.0 control circuit and a power management circuit. Each of the at least two PCB circuit boards includes a Thunderbolt 4 controller; and each of the at least two PCB circuit boards is provided with a DC power input port. The TB4 upstream port is configured to be connected to a computer. The TB4 upstream port is connected to the TB4 downstream port through the main control circuit and the PD control circuit, and the TB4 downstream port is configured to transmit input and output video signals and data signals converted by the main control circuit and the PD control circuit. The TB4 upstream port is connected to the HDMI port through the main control circuit and the video conversion circuit, and the HDMI port is configured to transmit input and output video signals converted by the main control circuit and the video conversion circuit. The TB4 upstream port is connected to the USBA 10 G port through the main control circuit, the USB3.0 control circuit, and the USB2.0 control circuit, and the USBA 10 G port is configured to transmit input and output data information converted by the main control circuit, the USB3.0 control circuit, and the USB2.0 control circuit. The USBA 10 G port is further connected to the TB4 upstream port through the main control circuit, the USB3.0 control circuit, and the USB2.0 control circuit, and the USBA 10 G port is further configured to transmit input and output data information converted by the main control circuit, the USB3.0 control circuit, and the USB2.0 control circuit.

Further, the power management circuit includes a DC power input module and a system power processing module, and the DC power input module is configured to process and convert a 22V 8.18 A DC power input from a DC power input port DCIN into system operating voltages with different parameters. The system power processing module is configured to process and convert the system operating voltage into operating voltages with different parameters for circuit module processing units.

Further, the PD control circuit is provided with a number of PD controllers corresponding to a number of the TB4 downstream ports, and each TB4 upstream port is connected to a corresponding one of the TB4 downstream port through the Thunderbolt 4 controller and the PD controller. The video conversion circuit is provided with a video conversion chip, and the TB4 upstream port is connected to the HDMI port through the Thunderbolt 4 controller and a video conversion chip.

The universal docking station with high-speed data transmission and high resolution further includes a first PCB circuit board and a second PCB circuit board arranged in parallel. Each of the first PCB circuit board and the second PCB circuit board is correspondingly connected to one TB4 upstream port, two TB4 downstream ports and one HDMI port, the first PCB circuit board is correspondingly connected to three USBA 10 G ports, and the second PCB circuit board is correspondingly connected to two USBA 10 G ports. The second PCB circuit board is further correspondingly connected to two USBC 10 G ports, at least one of the two USBC 10 G ports is compatible with a PD charging function, and the second PCB circuit board is further correspondingly connected to an SD/TF port and a network port. A DC power input port DCIN is provided on the second PCB circuit board, and each of a first power management circuit of the first PCB circuit board and a second power management circuit of the second PCB circuit board is connected to the DC power input port DCIN.

Further, each of the first PCB circuit board and the second PCB circuit board is correspondingly provided with the main control circuit, the video conversion circuit, the PD control circuit and the USB2.0 control circuit. The first PCB circuit board is further correspondingly provided with a first USB3.0 control circuit and the first power management circuit. The second PCB circuit board is further correspondingly provided with a second USB3.0 control circuit and the second power management circuit. The main control circuit is provided with a Thunderbolt 4 controller U7. The TB4 upstream port is connected to s UFP port of the Thunderbolt 4 controller U7, a fourth DP signal port TBT-D of the Thunderbolt 4 controller U7 is connected to the HDMI port through the video conversion chip and a RXTX communication line. The PD control circuit includes two PD controllers. Each of the TB4 upstream port and a PD I2C port of the Thunderbolt 4 controller U7 is connected to the PD controller through a PD I2C protocol bus, and the PD controller is connected to the TB4 downstream port through a CC fast charging cable. Each of a second DP signal port TBT-B and a third DP signal port TBT-C of the Thunderbolt 4 controller U7 is also directly connected to two of the TB4 downstream ports through the RXTX communication line.

Further, the USB2.0 control circuit includes a USB2.0 control chip UB6, and each of the first USB3.0 control circuit and the second USB3.0 control circuit is provided with a first USB3.0HUB chip UH3. A U2_P0_D+D-port of the USB2.0 control chip UB6 is connected to a USB2.0 port of the Thunderbolt 4 controller U7, and a first U2 D+D-port of the USB2.0 control chip UB6 is connected to the TB4 upstream port. A second U2 D+D-port of the USB2.0 control chip UB6 is connected to the first USB3.0HUB chip UH3. A third U2 D+D-port and a fourth U2 D+D-port of the USB2.0 control chip UB6 are connected to two of the TB4 downstream ports. A fifth U2 D+D-port of a USB2.0 HUB chip UB6 is connected to a dock management controller. The PD controller is also directly connected to a terminal management controller. The USB2.0 control chip UB6 is also connected to each PD controller through the DMC I2C protocol bus.

Further, each of the first USB3.0HUB chip UH3 of the first USB3.0 control circuit and the second USB3.0 control circuit is directly connected to a port E port of the Thunderbolt 4 controller U7 through the RXTX communication line. The first USB3.0HUB chip UH3 of the first USB3.0 control circuit is connected to three USBA 10 G ports through three P-type data lines. The first USB3.0HUB chip UH3 of the second USB3.0 control circuit is connected to the USBC 10 G port compatible with the PD charging function through two P-type data lines, and the first USB3.0HUB chip UH3 of the second PCB circuit board is connected to one of the USBC 10 G ports through a third P-type data line and a differential channel multiplexer. The first USB3.0HUB chip UH3 of the second USB3.0 control circuit is connected to two USBA 10 G ports via the second USB3.0HUB chip UH1 through two P-type data lines.

Further, the second PCB circuit board is also correspondingly connected to a 4.0SD/TF port and a network port 2.5 G LAN. The 4.0SD/TF port is connected to the second USB3.0HUB chip UH1 via one P-type data line through a card reader. The network port 2.5 G LAN is connected to the second USB3.0HUB chip UH1 via another P-type data line through a network port chip.

Further, the first PCB circuit board is also correspondingly connected to a headset port, a single audio output port and an optical fiber connection port. The headset port, the single audio output port, and the optical fiber connection port are correspondingly connected to the first USB3.0HUB chip UH3 through the sound recognition chip.

Further, each of the first power management circuit and the second power management circuit includes a twenty-third buck-boost IC converter U23, a thirtieth operational amplifier UB30, a fifteenth operational amplifier UB15, a first synchronous buck converter SU1, a second synchronous buck converter SU2, and a third synchronous buck converter SU3.

The beneficial effects of the present disclosure are as follows.

The universal docking station with high-speed data transmission and high resolution of the present disclosure includes two parallel PCB circuit boards each correspondingly connected to the TB4 upstream port, the TB4 downstream port, the HDMI port, the USBA 10 G port, and the USBC 10 G port. Each PCB circuit board is provided with the main control circuit, the PD control circuit, the video conversion circuit, the USB3.0 control circuit, the USB2.0 control circuit, and the power management circuit. Each main control circuit is provided with the Thunderbolt 4 controller. At least one PCB circuit board is provided with the DC power input port. The computer can be connected through the TB4 upstream port. The TB4 upstream port is connected to the TB4 downstream port through the main control circuit and the PD control circuit. Through the TB4 downstream port, input and output video signals and data signals converted by the main control circuit and PD control circuit can be transmitted. Through the main control circuit and video conversion circuit connected to the HDMI port, video signals can be transmitted, and data information can be transmitted through the USBA 10 G port. According to the present disclosure, high-speed 40 G data transmission, high-resolution audio and video processing, data exchange, power charging and communication connections for computer peripheral products can be realized. The present disclosure provides the following technical effects.

1. The universal docking station with high-speed data transmission and high resolution of the present disclosure includes two PCBs and two upstream ports, so the accessory cable is two cables. The two cables can be connected to the host individually or simultaneously.

The PCB A board and the PCB B board share a DC input power supply. Power supplies of the two boards are connected through the positive and negative power lines. They are only shared by DC IN and are independent of each other. Independent upstream ports and downstream ports are provided, so that their respective functions can be carried out independently.

2. The 40 G data transmission is achieved, and the data exchange rate between peripheral devices and computers is up to 40 Gbps.

3. The video transmission can be output at the highest resolution output of 8K, so that the video of the computer host can be output in high definition.

4. The upstream charging with a power of 96 W can charge the host computer while working, so there is no need to worry about insufficient power supply.

5. The multi-interface 10 G USB device expansion can be realized to meet the requirement of more USB devices being connected to the computer at the same time.

6. The 2.5 G wired network connection can be provided, which is fast and stable, breaking through the conventional 100 M/Gigabit network.

7. The requirement of the SD memory card reading and writing requirements of 4.0 can be met.

8. The present disclosure supports headphones, optical audio input and output.

Therefore, each function coordinates with each other and is independent of each other without interfering with each other, so that all functions can be carried out at the same time.

BRIEF DESCRIPTION OF THE DRAWINGS

In order to explain the embodiments of the present disclosure or the technical solutions in the prior art more clearly, the drawings needed to be used in the description of the embodiments or the prior art will be briefly introduced below. Obviously, the drawings in the following description are only some embodiments of the present disclosure. For those of ordinary skill in the art, other drawings can be obtained based on these drawings without exerting any creative effort.

FIG. 2B, are schematic diagrams of Thunderbolt 4 controller circuit principle of a first PCB circuit board UCNA8231A-A and a second PCB circuit board UCNA8231A-B of the universal docking station with high-speed data transmission and high resolution according to the embodiment of the present disclosure;

FIG. 3A1, a partially broken away left view, and FIG. 3A2, a partially broken away right view, collectively FIG. 3A, and FIG. 3B1, a partially broken away left view, and FIG. 3B2, a partially broken away right view, collectively

FIG. 5A1, a partially broken away left view, and FIG. 5A2, a partially broken away right view, collectively FIG. 5A, and FIG. 5B, illustrate schematic diagrams of a USB2.0 control circuit principle of the first PCB circuit board UCNA8231A-A and the second PCB circuit board UCNA8231A-B of the universal docking station with high-speed data transmission and high resolution according to the embodiment of the present disclosure;

Figure 8A:
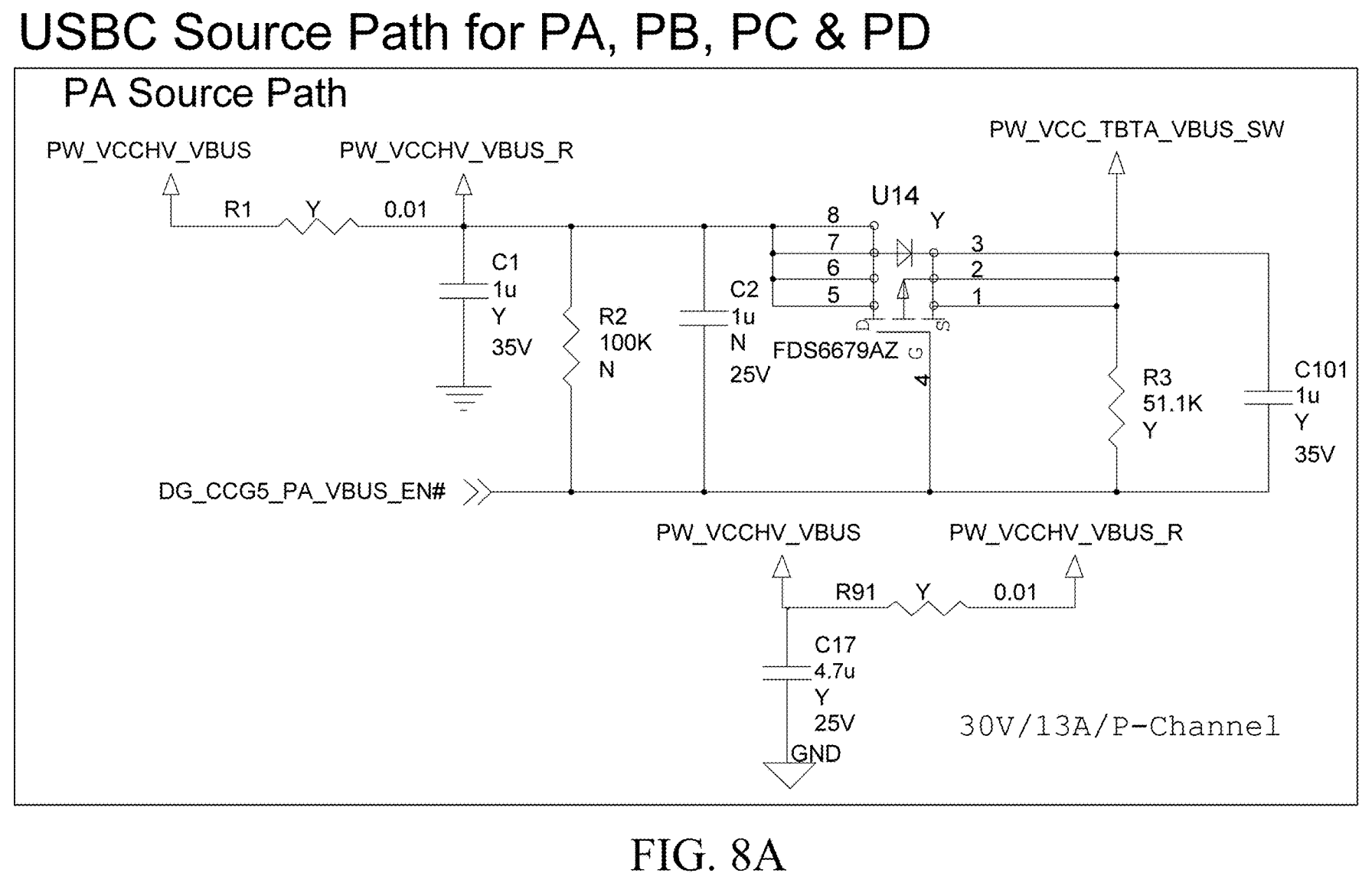

FIG. 8A and FIG. 8B1, a partially broken away left view, FIG. 8B2, a partially broken away middle view, and FIG. 8B3, a partially broken away right view, collectively FIG. 8B, and FIG. 9A, FIG. 9B1, a partially broken away left view, and FIG. 9B2, a partially broken away right view, collectively FIG. 9B, FIG. 9C, FIG. 9D, FIG. 9E, FIG. 9F, and FIG. 10A1, a partially broken away left view, and FIG. 10A2, a partially broken away right view, collectively FIG. 10A, FIG. 10B1, a partially broken away left view, and FIG. 10B2, a partially broken away right view, collectively FIG. 10B, and FIG. 11A1, a partially broken away left view, FIG. 11A2, a partially broken away middle view, and FIG. 11A3, a partially broken away right view, collectively FIG. 12A, FIG. 12B1, a partially broken away upper left view, FIG. 12B2, a partially broken away upper right view, FIG. 12B3, a partially broken away lower left view, and FIG. 12B4, a partially broken away lower left view, collectively FIG. 12B, and FIG. 12C1, a partially broken away left view, and FIG. 12C2, a partially broken away right view, collectively

FIG. 16A1, a partially broken away upper view, and FIG. 16A2, a partially broken away lower view, collectively FIG. 16A, and FIG. 16B, illustrate schematic diagrams of a second USB3.0HUB chip connection circuit principle of the second USB3.0 HUB chip connection circuit of the second PCB circuit board UCNA8231A-B of the universal docking station with high-speed data transmission and high resolution according to the embodiment of the present disclosure;

DETAILED DESCRIPTION OF THE EXEMPLARY EMBODIMENTS

The present disclosure will be further described in detail below in conjunction with the accompanying drawings.

This specific embodiment is only an explanation of the present disclosure, and it is not a limitation of the present disclosure. Those skilled in the art can make modifications to this embodiment without creative contribution as needed after reading this specification, as long as the disclosure is protected by patent law within the scope of their claims.

Figure 1A:
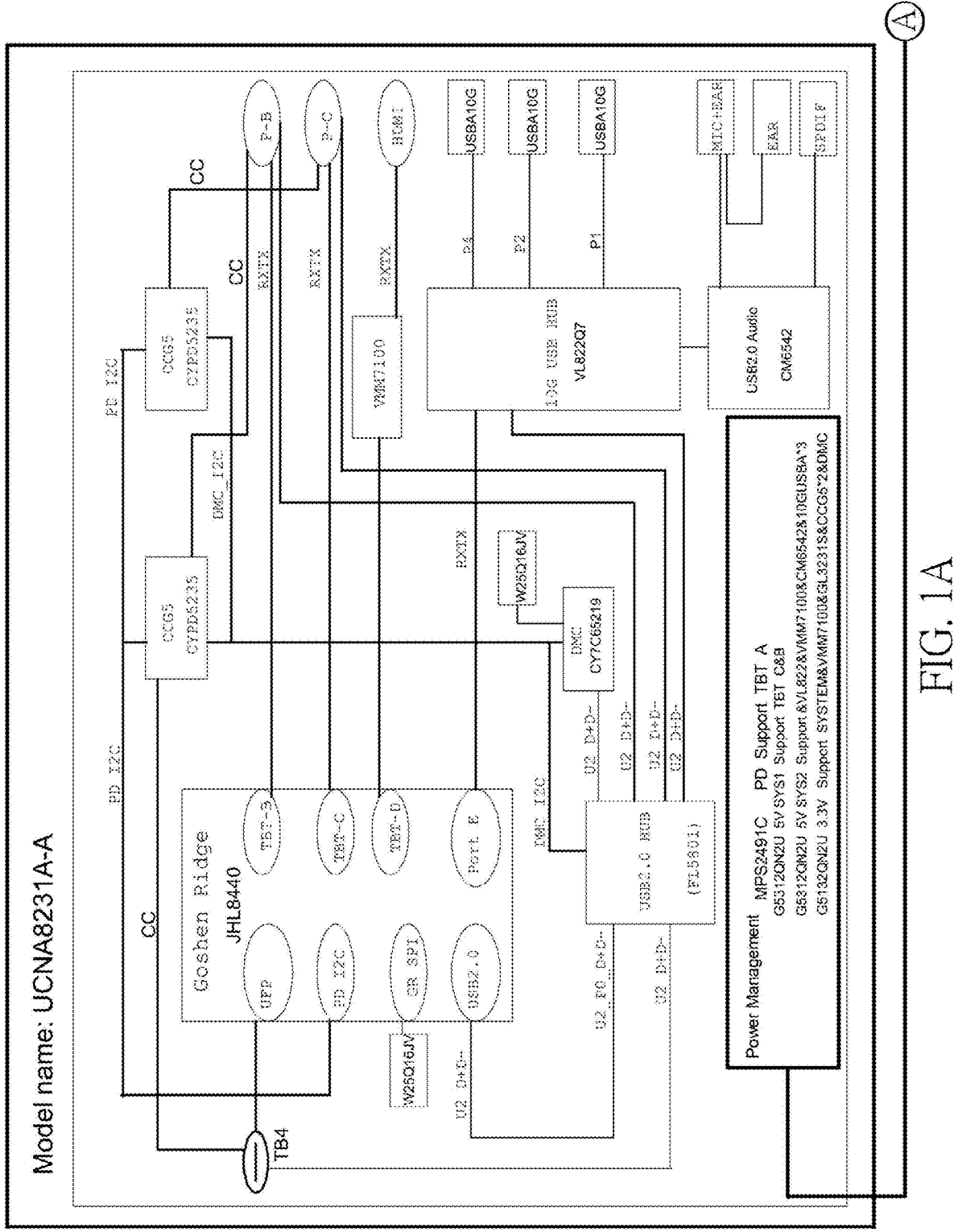
FIG. 1A, a partially broken away left view, and FIG. 1B, a partially broken away right view, collectively illustrate a schematic diagram of the principle of a universal docking station with high-speed data transmission and high resolution according to an embodiment of the present disclosure.
Figure 1B:
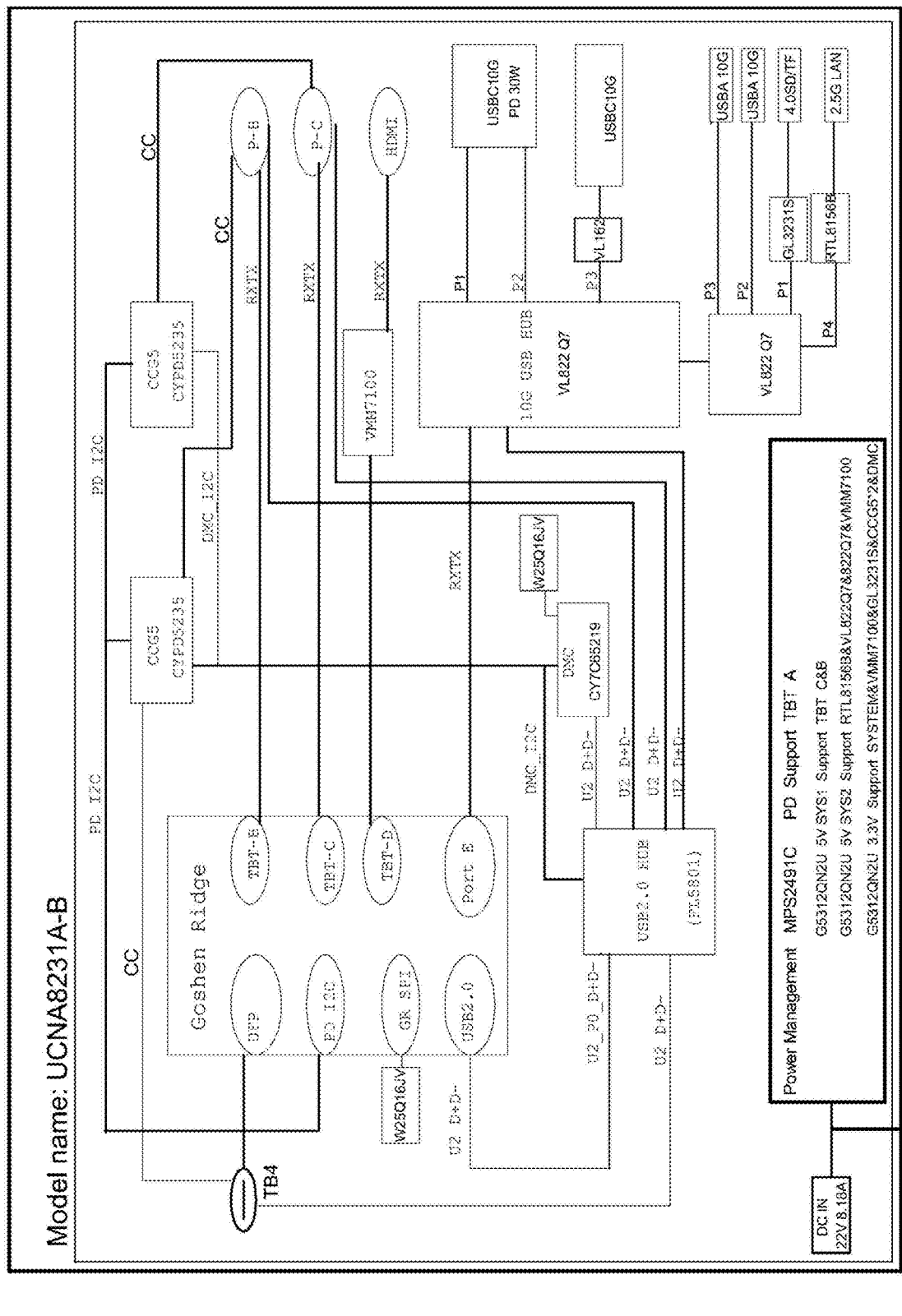
FIG. 2A1, a partially broken away left view, and FIG. 2A2, a partially broken away right view, collectively FIG. 2A, and FIG. 2B1, a partially broken away left view, FIG. 2B2, a partially broken away middle view, and FIG. 2B3, a partially broken away right view, collectively
Figure 2A:
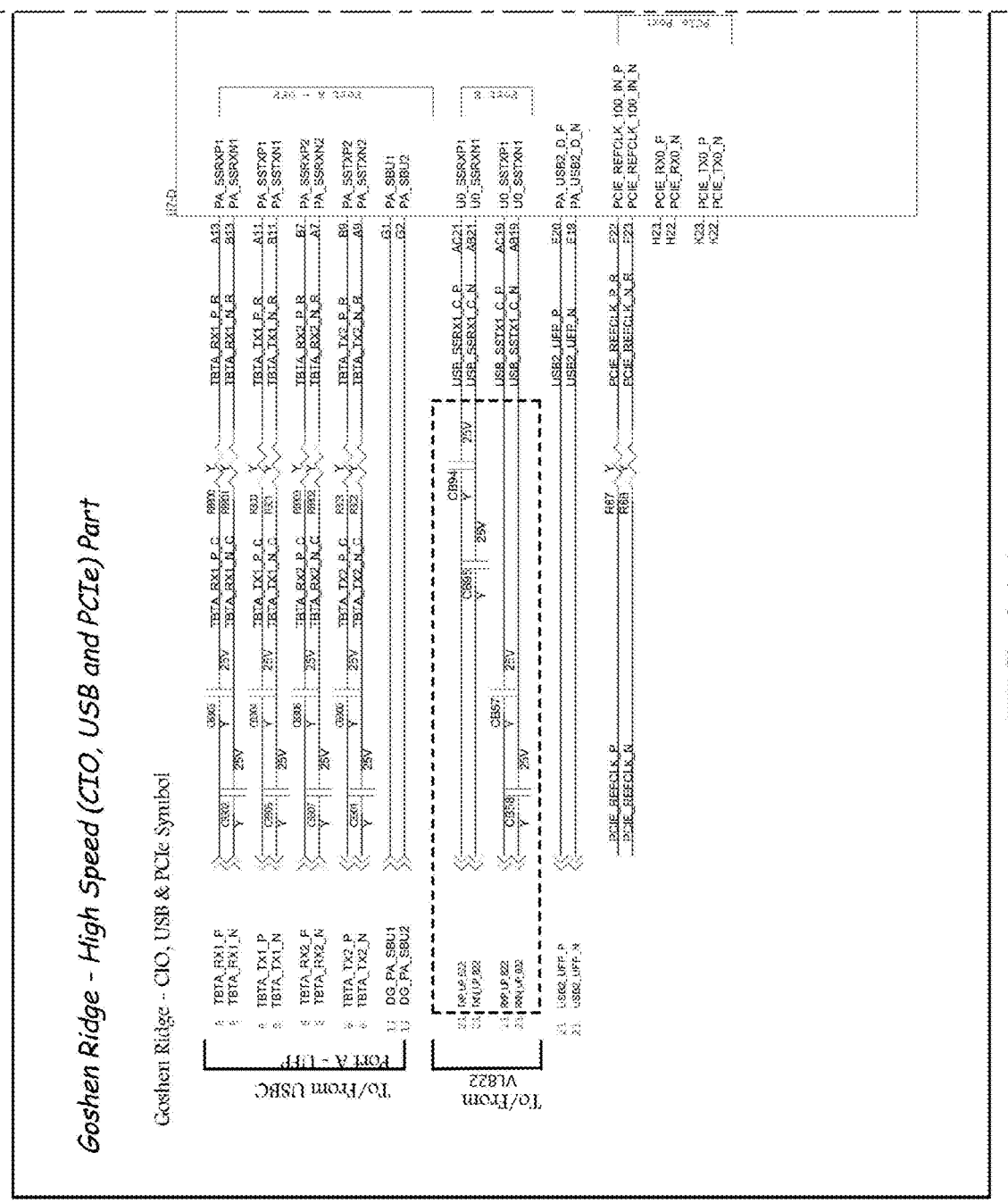
Figure 3A:
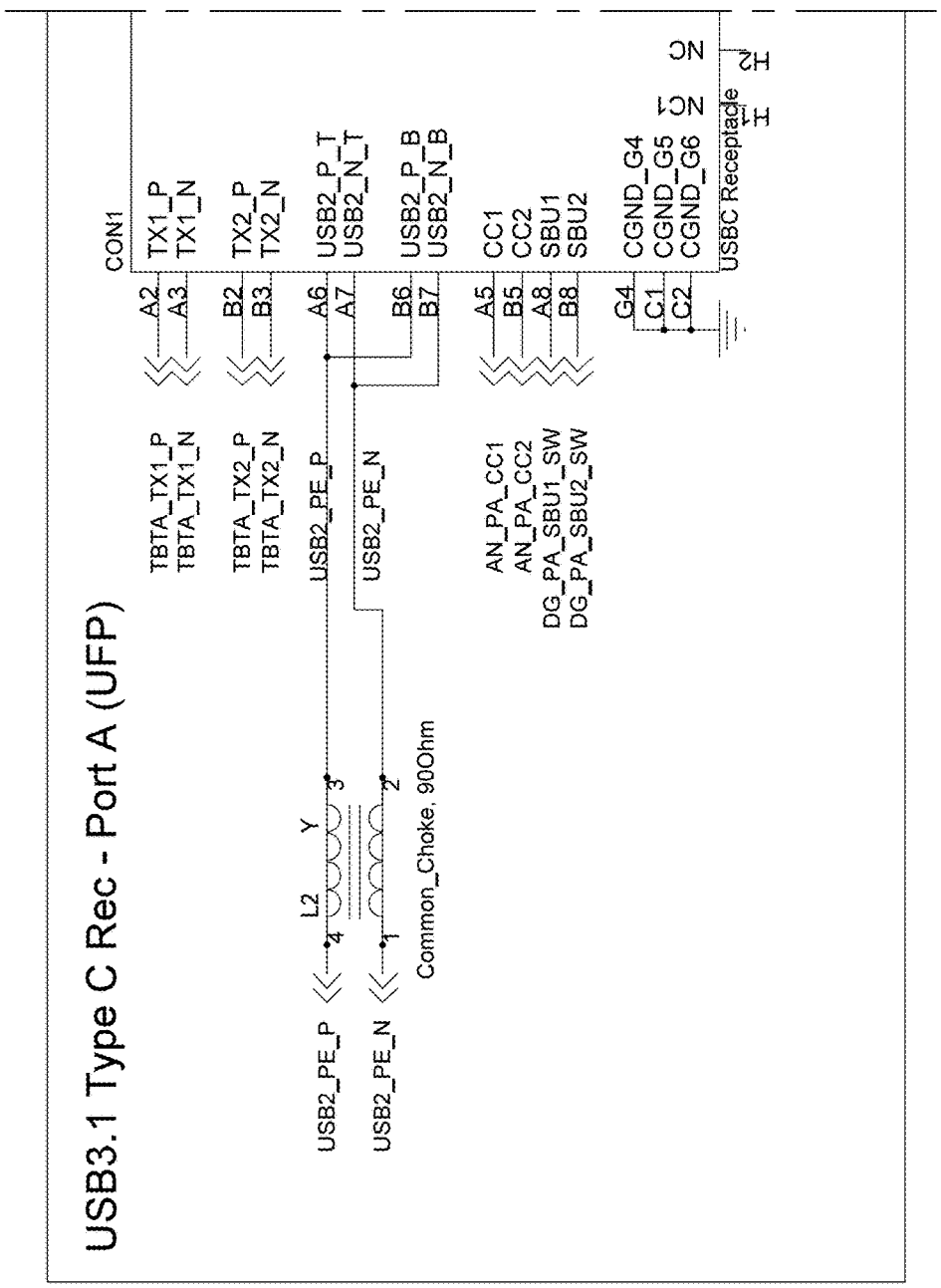
Figure 3B:
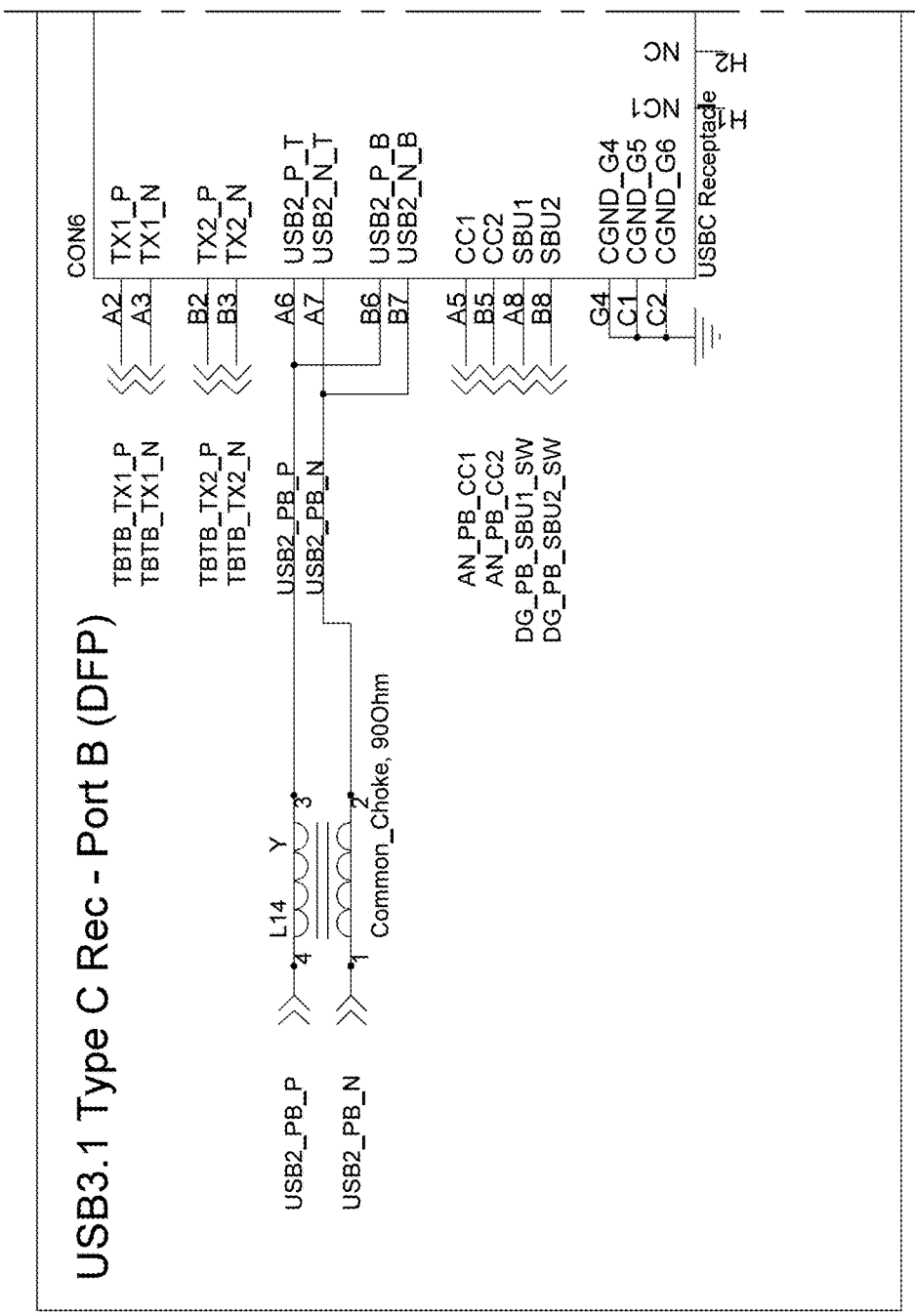
FIG. 3B, are schematic diagrams of a circuit principle of a TB4 upstream port and a TB4 downstream port of the first PCB circuit board UCNA8231A-A and the second PCB circuit board UCNA8231A-B of the universal docking station with high-speed data transmission and high resolution according to the embodiment of the present disclosure.
Figure 4A:
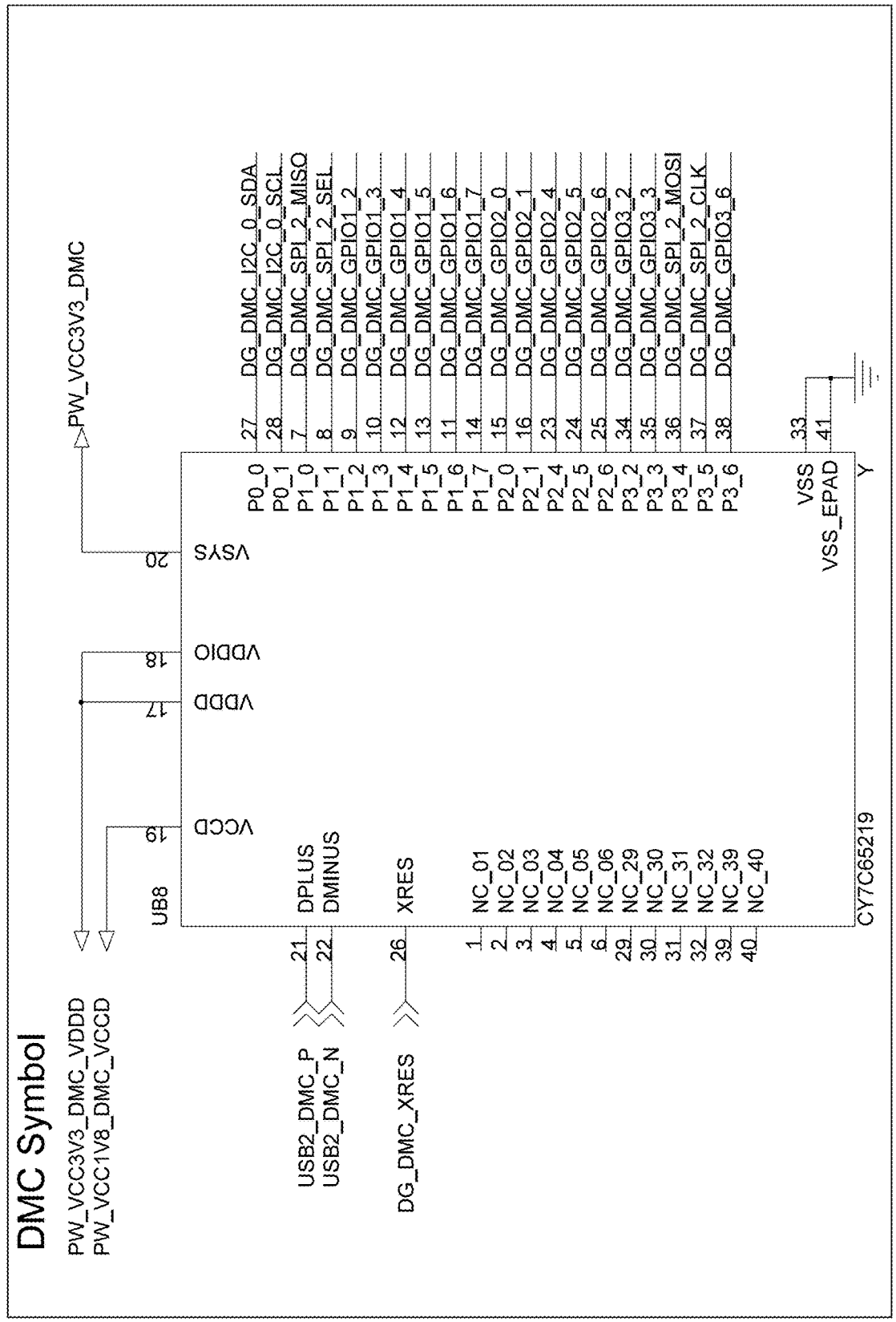
FIG. 4A and FIG. 4B illustrate schematic diagrams of a circuit principle of a dock management controller DMC of the first PCB circuit board UCNA8231A-A and the second PCB circuit board UCNA8231A-B of the universal docking station with high-speed data transmission and high resolution according to the embodiment of the present disclosure.
Figure 4B:
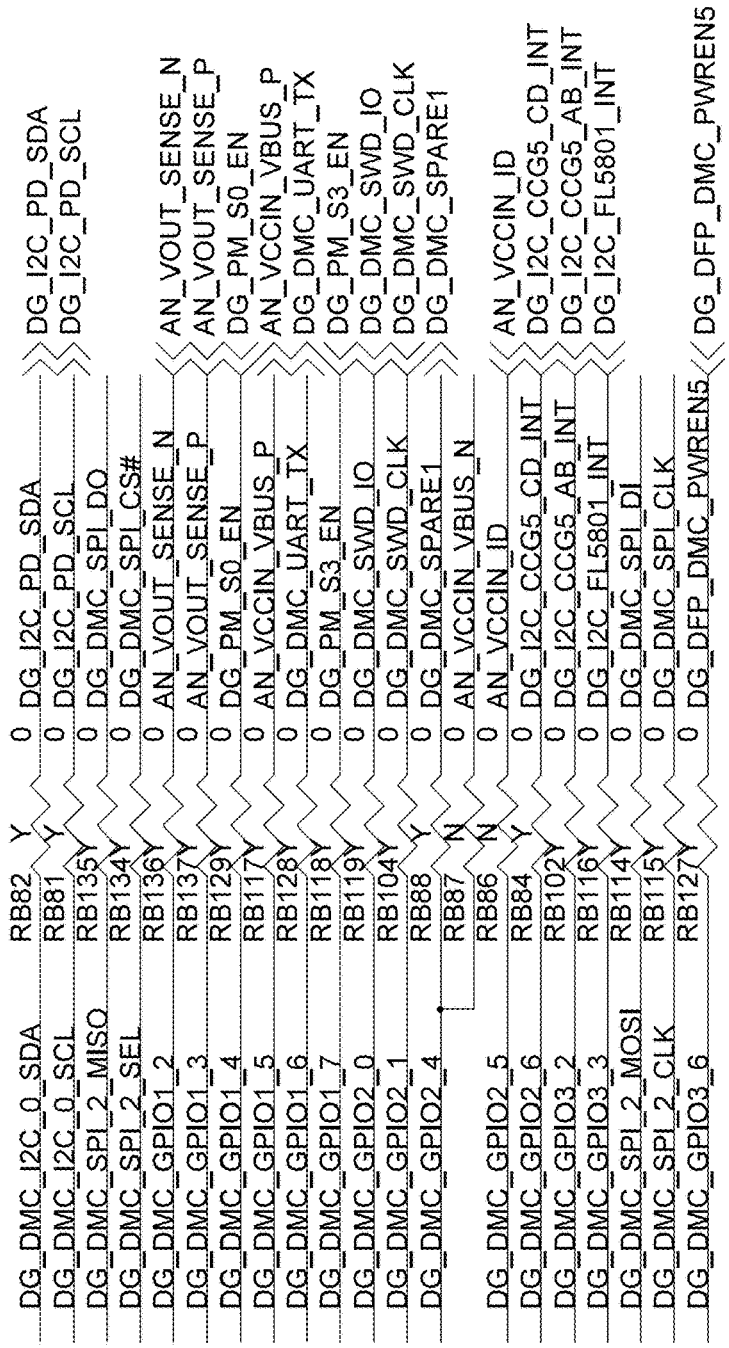
Figure 5A:
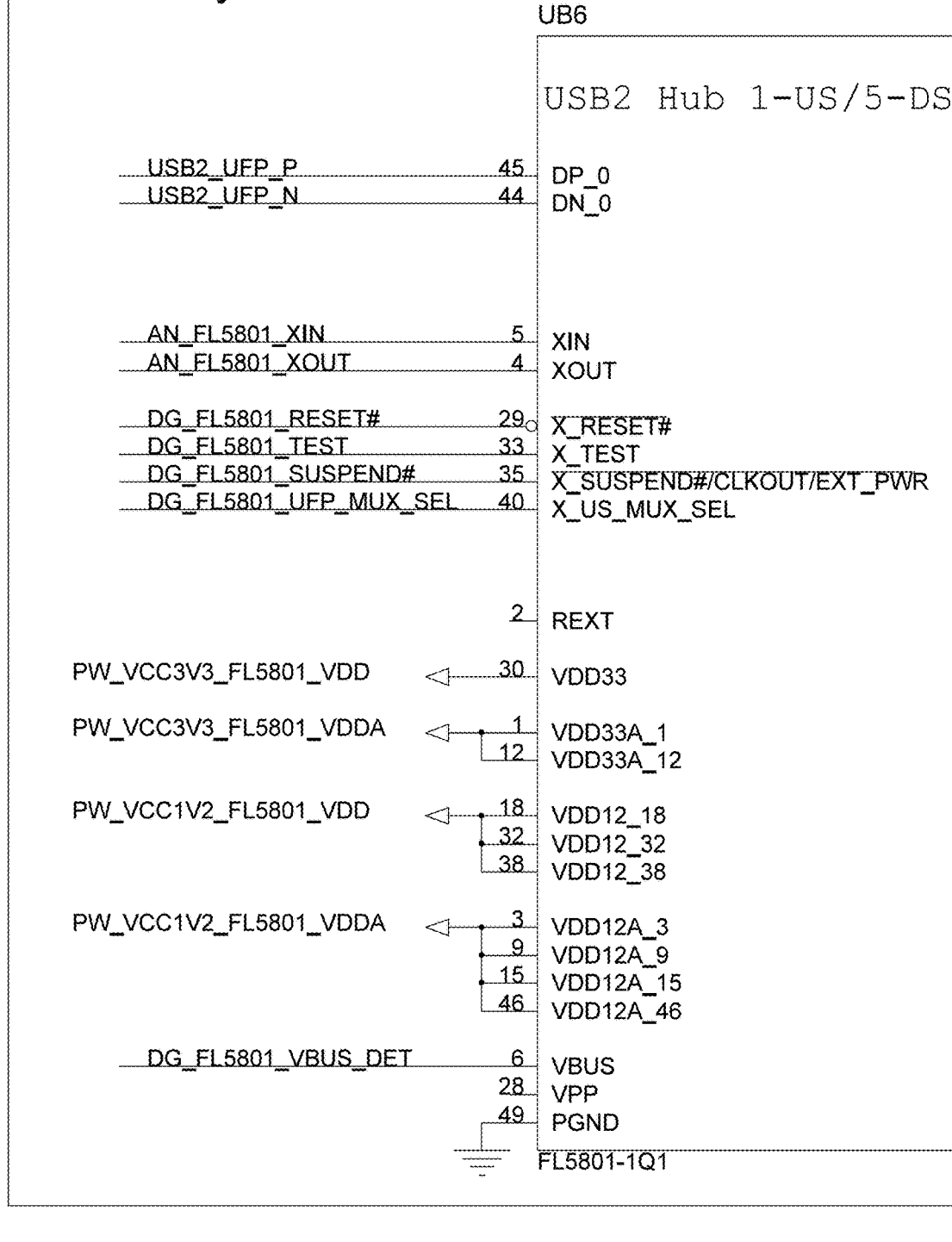
Figure 5B:
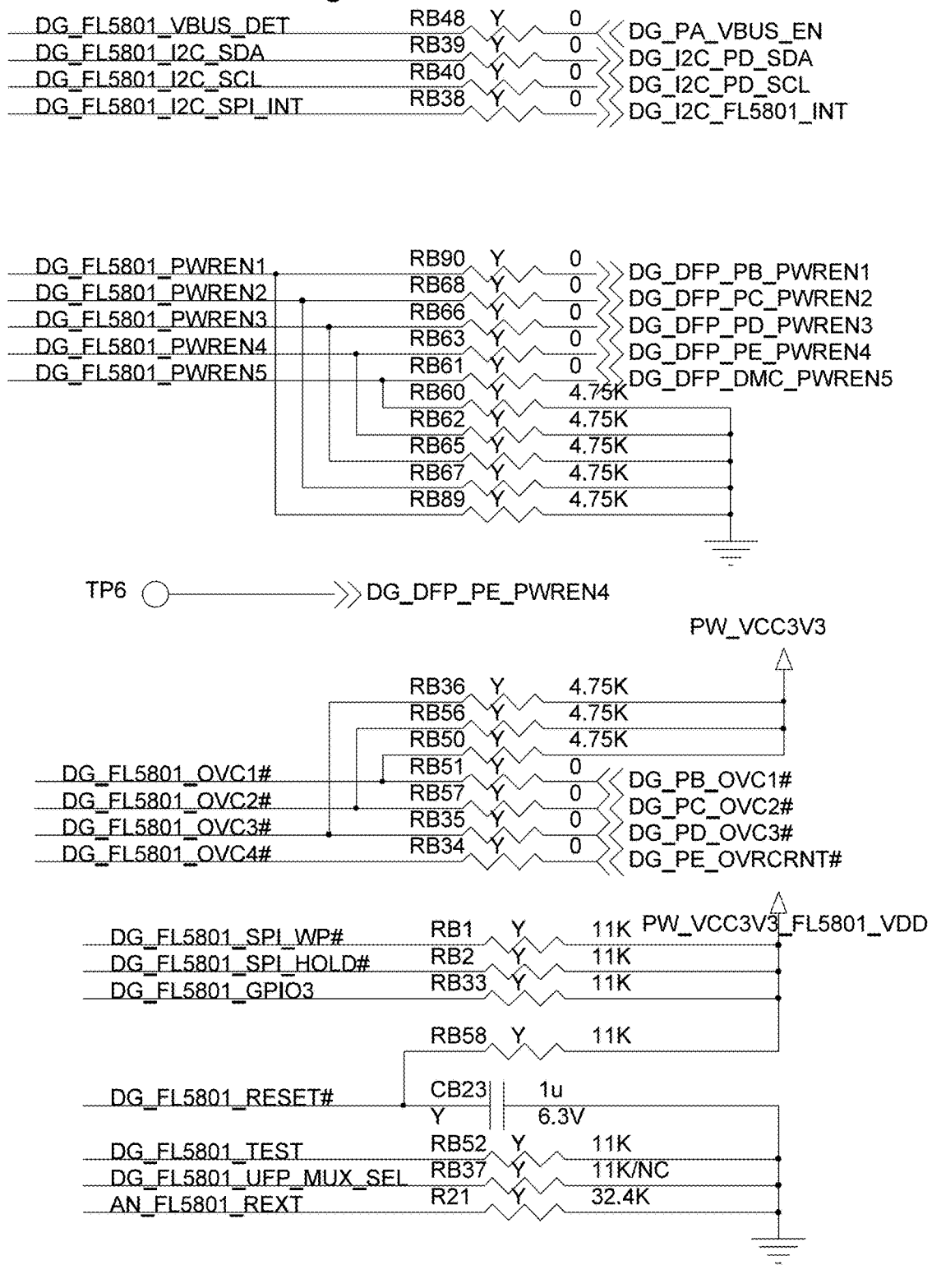
Figures 6, 6A:
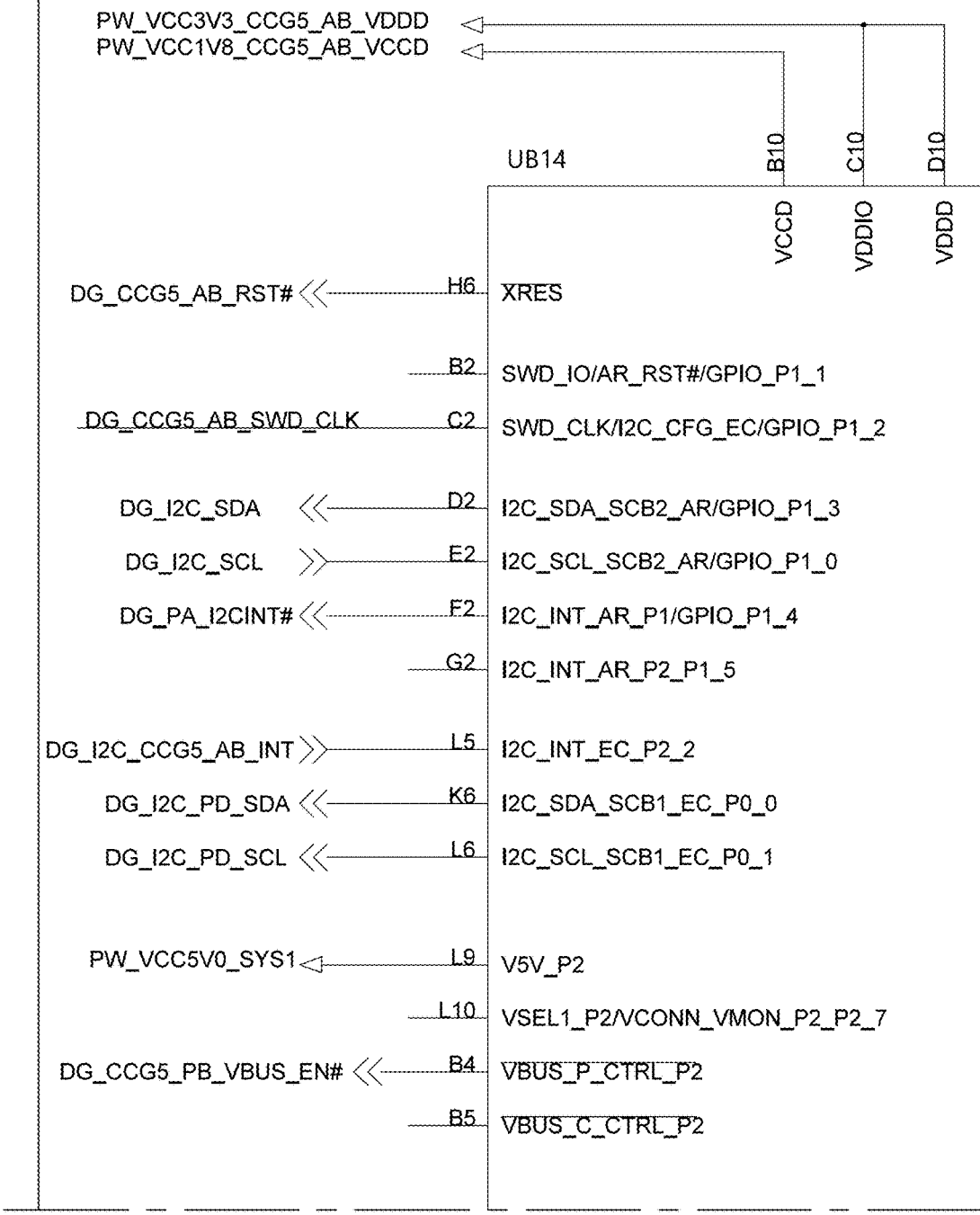
FIG. 6, including an upper left partial view FIG. 6A, an upper right partial view FIG. 6B, a lower left partial view FIG. 6C, and a lower right partial view FIG. 6D, and FIG. 7, including an upper left partial view FIG. 7A, an upper right partial view FIG. 7B, a lower left partial view FIG. 7C, and a lower right partial view FIG. 7D are schematic diagrams of circuit principles of the PD controller of the first PCB circuit board UCNA8231A-A and the second PCB circuit board UCNA8231A-B of the universal docking station with high-speed data transmission and high resolution according to the embodiment of the present disclosure.
Figure 6B:
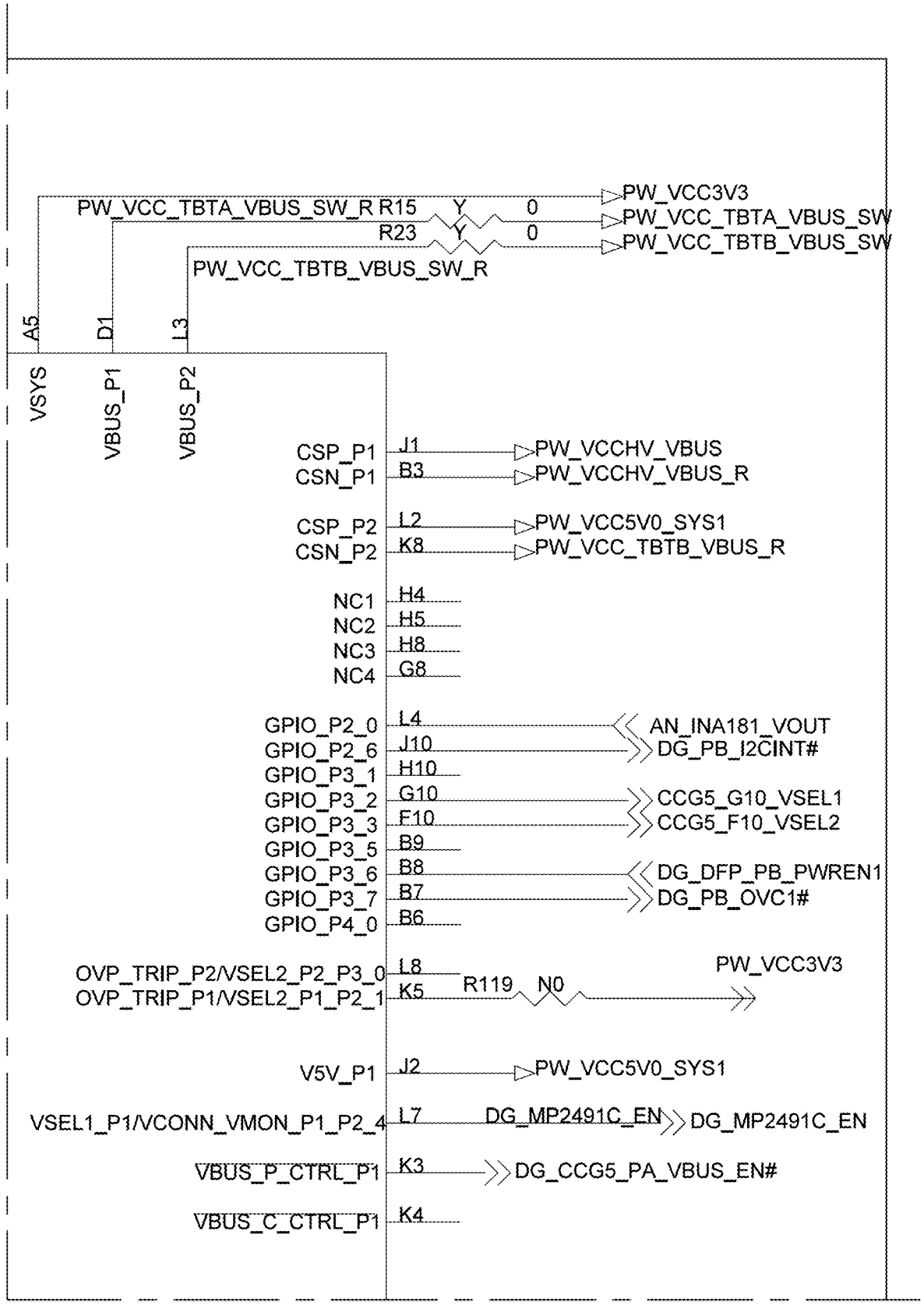
Figure 6C:
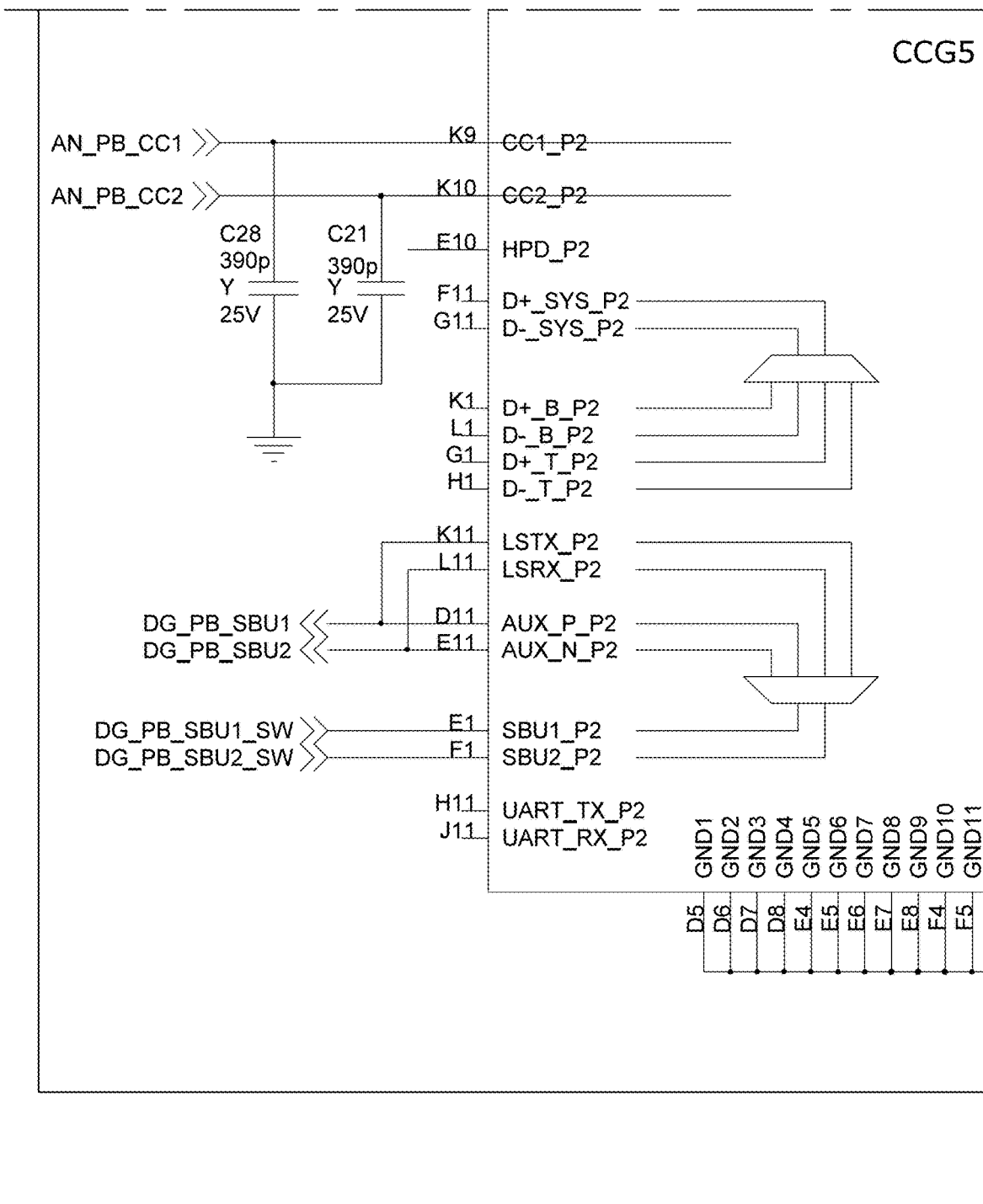
Figure 6D:
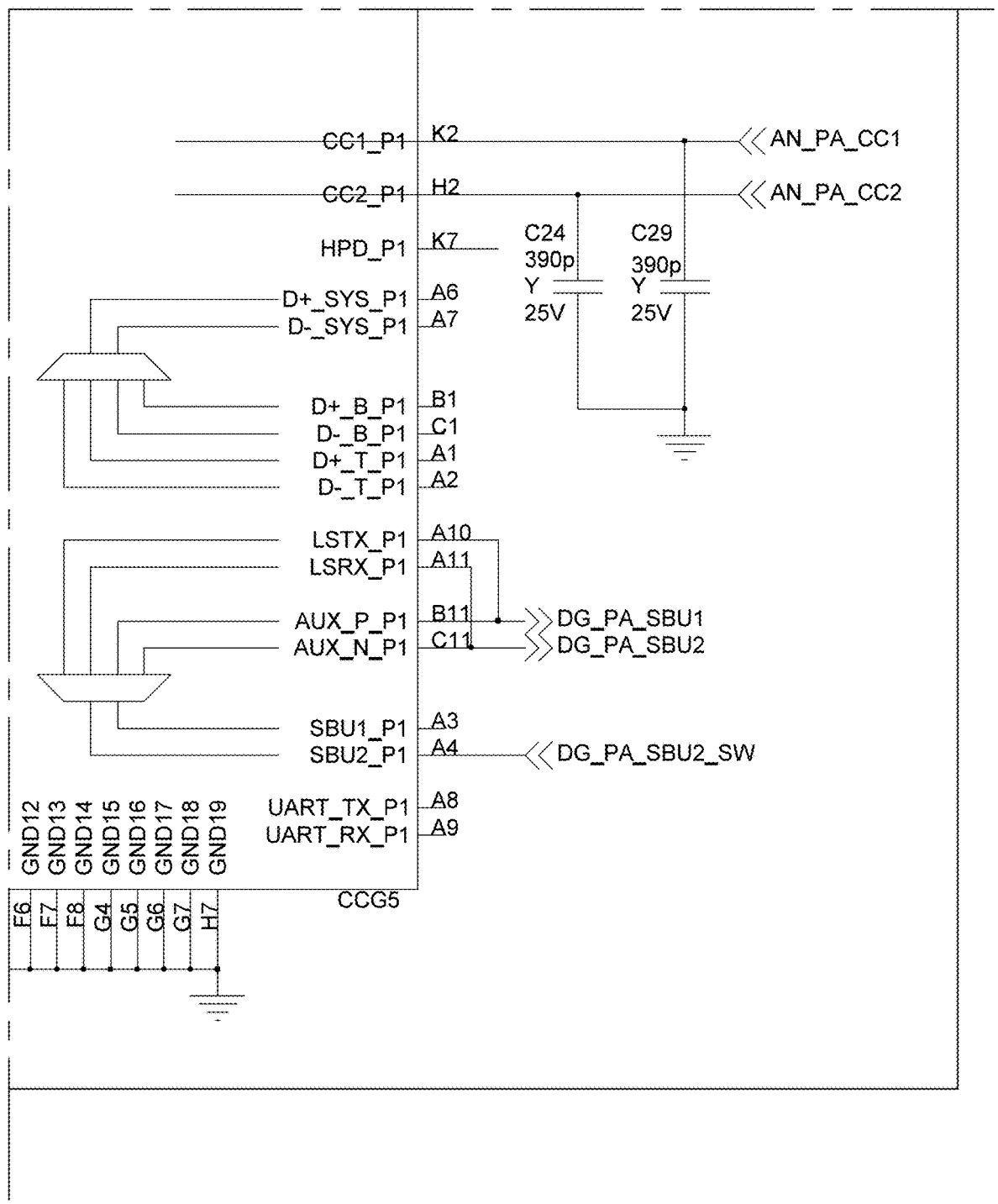
Figure 7A:
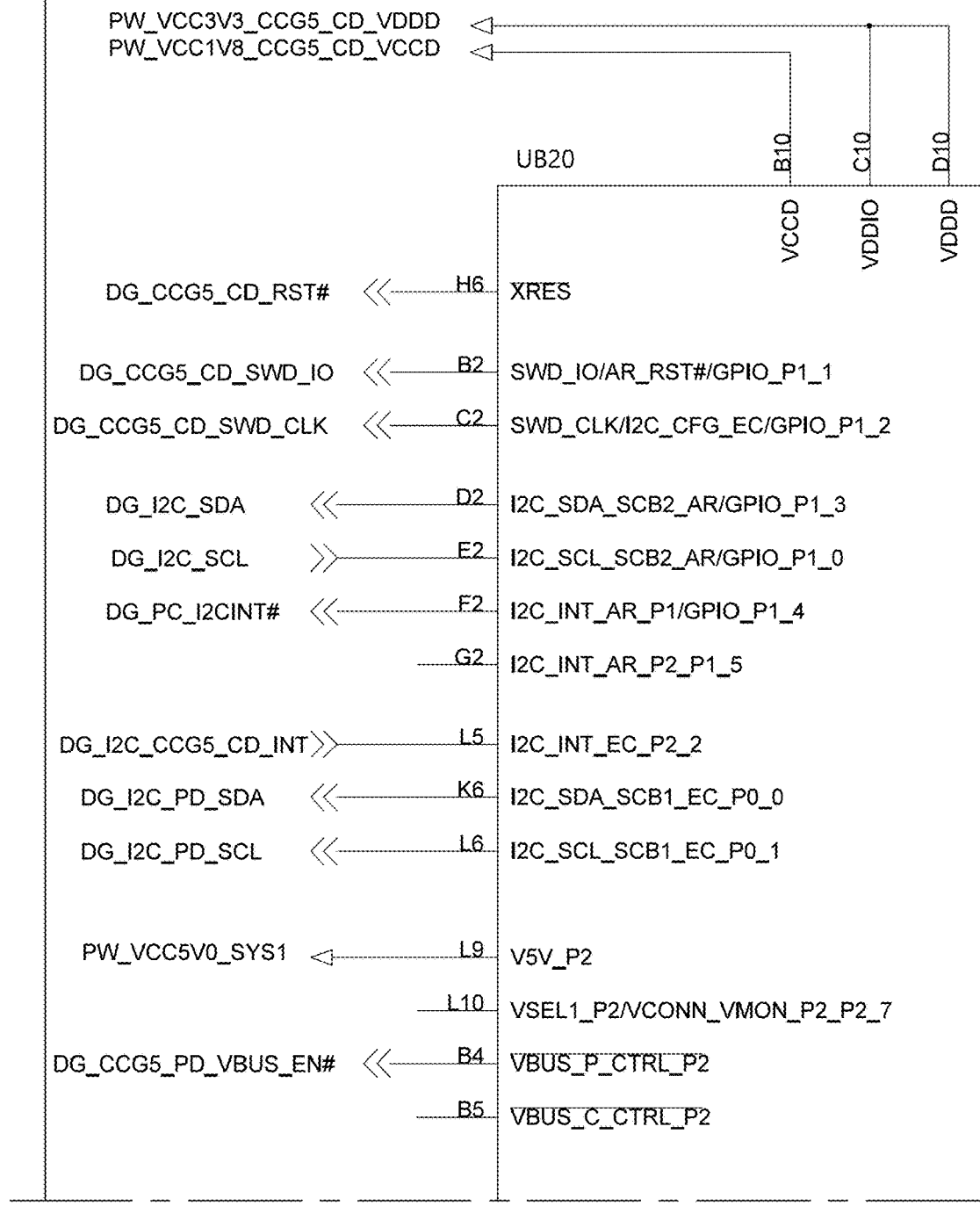
Figure 7B:
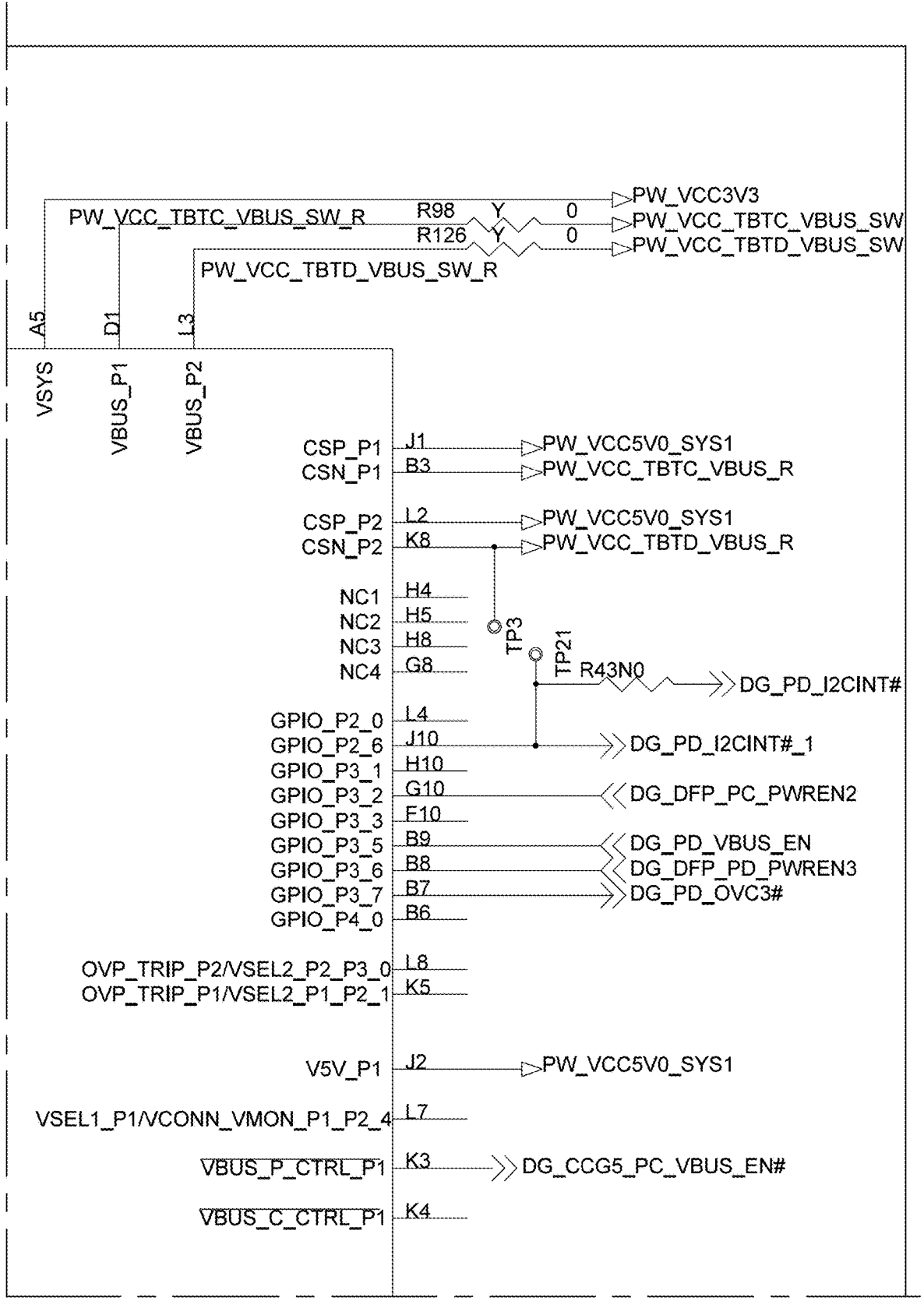
Figure 7C:
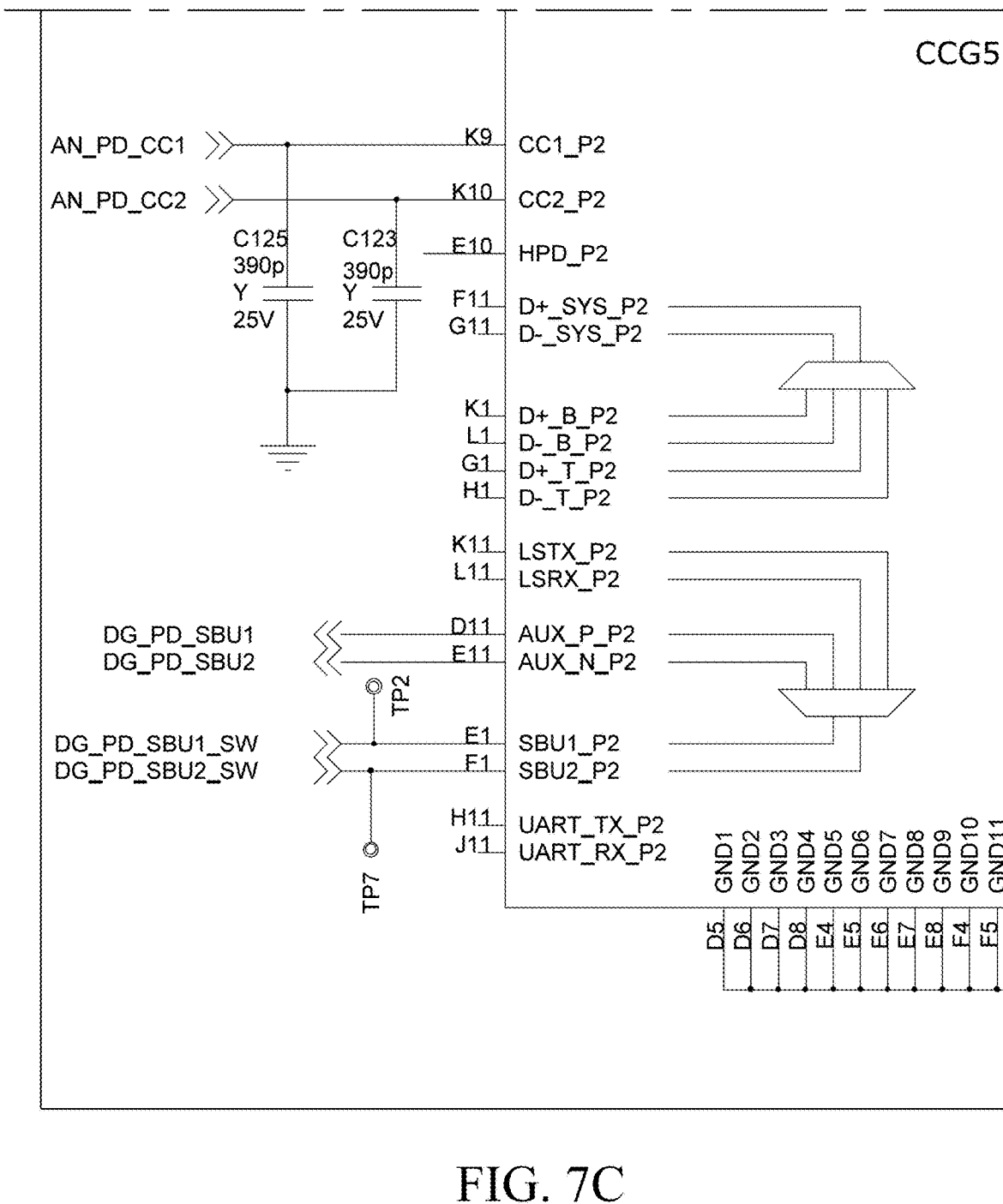
Figure 7D:
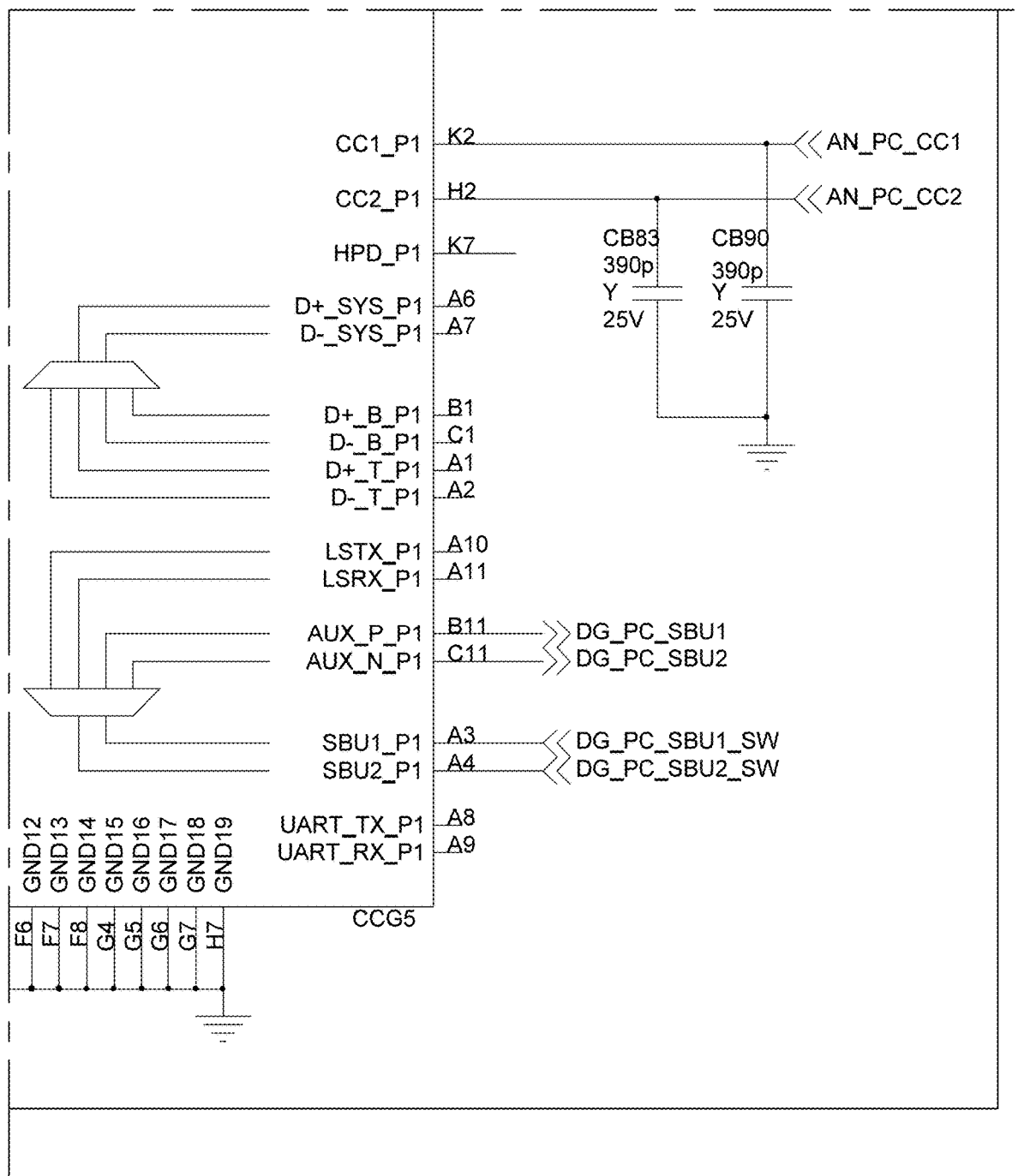
Figure 8B:
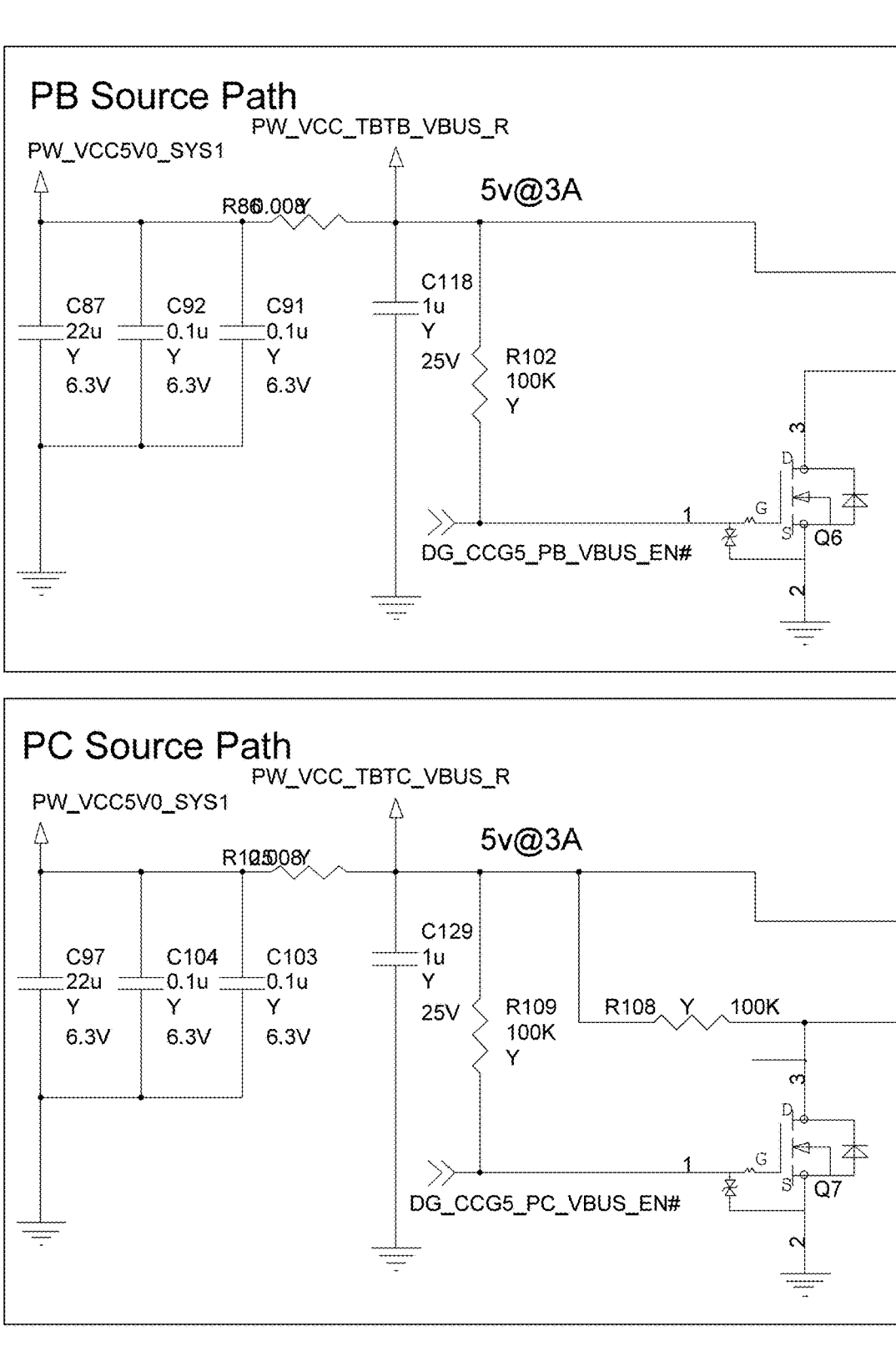
Figure 9A:
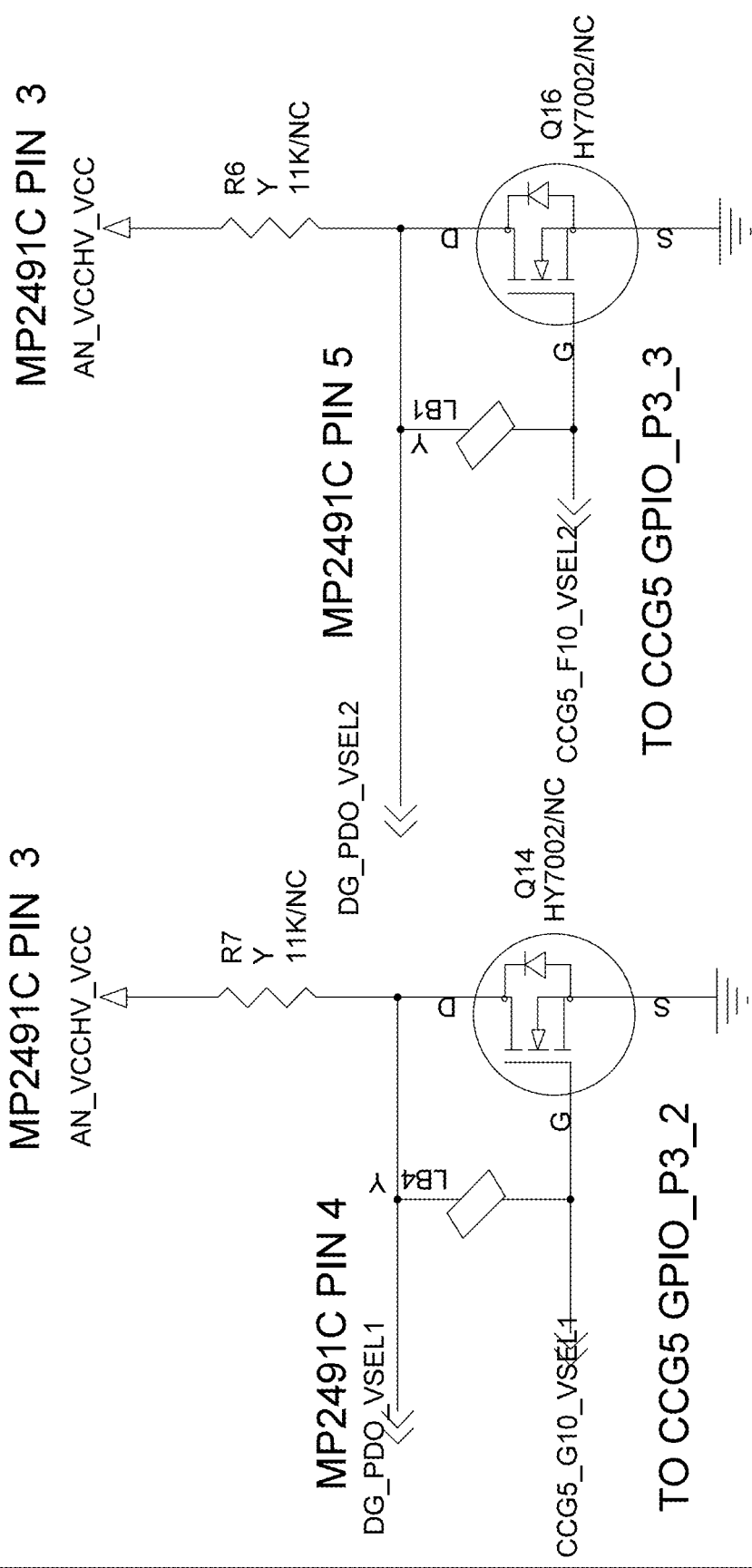
Figure 9C:
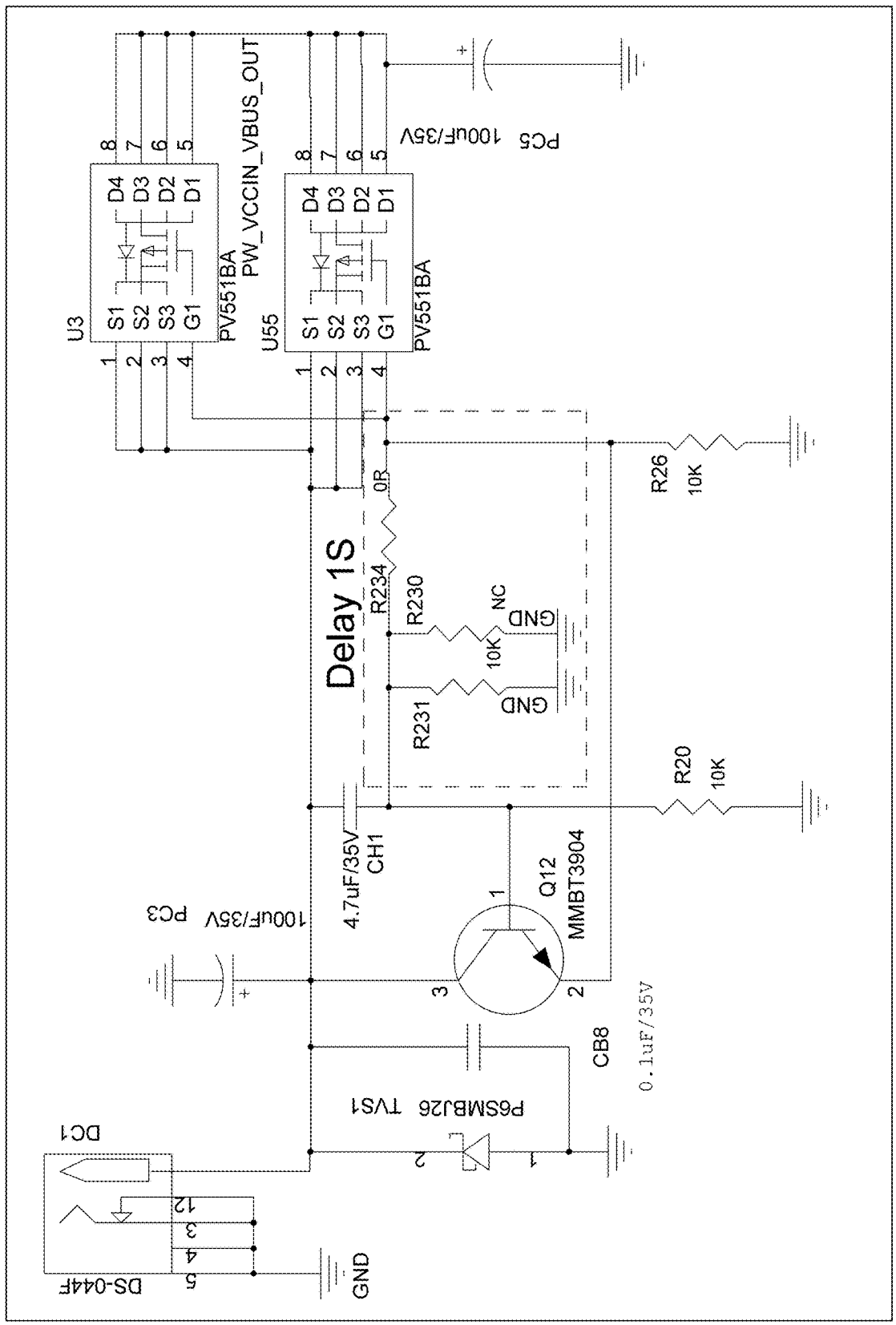
Figure 9D:
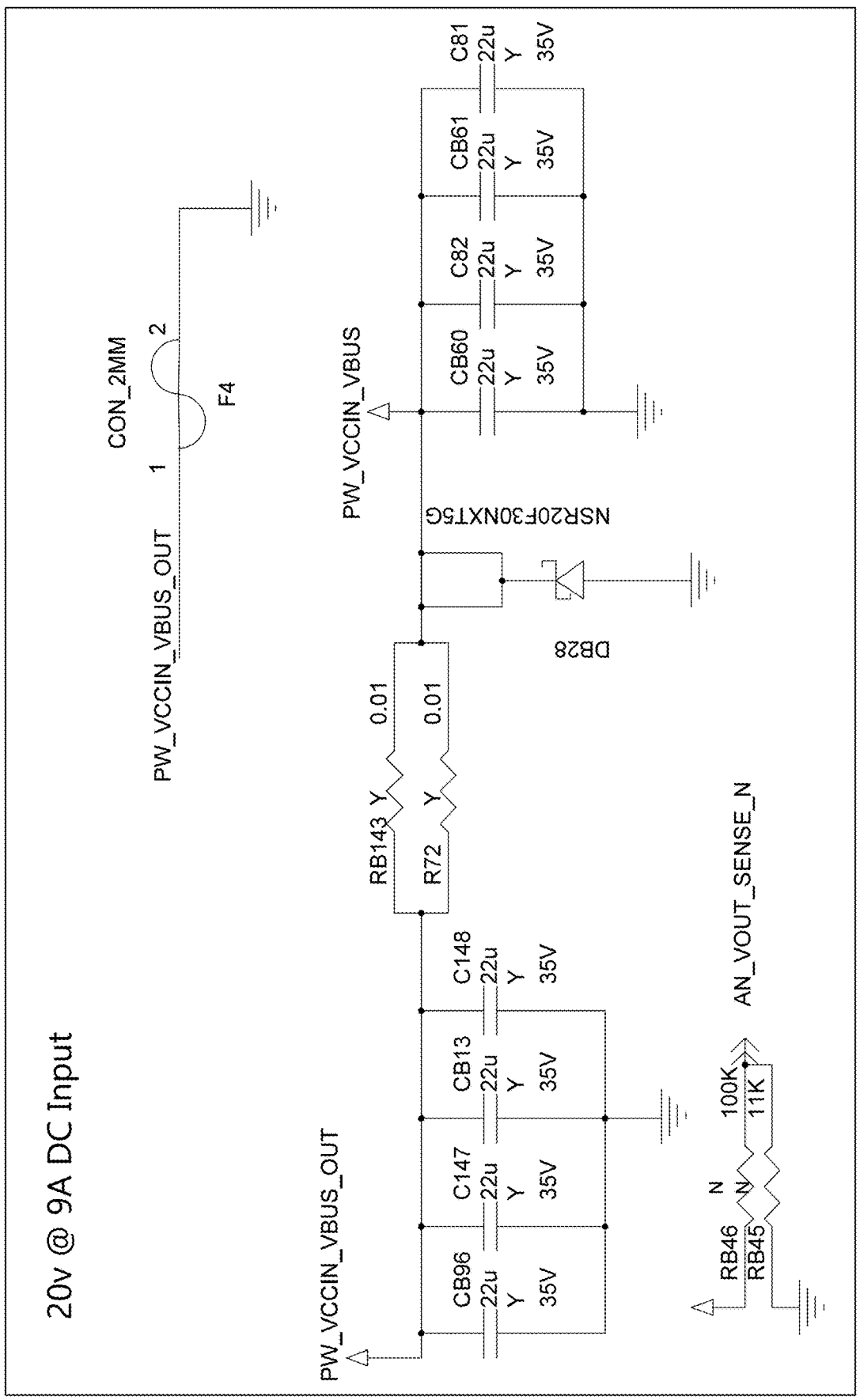
Figure 9E:
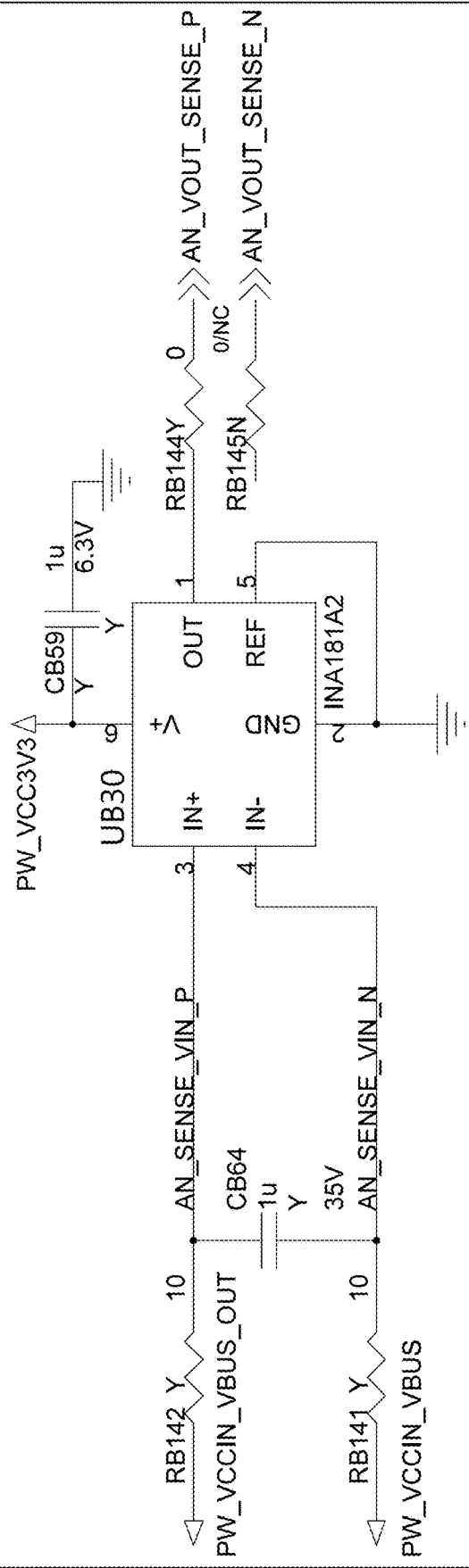
Figure 9F:
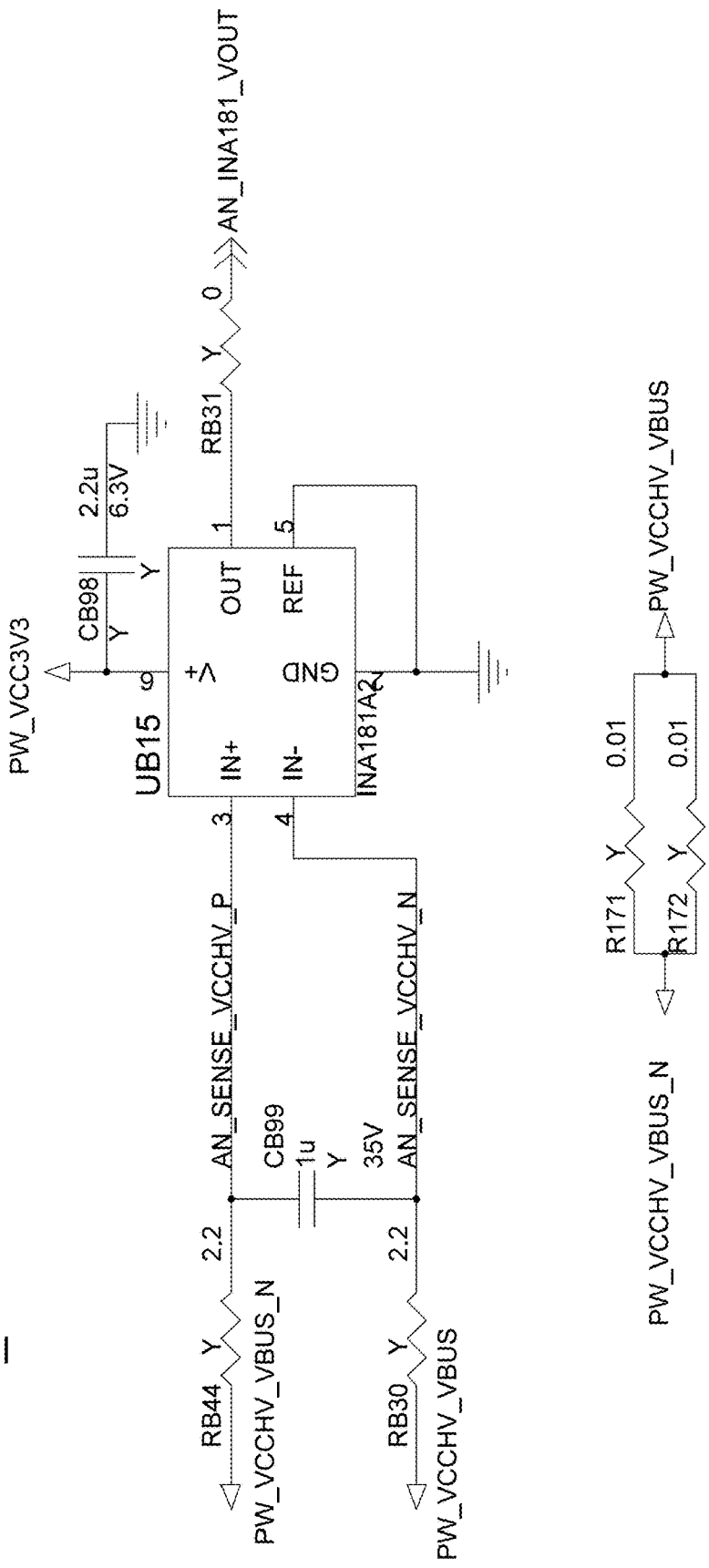
Figure 10A:
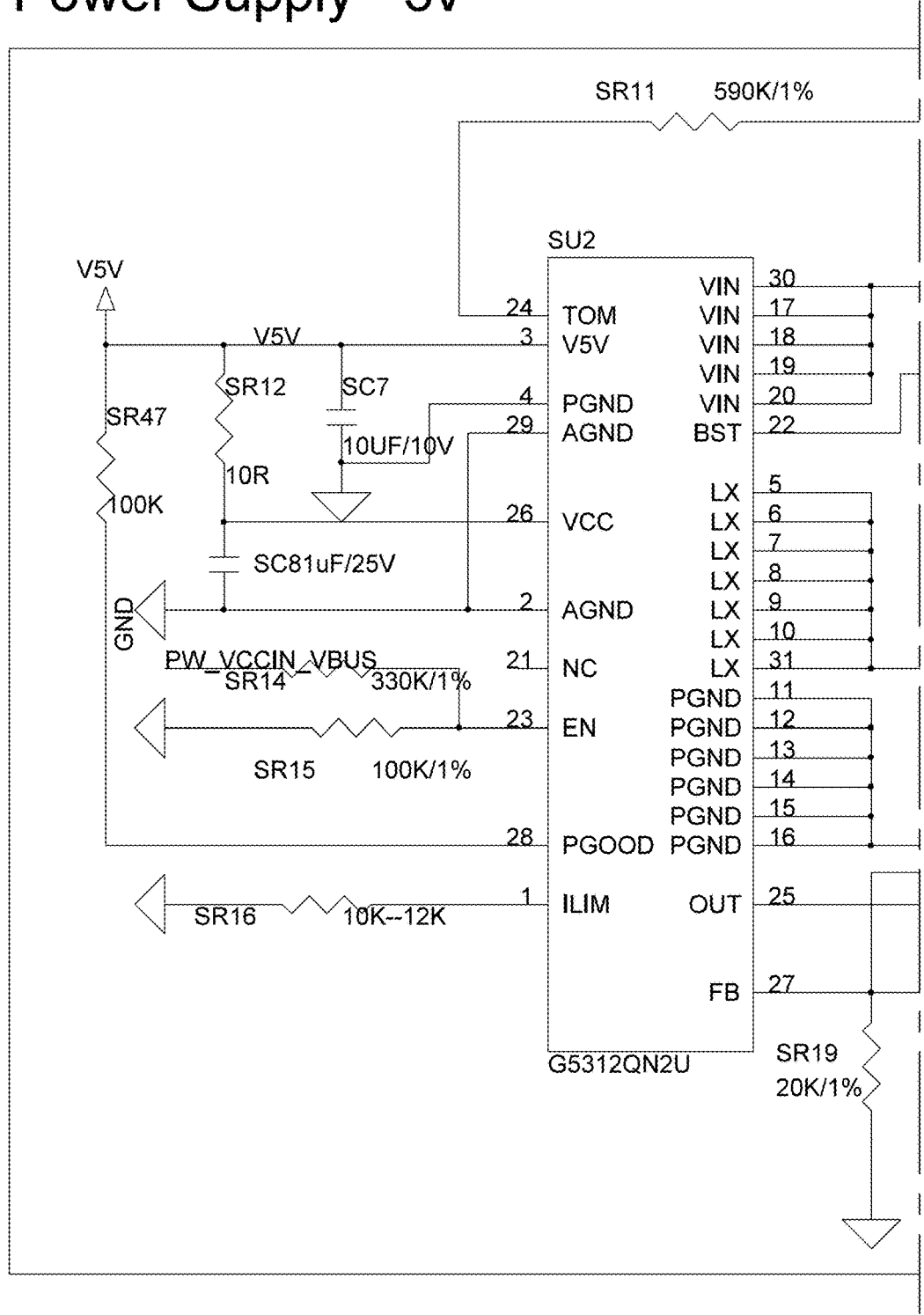
Figure 10B:
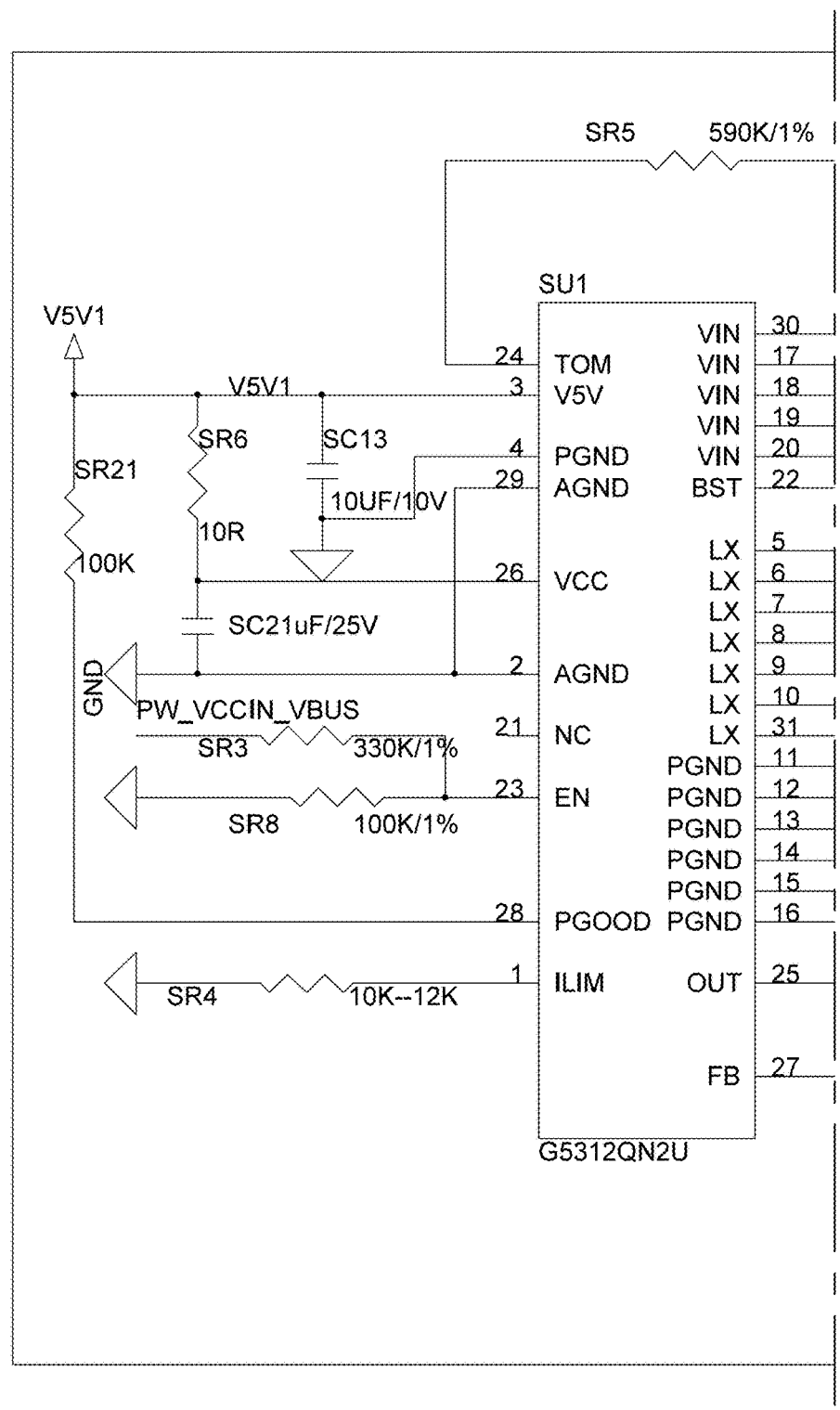
Figure 11A:
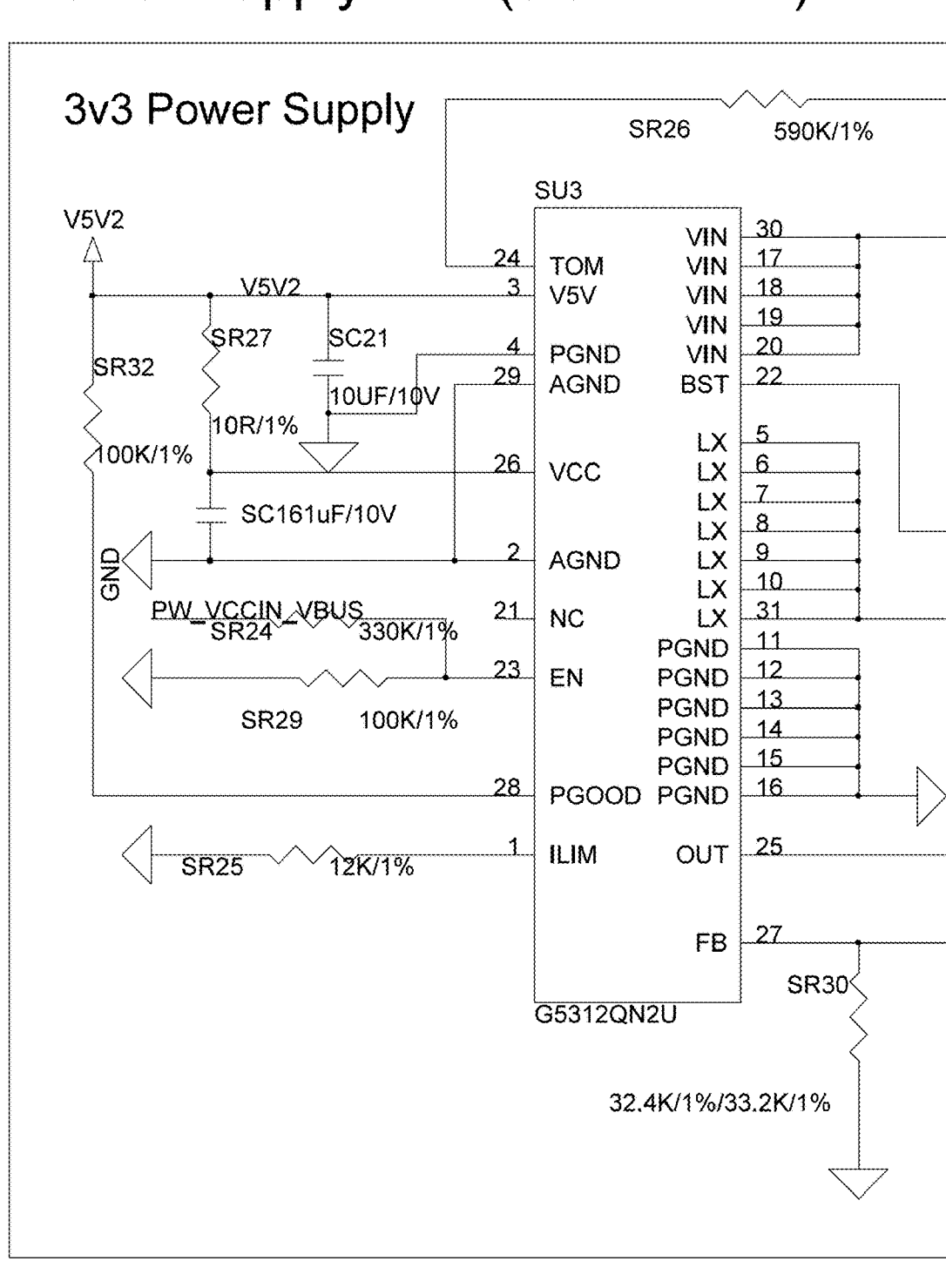
FIG. 11A, and FIG. 11B are schematic diagrams of power supply circuit principles of the first PCB circuit board UCNA8231A-A and the second PCB circuit board UCNA8231A-B of the universal docking station with high-speed data transmission and high resolution according to the embodiment of the present disclosure.
Figure 11B:
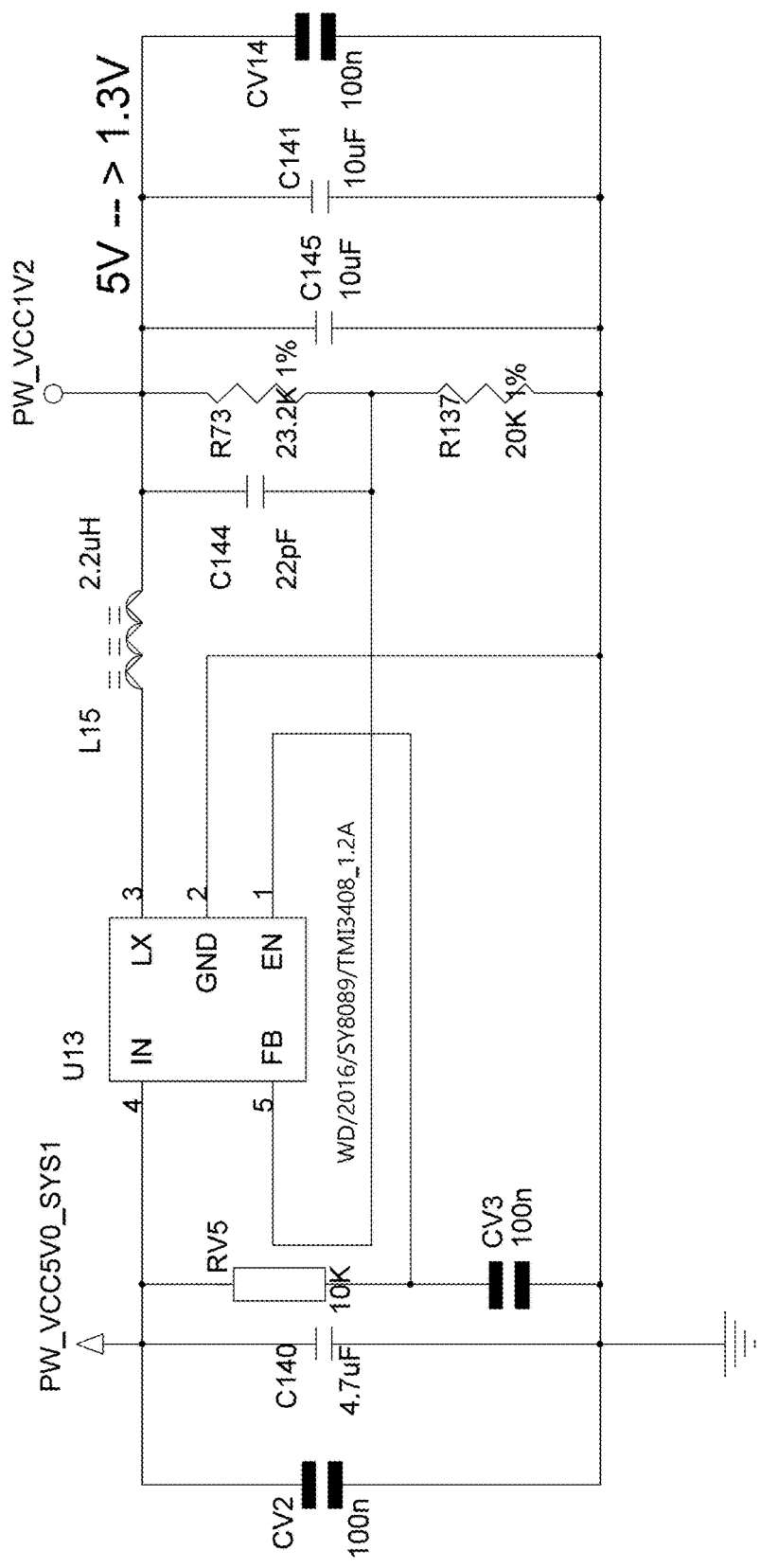
Figure 12A:
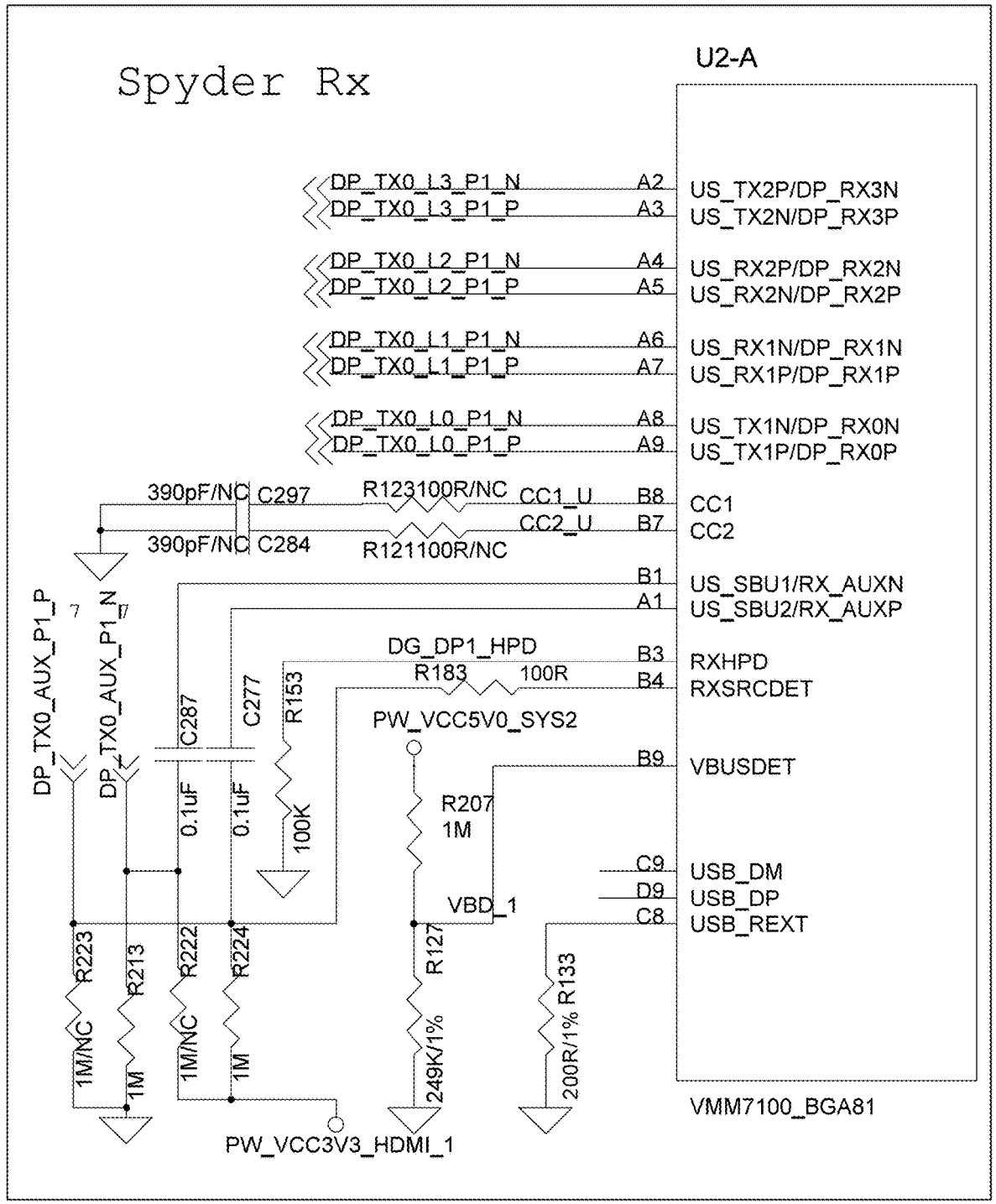
Figure 12C:
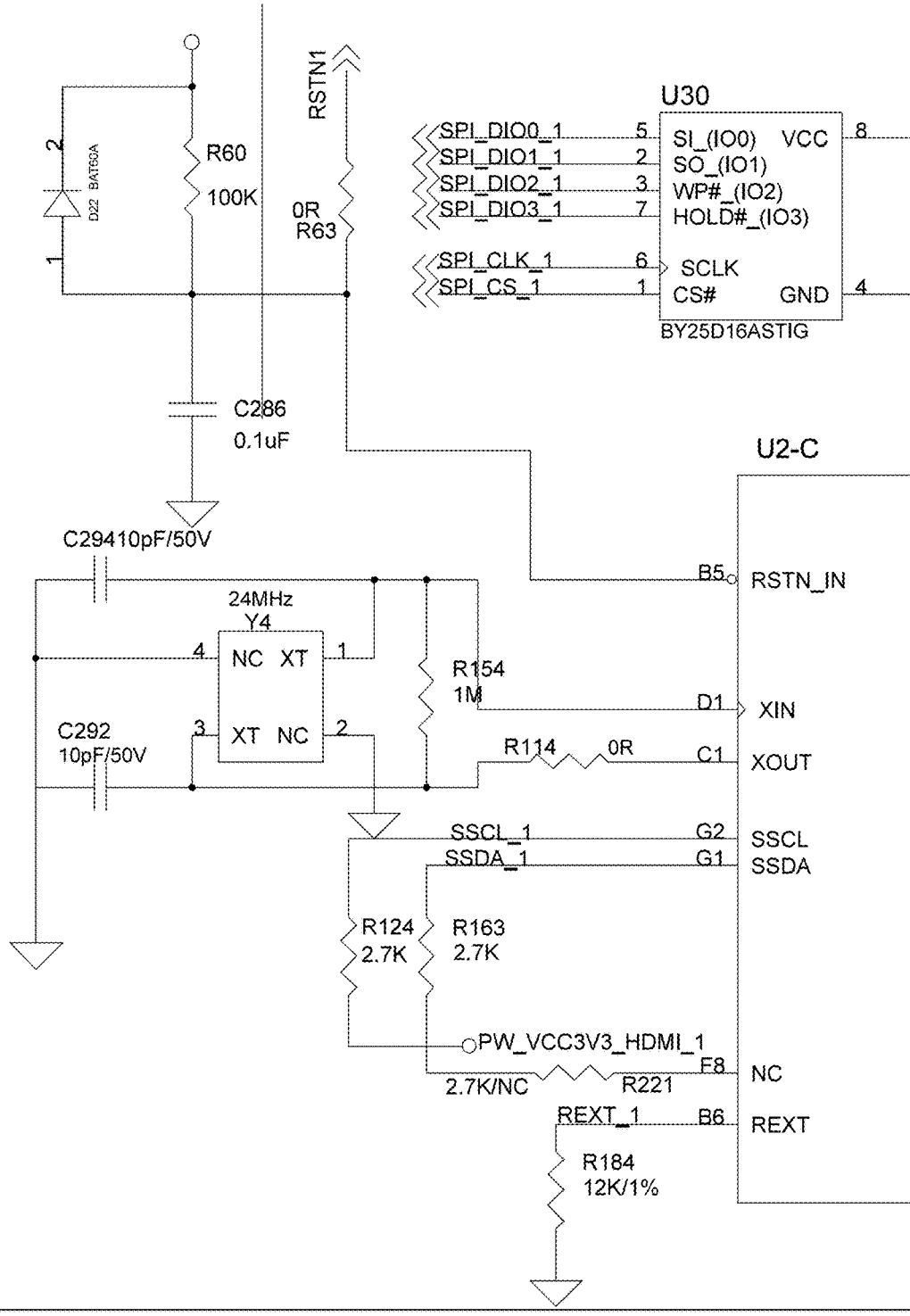
FIG. 12C, illustrate schematic diagrams of a video conversion circuit principle of the first PCB circuit board UCNA8231A-A and the second PCB circuit board UCNA8231A-B of the universal docking station with high-speed data transmission and high resolution according to the embodiment of the present disclosure.
Figure 13A:
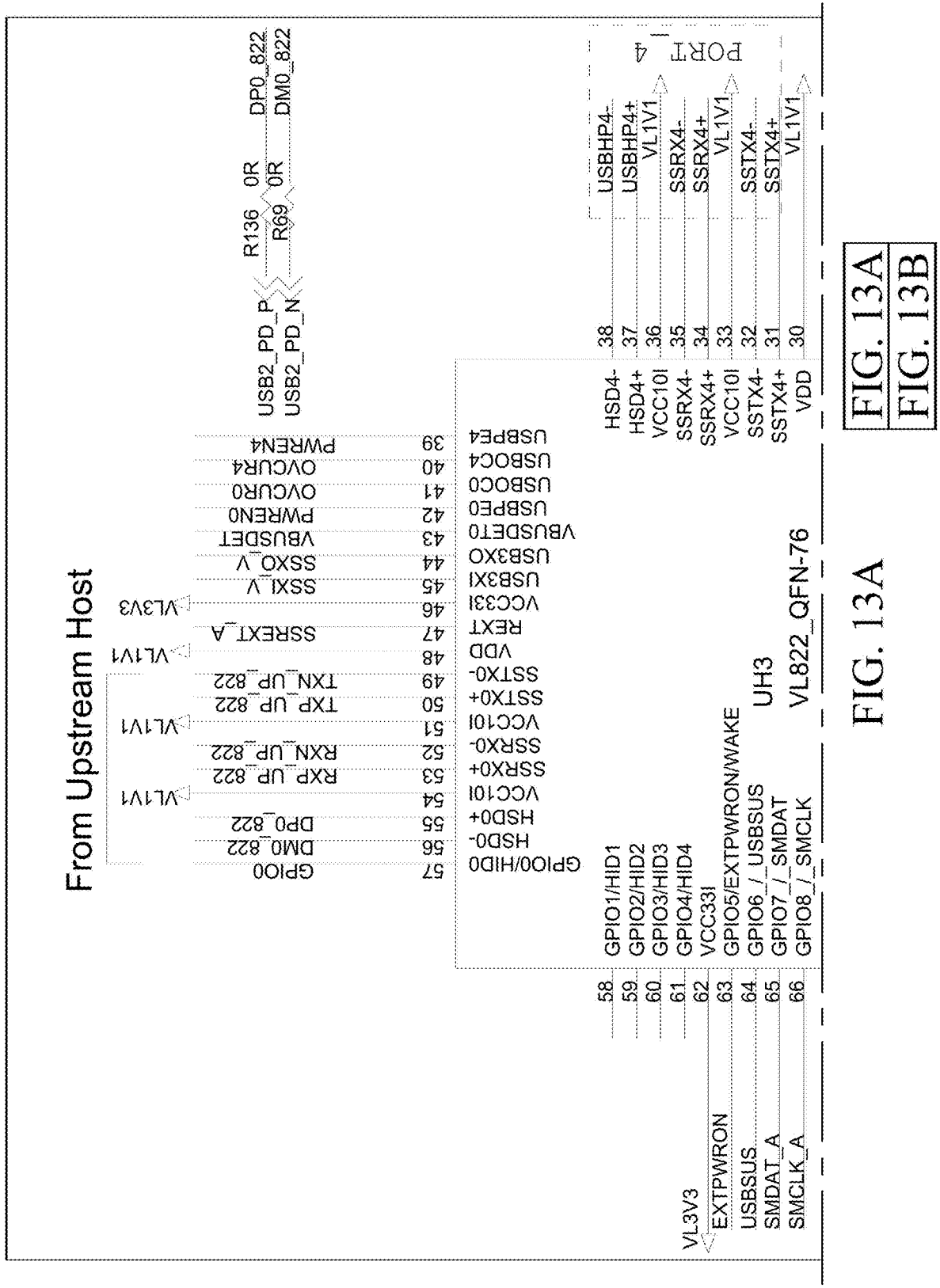
FIG. 13A, a partially broken away upper view, and FIG. 13B, a partially broken away lower view, collectively illustrate a schematic diagram of a first USB3.0 control circuit principle of the first PCB circuit board UCNA8231A-A of the universal docking station with high-speed data transmission and high resolution according to the embodiment of the present disclosure.
Figure 13B:
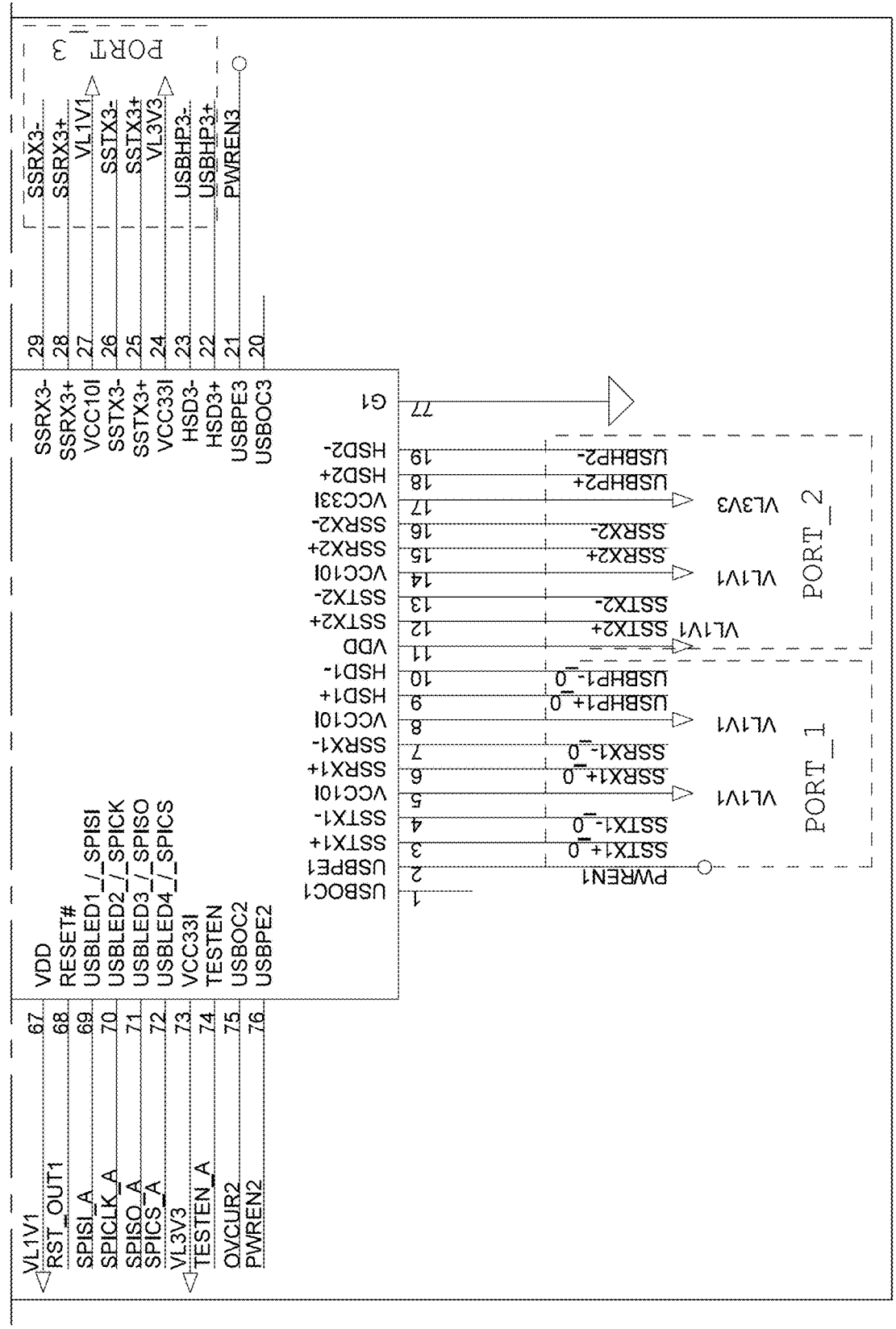
Figure 14A:
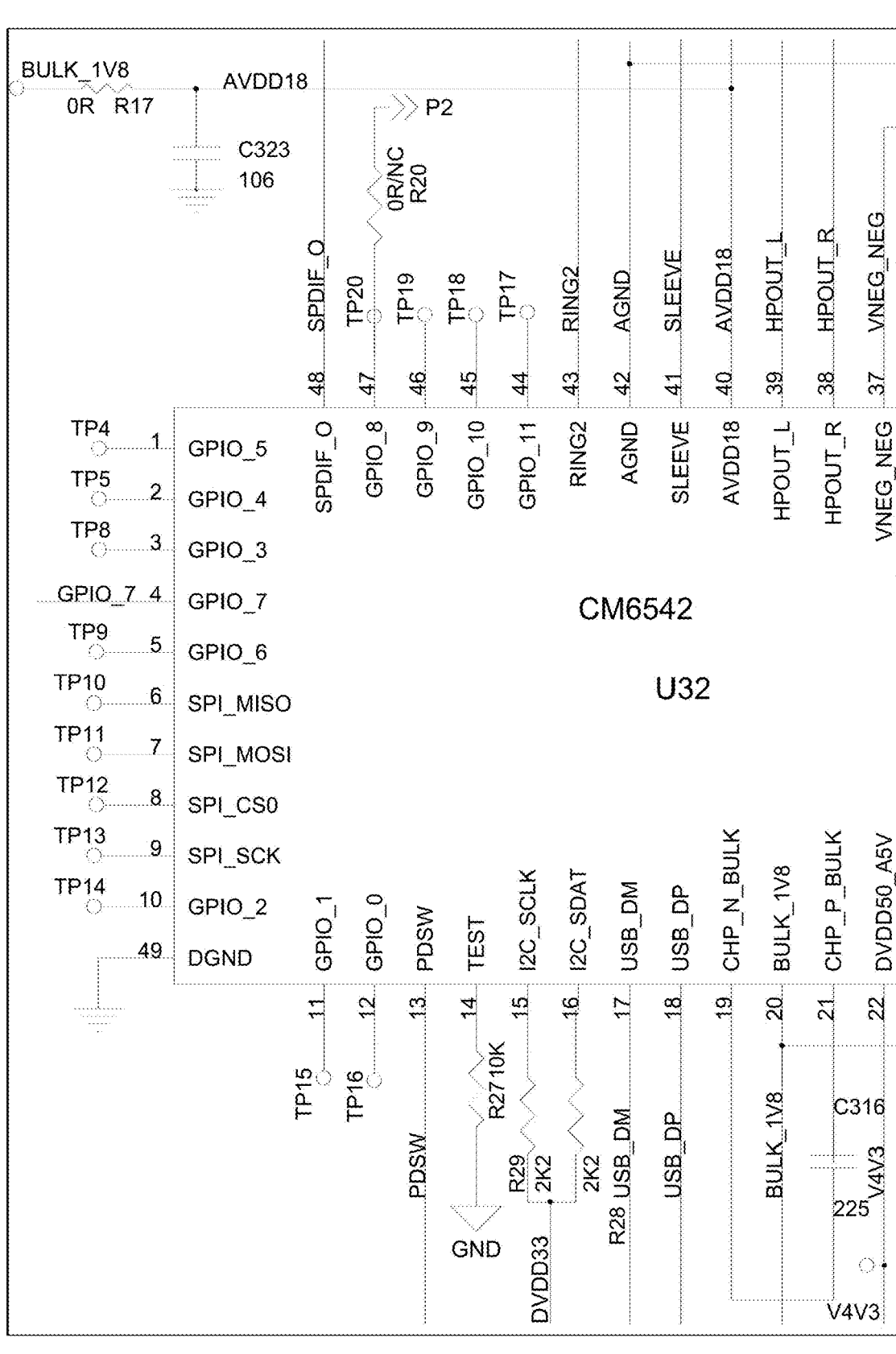
FIG. 14A, a partially broken away left view, and FIG. 14B, a partially broken away right view, collectively illustrate a schematic diagram of a sound recognition chip circuit principle of the first PCB circuit board UCNA8231A-A of the universal docking station with high-speed data transmission and high resolution according to the embodiment of the present disclosure.
Figure 14B:
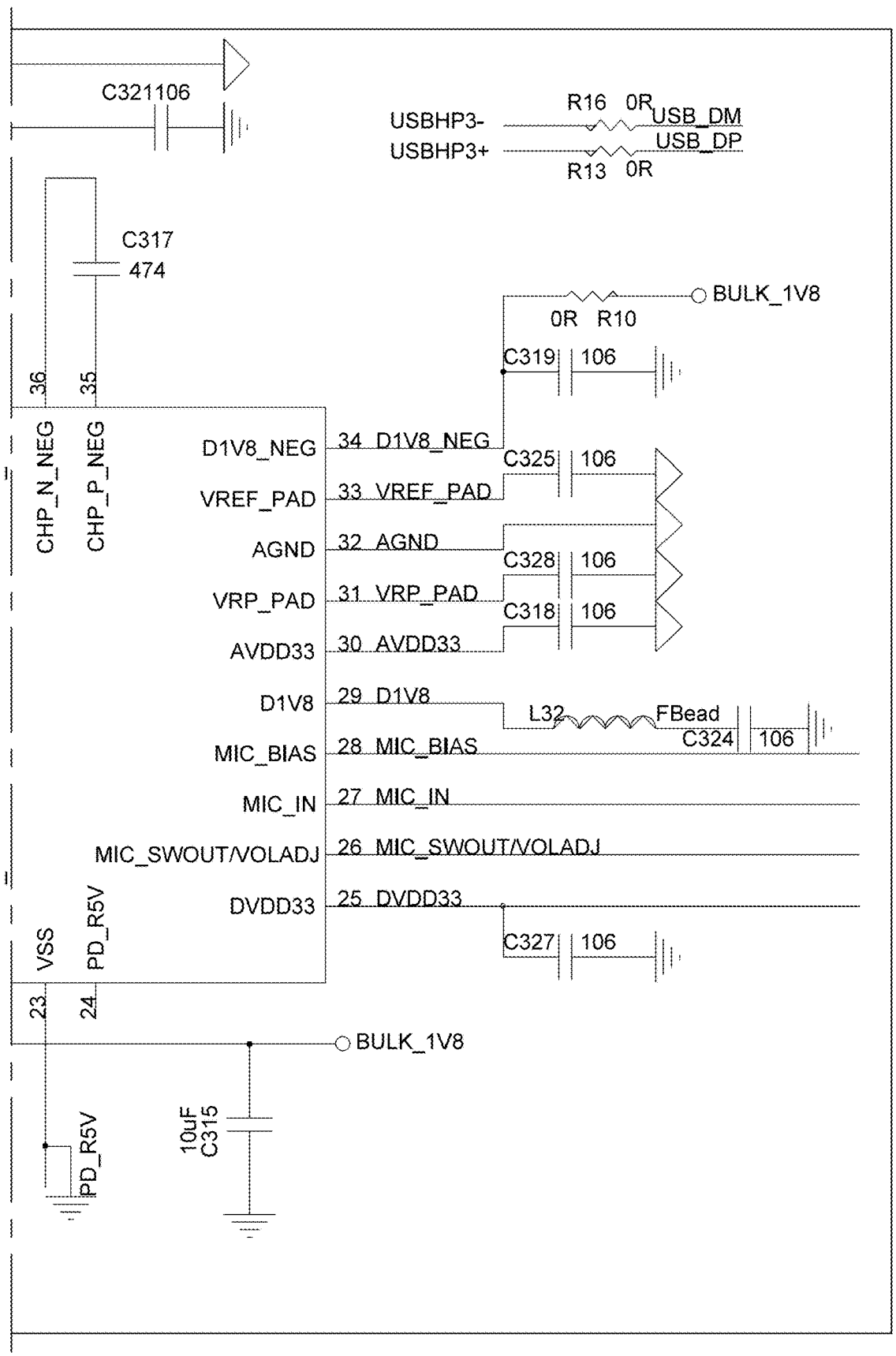
Figure 15A:
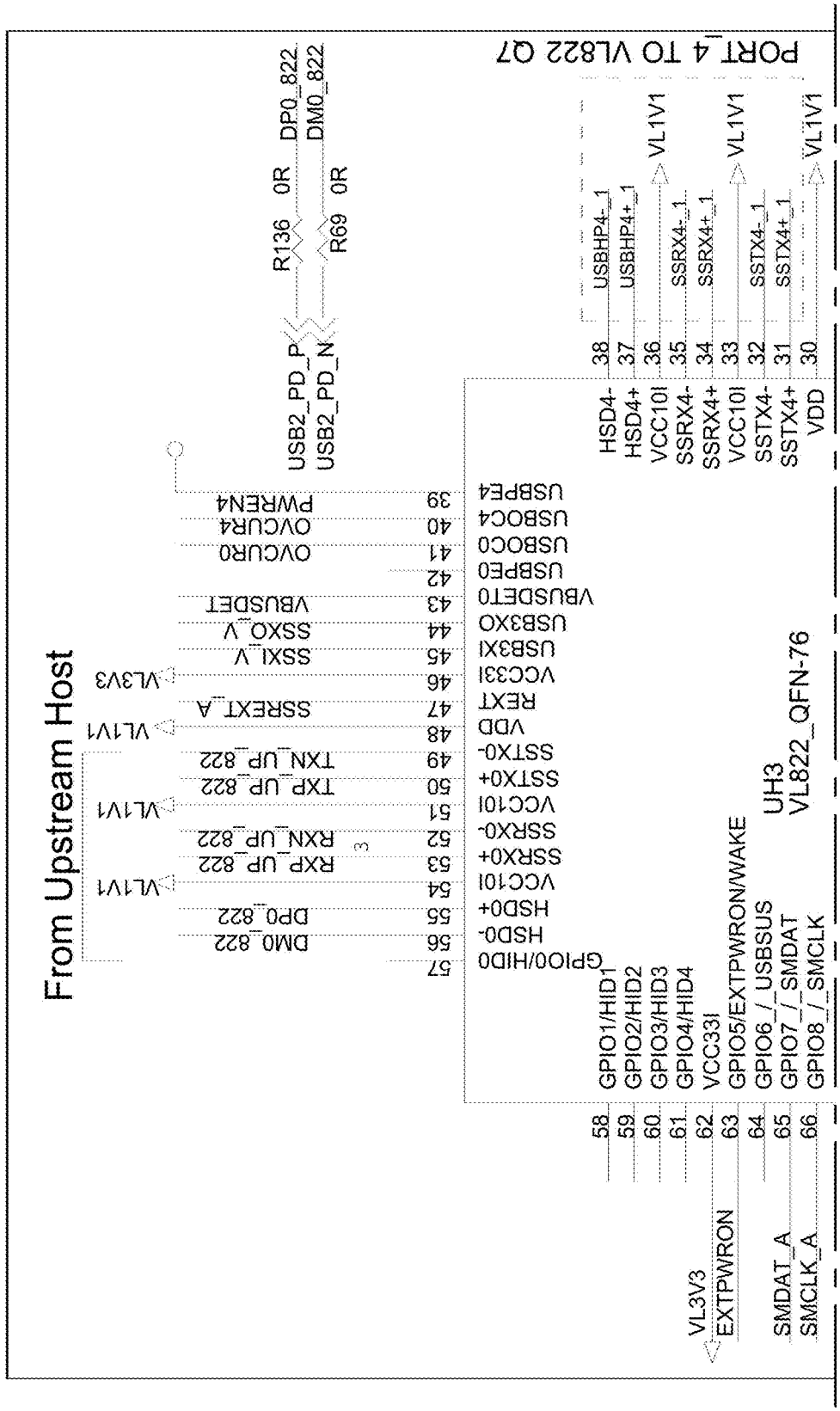
FIG. 15A, a partially broken away left view, and FIG. 15B, a partially broken away right view, collectively illustrate a schematic diagram of a first USB3.0HUB chip connection circuit principle of a second USB3.0 control circuit of the second PCB circuit board UCNA8231A-B of the universal docking station with high-speed data transmission and high resolution according to the embodiment of the present disclosure.
Figure 15B:
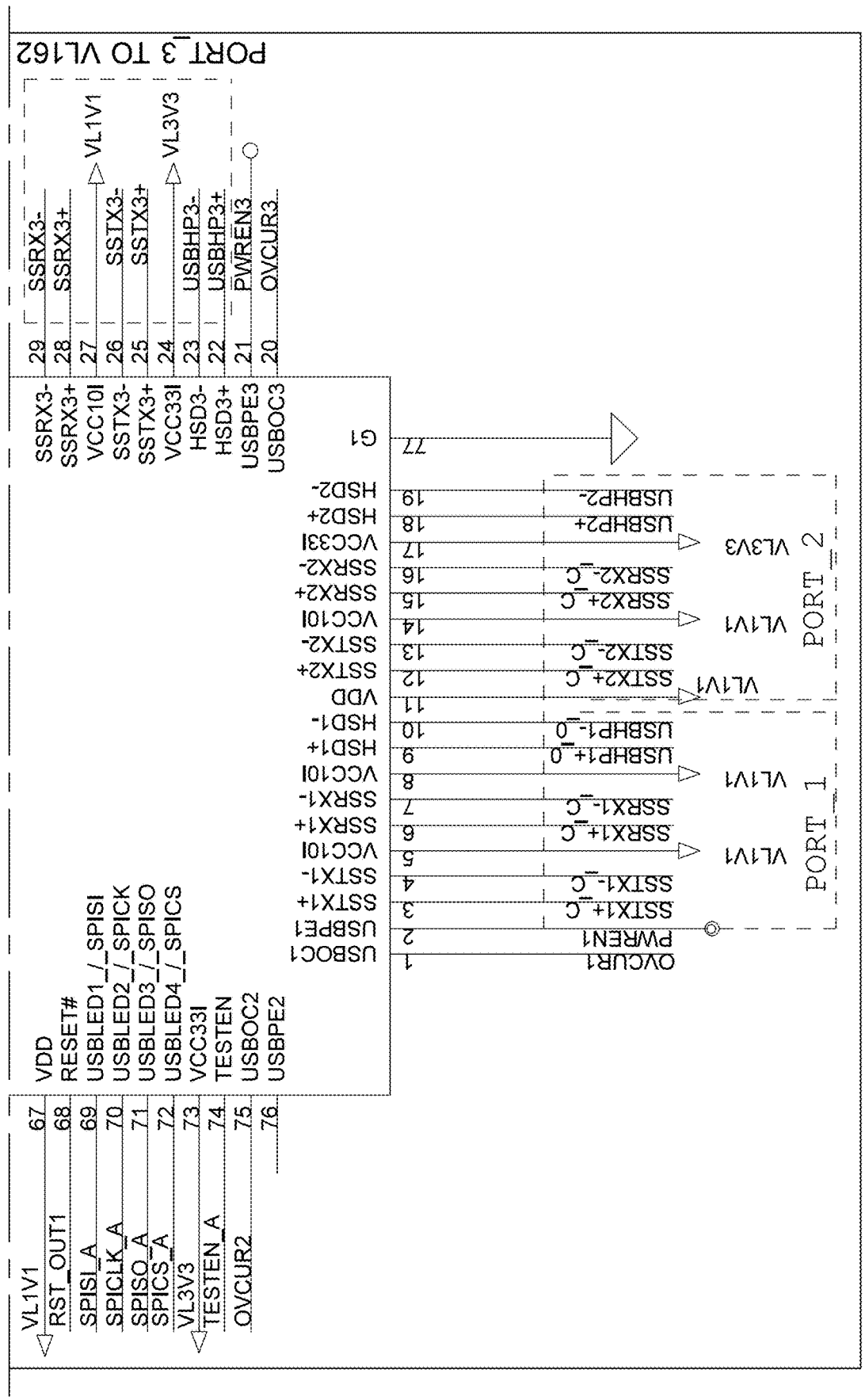
Figure 16A:
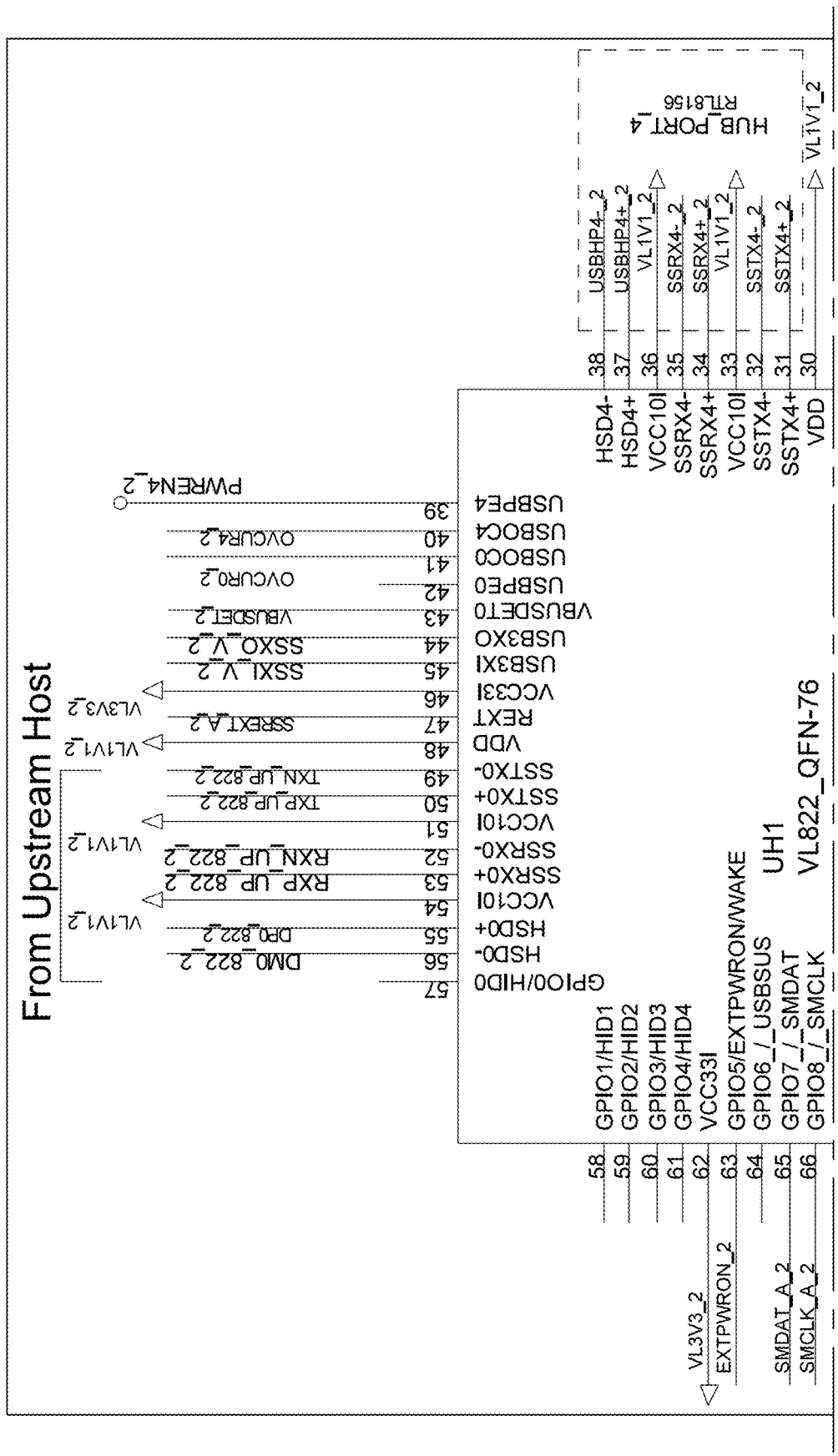
Figure 16B:
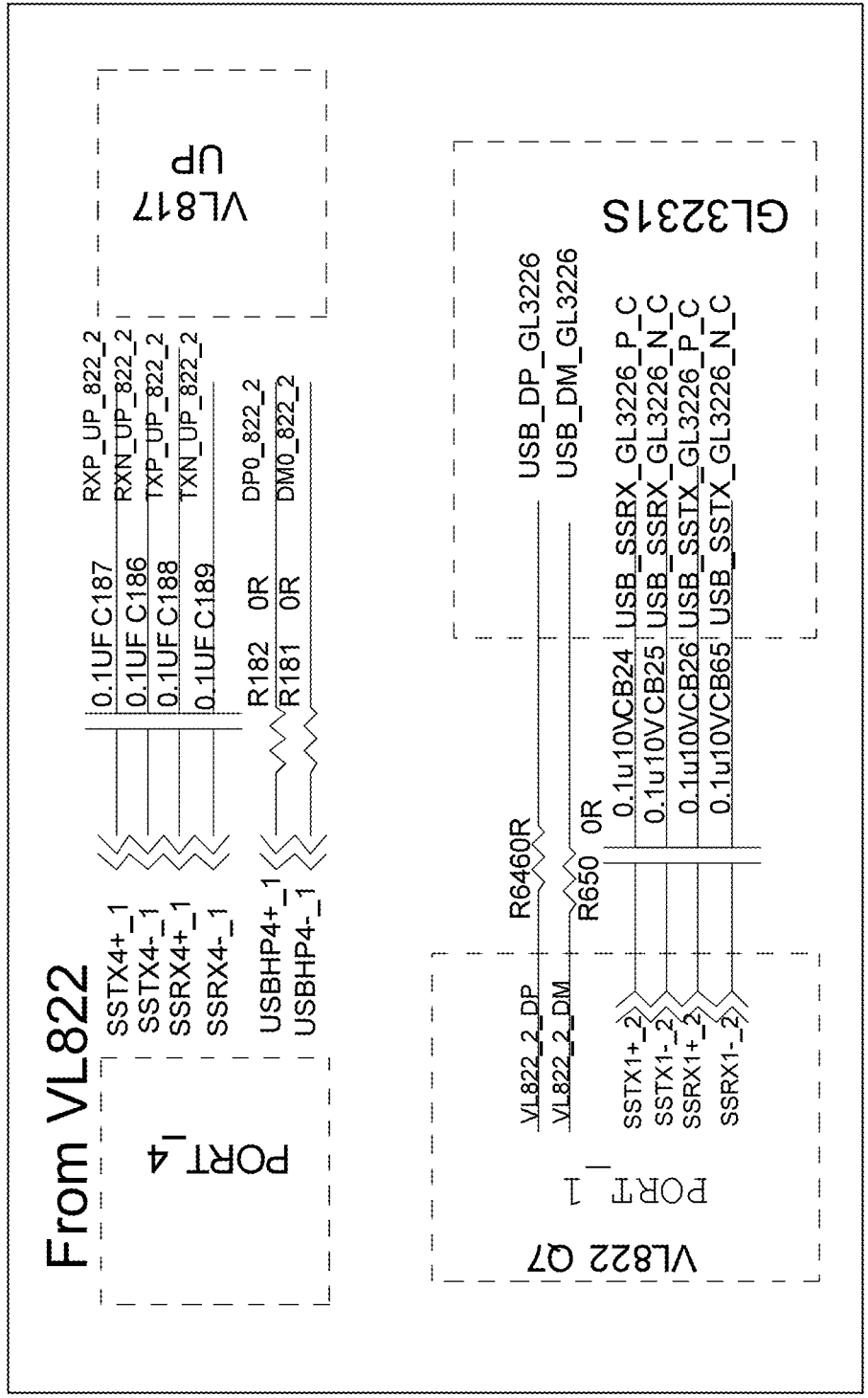
Figure 17B:
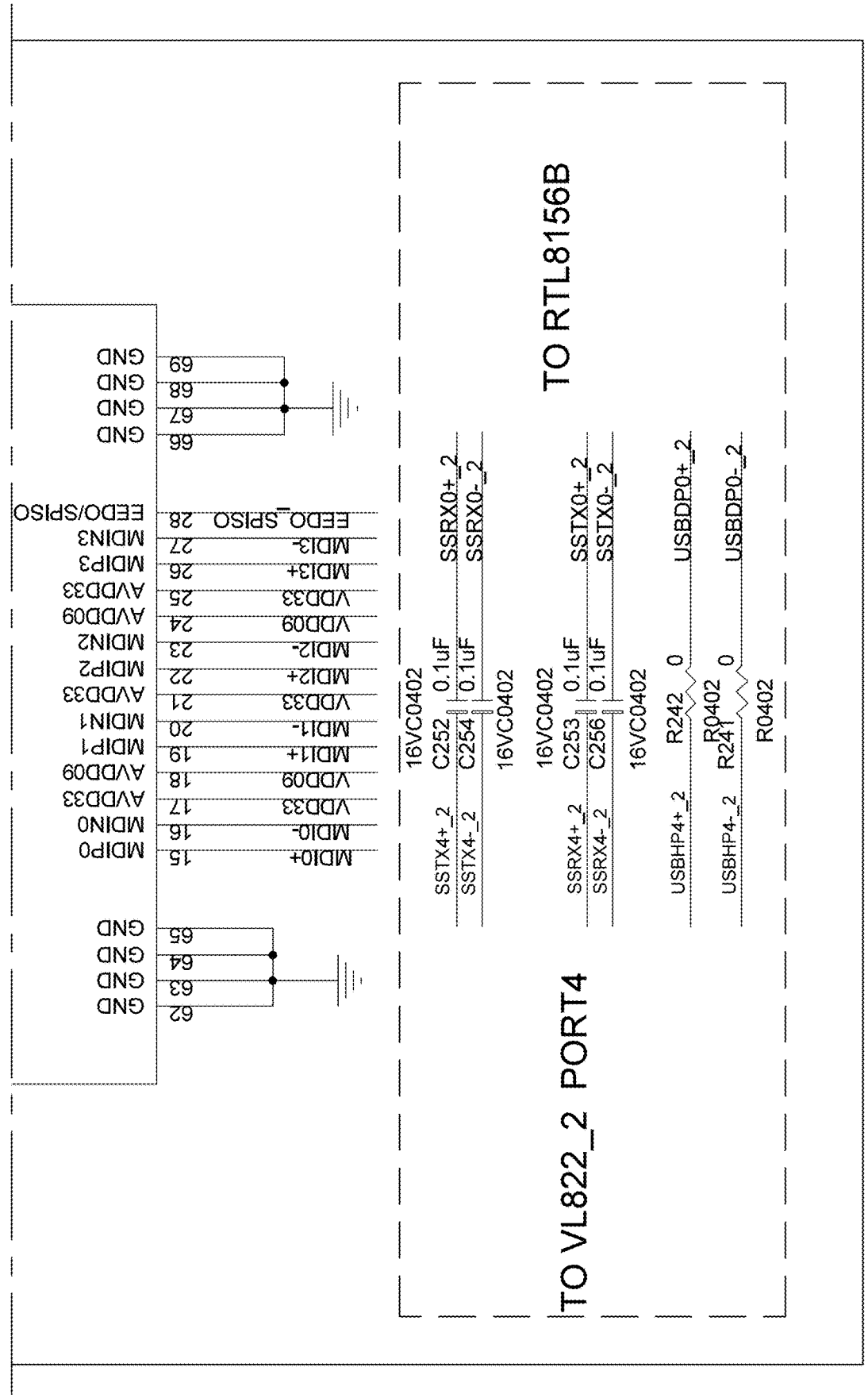
FIG. 17A, a partially broken away upper view, and FIG. 17B, a partially broken away lower view, collectively illustrate a schematic diagram of a network port circuit principle of the second PCB circuit board UCNA8231A-B of the universal docking station with high-speed data transmission and high resolution according to the embodiment of the present disclosure.
Figure 18A:
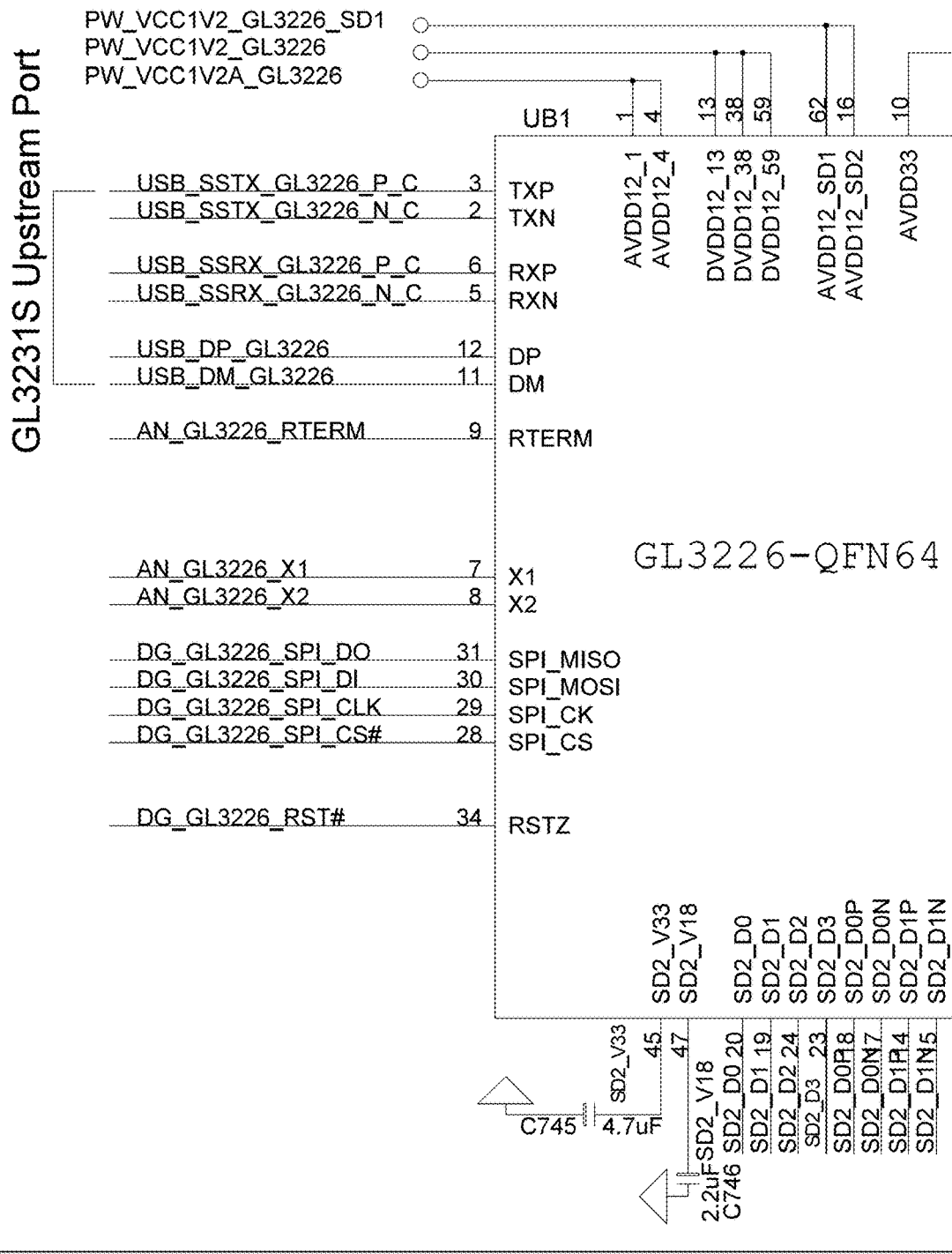
FIG. 18A, a partially broken away left view, and FIG. 18B, a partially broken away right view, collectively illustrate a schematic diagram of a card reader connection circuit principle of the second PCB circuit board UCNA8231A-B of the universal docking station with high-speed data transmission and high resolution according to the embodiment of the present disclosure.
Figure 18B:
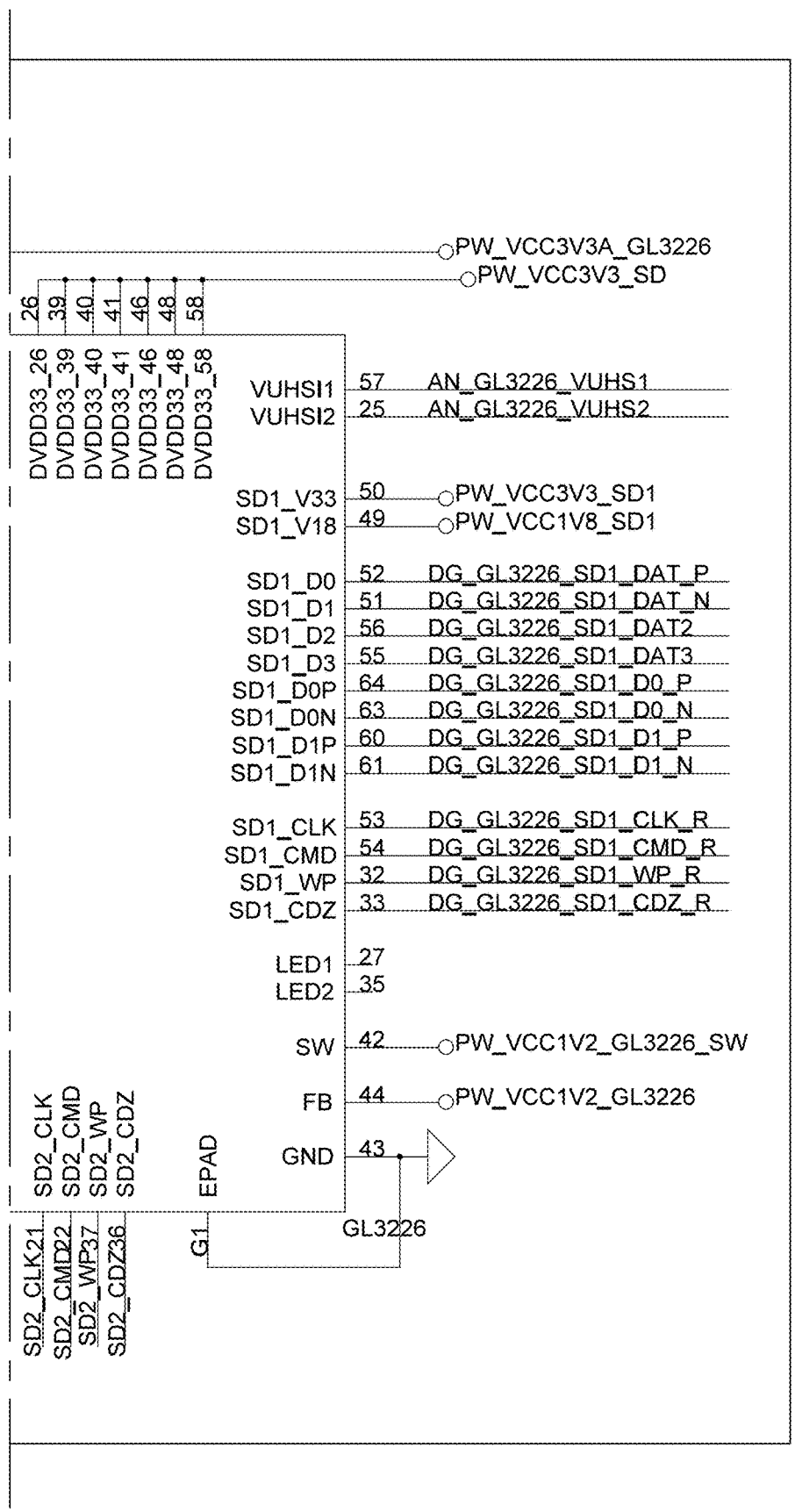
Figure 19:
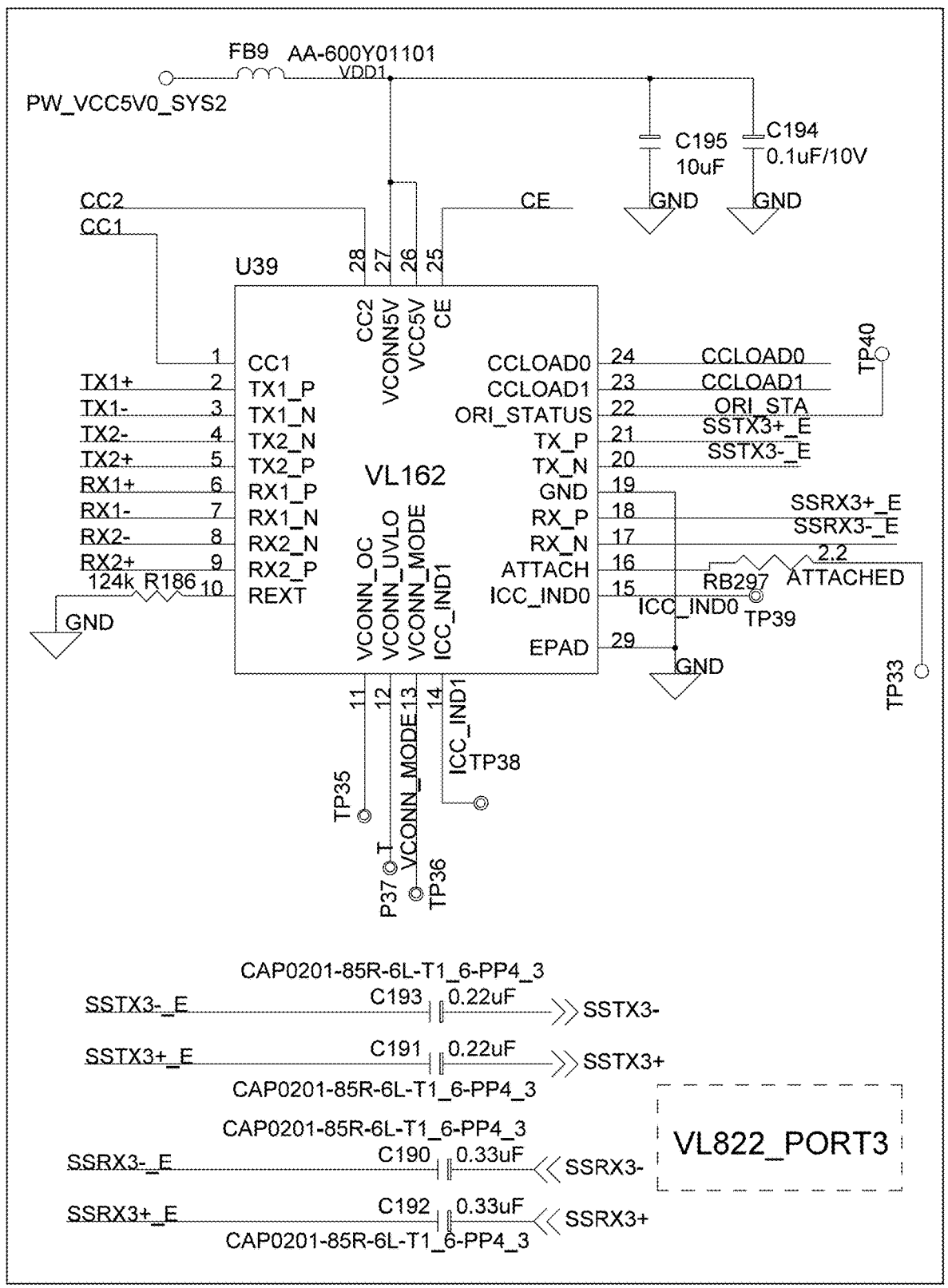
FIG. 19 is a schematic diagram of a differential channel multiplexer connection circuit principle of the second PCB circuit board UCNA8231A-B of the universal docking station with high-speed data transmission and high resolution according to the embodiment of the present disclosure.

As shown in FIGS. 1A to 19, in order to provide a universal docking station with high-speed data transmission and high resolution, and to adapt to the rapid development trend of science and technology, electronic products and residents' living standards, the present disclosure develops a universal docking station with high-speed data transmission and high resolution, and the overall planning plan is as follows.

The universal docking station with high-speed data transmission and high resolution is provided with a plurality of PCB circuit boards arranged in parallel. Each PCB circuit board is correspondingly connected to at least one TB4 upstream port, one or more TB4 downstream ports, at least one HDMI port, one or more USBA 10 G ports, and one or more USBC 10 G ports. Each PCB circuit board is correspondingly provided with a main control circuit, a PD control circuit, a video conversion circuit, a USB3.0 control circuit, a USB2.0 control circuit and a power management circuit. Each main control circuit includes a Thunderbolt 4 controller. At least one PCB circuit board is provided with a DC power input port to provide DC power correspondingly to the PCB circuit boards at the same time. At least two PCB circuit boards can be set up in parallel.

A computer can be connected through the TB4 upstream port to realize 40 G data transmission of the computer and 96 W PD charging power. The TB4 upstream port is connected to the TB4 downstream port through the main control circuit and PD control circuit, and display and storage devices can be connected through the TB4 downstream port to transmit 8K@30 video and 40 G data information, and provide 15 W charging power, so that transmission of input and output video signals and data signals converted by the main control circuit and PD control circuit can be realized.

The TB4 upstream port is connected to the HDMI port through the main control circuit and video conversion circuit. The HDMI port can transmit the input and output video signal converted by the main control circuit and video conversion circuit. An output effect can reach a maximum output of 8K@30, and extension, mirroring, main display rotation, etc., can be set.

The TB4 upstream port is connected to the USBA 10 G port through the main control circuit via the USB3.0 control circuit and the USB2.0 control circuit. USBA devices, USB flash drives, mice, etc., can be connected through the USBA 10 G port to transmit the input and output data information converted by the main control circuit, the USB3.0 control circuit and the USB2.0 control circuit.

The USBC 10 G port is also connected to the TB4 upstream port through the main control circuit via the USB3.0 control circuit and the USB2.0 control circuit. Through the USBC 10 G port, the 10 G USBC device and the PD device can be connected, and the USBC type device can also be connected, thereby realizing the transmission of the input and output data information converted by the main control circuit, the USB3.0 control circuit and the USB2.0 control circuit.

Further, each power management circuit includes a DC power input module and a system power processing module, respectively. The DC power input module is configured to convert a 22V, 8.18 A DC power input from the DC power input port DCIN into system operating voltages with different parameters.

The system power processing module is configured to process and convert the system operating voltage into operating voltages with different parameters for each circuit module processing unit.

Further, each PD control circuit is provided with a number of PD controllers corresponding to a number of TB4 downstream ports. Each TB4 upstream port is connected to the TB4 downstream port through the Thunderbolt 4 controller and the PD controller.

Each video conversion circuit is provided with a video conversion chip. Each TB4 upstream port is connected to the HDMI port through the Thunderbolt 4 controller and the video conversion chip.

Embodiment 1

The universal docking station with high-speed data transmission and high resolution of the present embodiment specifically includes a first PCB circuit board UCNA8231A-A and a second PCB circuit board UCNA8231A-B in parallel, in which a total of two PCB circuit boards are provided. Each of the first PCB circuit board and the second PCB circuit board is correspondingly connected to one TB4 upstream port, two TB4 downstream ports and one HDMI port. The first PCB circuit board is correspondingly connected to three USBA 10 G ports. The second PCB circuit board is correspondingly connected to two USBA 10 G ports.

The second PCB circuit board is also connected to two USBC 10 G ports. One of the USBC 10 G ports is compatible with the USBC10G+PD 30 W port with PD charging function, specifically a 10 G USBC+30 Watt PD charging port, which can be connected to 10 G USBC devices and PD devices, such as connecting mobile phones to transmit data and charge mobile phones.

The main control circuit, the video conversion circuit, the PD control circuit and the USB2.0 control circuit are correspondingly provided on each of the first PCB circuit board and the second PCB circuit board. That is, structure principles for the main control circuit, the video conversion circuit, the PD control circuit and the USB2.0 control circuit on the first PCB circuit board UCNA8231A-A and the second PCB circuit board UCNA8231A-B are exactly the same.

The difference lies in that structural principles of the USB3.0 control circuit and the power management circuit on the first PCB circuit board and the second PCB circuit board are different. A first USB3.0 control circuit and a first power management circuit are also provided on the first PCB circuit board. A second USB3.0 control circuit and a second power management circuit are also provided on the second PCB circuit board.

A main structure of each main control circuit is provided with a Thunderbolt 4 controller U7, and the Thunderbolt 4 controller U7 uses a Goshen_Ridge_A1 chip.

The TB4 upstream port is connected to a UFP port of the Thunderbolt 4 controller U7, i.e., a TBT-A terminal or a PA port. A fourth DP signal port TBT-D of the Thunderbolt 4 controller U7 is connected to the HDMI port through the video conversion chip U2 and a RXTX communication line.

The video conversion chip U2 uses a VMM7100_BGA81 chip, which is a Type-C/DP to HDMI 2.1 8K adapter chip. The VMR7100/VMM7100 Type-C/DP to HDMI 2.1 8K design solution includes a Type-C/DP to HDMI 2.1 8K video conversion chip, and supports bidirectional PD3.0.

The VMM7100 is a highly integrated US-C t modeDP HBR3 to HDMI21 video adapter with an embedded PD controller and offers maximum bandwidth and advanced features from the latest video interface standards. The VMM7100 features a USB-C input port that supports DiSalvo Album, accepts four channels of DisplayPort™ video, is provided with built-in CC circuitry and analog front end (AFE), has flexible channel switching options, and supports reversible and flip orientation of the standard USB-C connector. A receiving port thereof supports DisplayPort transmission streams up to HBR3 data rate. HDMI2.1TX supports FRL mode operation up to 12.0 Gbps per channel in three or four channel configurations and is backward compatible with HDMI2.0 TMDS mode with data rates up to 6.0 Gbps per channel.

The VMM7100 transmits compressed and uncompressed audio and video streams. DP DSC1.11.2a compressed streams can be decoded to uncompressed format, or transmitted in DSC over a connected HDMI sink. A DSC decoder in the VMM7100 supports fractional compression ratios of 2:1, 3:1 and RGB/YCC pixel formats up to 12 bpc color depth. The VMM7100 complies with VESA DP-HDMI2.1PCON enumeration configuration improvement specification, and provides secure reception and transmission of high dynamic range content via HDR10, HDR10+ and Dolby Vision™ metadata transmission and advanced gaming features. The VMM7100 also supports DP1.4a and HDMI2.1 audio streaming, including Dolby ATMOS and DTS:X® formats.

The VMM7100 supports upstream-oriented USB2.0 device interface with bulletin board and HID-like functions. The bulletin board reports the device's standby mode capabilities to USB host systems that are unable to support standby mode.

The VMM7100 includes a built-in hardware root of trust for enhanced device security, as well as an industry-standard HDCP 1.4/2.3 AES engine for content protection.

A number of the PD control circuit corresponds to the two TB4 downstream ports. That is, two PD controllers are provided, namely a PD controller UB14 and a PD controller UB20. Both PD controller UB14 and PD controller UB20 use CCG5 controllers, specifically a CYPD5235 port controller. The PD I2C port of Thunderbolt 4 controller U7 is connected to each PD controller through a PD I2C protocol bus. Each of the first PCB circuit board UCNA8231A-A and the second PCB circuit board UCNA8231A-B is correspondingly provided with two TB4 downstream ports of a first TB4 downstream port P-C. Each PD controller is connected to the TB4 upstream port and each TB4 downstream port through a CC fast charging cable.

Each of the second DP signal port TBT-B and the third DP signal port TBT-C of the Thunderbolt 4 controller U7 is also directly connected to the first TB4 downstream port P-B and the second TB4 downstream port P-C of the first TB4 downstream port through the RXTX communication line.

A main structure of the USB2.0 control circuit (USB2.0 HUB) is a USB2.0 control chip UB6, specifically using a FS5801 control chip. Main structures of the first USB3.0 control circuit (10 G USB HUB) and the second USB3.0 control circuit (10 G USB HUB) are correspondingly a first USB3.0HUB chip UH3, specifically using a VL822Q7 USB3.0HUB chip. The U2_P0_D+D-port of the USB2.0 control chip UB6 is connected to the USB2.0 port of the Thunderbolt 4 controller U7, and a first U2 D+D-port of the USB2.0 control chip UB6 is connected to the TB4 upstream port. A second U2 D+D-port of the USB2.0 control chip UB6 is connected to the first USB3.0HUB chip UH3. A third U2 D+D-port and a fourth U2 D+D-port of the USB2.0 control chip UB6 are connected to the two TB4 downstream ports. A fifth U2 D+D-port of a USB2.00 HUB chip UH3 is connected to a dock management controller DMC. A main structure of the terminal management controller DMC is a CY7C65219 chip UB8. That is, the dock management controller DMC adopts CY7C65219-40LQXIT dock management controller (DMC). The dock management controller DMC is connected to a W25Q16JV memory through a SPI port, and the Thunderbolt 4 controller U7 is connected to the W25Q16JV memory through a GR SPI port.

Each PD controller is also directly connected to the dock management controller DMC.

The USB2.0 control chip UB6 is also connected to each PD controller through a DMC I2C protocol bus. A main structure of the USB2.0 control chip UB6 is a FL5801-1Q1 chip.

Further, each of the first USB3.0HUB chip UH3 of the first USB3.0 control circuit and the second USB3.0 control circuit is directly connected to a port E port of the Thunderbolt 4 controller U7 through the RXTX communication line.

The USB3.0HUB chip UH3 of the first USB3.0 control circuit is connected to three USBA 10 G ports through three P-type data lines.

The first USB3.0HUB chip UH3 of the second USB3.0 control circuit is connected to the USBC 10 G port compatible with PD charging function through two P-type data lines. The first USB3.0HUB chip UH3 of the second PCB circuit board is connected to another USBC 10 G port through a differential channel multiplexer through the third P-type data line. The differential channel multiplexer adopts a VL162 USB Type-C 2:4-channel differential multiplexing switch.

The first USB3.0HUB chip UH3 of the second USB3.0 control circuit is connected to the two USBA 10 G ports via the second USB3.0HUB chip UH1 through two P-type data lines. The second USB3.0HUB chip also uses the VL822Q7 USB3.0HUB chip. The two USBA 10 G ports are connected to the second downstream port P2 and the third downstream port P3 of the second USB3.0HUB chip UH1.

Further, an SD/TF port 4.0SD/TF and a network port 2.5 G LAN are also connected to the second PCB circuit board. A 4.0 TF card can be connected through the 4.0SD/TF port 4.0SD/TF and is backward compatible. A wired network can be connected through the network port 2.5 G LAN and is backward compatible.

The 4.0SD/TF port 4.0SD/TF is specifically connected to the second USB3.0HUB chip UH1 via one P-type data line through the card reader. A main structure of the card reader is a card reader chip GL3231S-QFN64. An upstream port of the card reader chip GL3231S-QFN64 is connected to a first downstream port P1 of the second USB3.0HUB chip UH1.

The network port 2.5 G LAN is specifically connected to the second USB3.0HUB chip UH1 via another P-type data line through the network port chip RTL8156B (RJ45). An upstream port of the network port chip RTL8156B is connected to a fourth downstream port P4 of the second USB3.0HUB chip UH1.

Further, the first PCB circuit board is also connected to a headset port MIC+EAR, a single audio output port EAR and an optical fiber connection port SPDIE. The headset port MIC+EAR, the single audio output port EAR and the optical fiber connection port SPDIE are correspondingly connected to the first USB3.0HUB chip UH3 through a sound recognition chip U32 (sound recognition chip USB2.0 Audio). The voice recognition chip U32 specifically uses a CM6542 ultra-low power audio single chip.

Finally, the DC power input port DCIN is provided on the second PCB circuit board. The first power management circuit of the first PCB circuit board and the second power management circuit of the second PCB circuit board are both connected to the DC power input port DCIN. The first PCB circuit board UCNA8231A-A and the second PCB circuit board UCNA8231A-B are simultaneously provided with power through the DC power input port DCIN. Each of the first power management circuit and the second power management circuit is correspondingly provided with a fifteenth power management chip U15 and an eighteenth power management chip U18. The fifteenth power management chip U15 and the eighteenth power management chip U18 both use G517G1TP1U/G517G1TO1U power management ICs.

A main structure of each of the first power management circuit and the second power management circuit is correspondingly provided with a twenty-third buck-boost IC converter U23, a thirtieth operational amplifier UB30, a fifteenth operational amplifier UB15, a first synchronous buck converter SU1, a second synchronous buck converter SU2 and a third synchronous buck converter SU3. The above-mentioned step-down and voltage-stabilizing arithmetic processor and the like provide each system chip with appropriate power supply voltages with different rated parameters that meet normal working requirements.

The specific buck-stabilizing arithmetic processor and the like can directly adopt conventional structures in the prior art. For example, the twenty-third buck-boost IC converter U23 adopts an integrated circuit IC chip MP2491C. The thirty operational amplifier UB30 and the fifteen operational amplifier UB15 both use INA181A2 current sensitive amplifiers. The first synchronous buck converter SU1, the second synchronous buck converter SU2 and the third synchronous buck converter SU3 all use G5132QN2U operational amplifiers. Further, a thirteenth synchronous buck chip U13 is provided. The thirteenth synchronous buck chip U13 uses a synchronous low-voltage buck chip IC, specifically WD/2016/SY8089/TMI3408_1.2 A, that is, TMI 3408C*SOT23-5 input 2.5V-5.5V output 1.2 A 1.5 MHz Vfb 0.6V OVP 6.2V DC DC synchronous low voltage buck chip IC.

Through the step-down voltage stabilizing operation processor, etc., 5.29 v@6 A, 3.34 v@4.7 A, 1.3V, 30V/13 A, 5 v@3 A, 5 v/9 v/15 v/20 v@4.8 A, PW_VCC3V3 and other parameters power supply can be provided after being converted and processed.

The universal docking station with high-speed data transmission and high resolution of the present disclosure is also provided with LED indication circuits, namely Debug LEDs, which indicate various operations, tests, faults, and other conditions through LED indicators.

The specific circuit principle structure of each USBC port adopts a USBC Receptacle connector, that is, a USB Type C Receptacle-connector.

The universal docking station with high-speed data transmission and high resolution of the present disclosure includes two parallel PCB circuit boards each correspondingly connected to the TB4 upstream port, the TB4 downstream port, the HDMI port, the USBA 10 G port and the USBC 10 G port. Each PCB circuit board is provided with the main control circuit, the PD control circuit, the video conversion circuit, the USB3.0 control circuit, the USB2.0 control circuit and the power management circuit. Each main control circuit is provided with the Thunderbolt 4 controller. At least one PCB circuit board is provided with the DC power input port. The computer can be connected through the TB4 upstream port. The TB4 upstream port is connected to the TB4 downstream port through the main control circuit and the PD control circuit. Through the TB4 downstream port, the input and output video signal and data signal converted by the main control circuit and PD control circuit can be transmitted. Through the main control circuit and video conversion circuit connected to the HDMI port, video signals can be transmitted, and data information can be transmitted through the USBA 10 G port. According to the present disclosure, high-speed 40 G data transmission, high-resolution audio and video processing, data exchange, power charging and communication connections for computer peripheral products can be realized. The present disclosure provides the following technical effects.

1. The universal docking station with high-speed data transmission and high resolution of the present disclosure includes two PCBAs and two upstream ports, so the accessory cable is two cables. The two cables can be connected to the host individually or simultaneously.

The PCB A board and the PCB B board share the DC input power supply. Power supplies of the two boards are connected through the positive and negative power lines. They are only shared by DC IN and are independent of each other. Independent upstream ports and downstream ports are provided, so that their respective functions can be carried out independently.

2. The 40 G data transmission is achieved, and the data exchange rate between peripheral devices and computers is up to 40 Gbps.

3. The video transmission can be output at the highest resolution output of 8K, so that the video of the computer host can be output in high definition.

4. The upstream charging with a power of 96 W can charge the host computer while working, so there is no need to worry about insufficient power supply.

5. The multi-interface 10 G USB device expansion can be realized to meet the requirement of more USB devices being connected to the computer at the same time.

6. The 2.5 G wired network connection can be provided, which is fast and stable, breaking through the conventional 100 M/Gigabit network.

7. The requirement of the SD memory card reading and writing requirements of 4.0 can be met.

8. The present disclosure supports headphones, optical audio input and output.

Therefore, each function coordinates with each other and is independent of each other without interfering with each other, so that all functions can be carried out at the same time.

The above is only used to illustrate the technical solution of the present disclosure and not to limit it. Other modifications or equivalent substitutions made by those of ordinary skill in the art to the technical solution of the present disclosure can be made. As long as they do not deviate from the spirit and scope of the technical solutions of the present disclosure, they should be covered by the claims of the present disclosure.

What is claimed is:

1. A universal docking station with high-speed data transmission and high resolution, comprising at least two PCB circuit boards arranged in parallel, wherein each of the at least two PCB circuit boards is correspondingly connected to at least one TB4 upstream port, one or more TB4 downstream ports, at least one HDMI port, one or more USBA 10 G ports, and one or more USBC 10 G ports; each of the at least two PCB circuit boards is correspondingly provided with a main control circuit, a PD control circuit, a video conversion circuit, a USB3.0 control circuit, a USB2.0 control circuit and a power management circuit; each of the at least two PCB circuit boards includes a Thunderbolt 4 controller; and at least one of the at least two PCB circuit boards is provided with a DC power input port; and wherein
  the TB4 upstream port is configured to be connected to a computer;
  the TB4 upstream port is connected to the TB4 downstream port through the main control circuit and the PD control circuit, and the TB4 downstream port is configured to transmit input and output video signals and data signals converted by the main control circuit and the PD control circuit;
  the TB4 upstream port is connected to the HDMI port through the main control circuit and the video conversion circuit, and the HDMI port is configured to transmit input and output video signals converted by the main control circuit and the video conversion circuit;
  the TB4 upstream port is connected to the USBA 10 G port through the main control circuit, the USB3.0 control circuit, and the USB2.0 control circuit, and the USBA 10 G port is configured to transmit data information converted into input and output by the main control circuit, the USB3.0 control circuit, and the USB2.0 control circuit; and
  the USBA 10 G port is further connected to the TB4 upstream port through the main control circuit, the USB3.0 control circuit, and the USB2.0 control circuit, and the USBA 10 G port is further configured to transmit input and output data information converted by the main control circuit, the USB3.0 control circuit, and the USB2.0 control circuit.

2. The universal docking station with high-speed data transmission and high resolution according to claim 1, wherein the power management circuit includes a DC power input module and a system power processing module, and the DC power input module is configured to process and convert a 22V, 8.18 A DC power input from the DC power input port into system operating voltages with different parameters; and
  the system power processing module is configured to process and convert the system operating voltage into operating voltages with different parameters for circuit module processing units.

3. The universal docking station with high-speed data transmission and high resolution according to claim 1, wherein the PD control circuit is provided with a number of PD controllers corresponding to a number of the TB4 downstream ports, and each TB4 upstream port is connected to a corresponding one of the TB4 downstream port through the Thunderbolt 4 controller and the PD controller;
  wherein the video conversion circuit is provided with a video conversion chip, and the TB4 upstream port is connected to the HDMI port through the Thunderbolt 4 controller and a video conversion chip.

4. The universal docking station with high-speed data transmission and high resolution according to claim 1, wherein the universal docking station comprises a first PCB circuit board and a second PCB circuit board arranged in parallel, wherein each of the first PCB circuit board and the second PCB circuit board is correspondingly connected to one TB4 upstream port, two TB4 downstream ports and one HDMI port, the first PCB circuit board is correspondingly connected to three USBA 10 G ports, and the second PCB circuit board is correspondingly connected to two USBA 10 G ports;
  the second PCB circuit board is further correspondingly connected to two USBC 10 G ports, at least one of the two USBC 10 G ports is compatible with a PD charging function, and the second PCB circuit board is further correspondingly connected to an SD/TF port and a network port; and
  the DC power input port is provided on the second PCB circuit board, and each of a first power management circuit of the first PCB circuit board and a second power management circuit of the second PCB circuit board is connected to the DC power input port DCIN.

5. The universal docking station with high-speed data transmission and high resolution according to claim 4, wherein each of the first PCB circuit board and the second PCB circuit board is correspondingly provided with the main control circuit, the video conversion circuit, the PD control circuit, and the USB2.0 control circuit;
  the first PCB circuit board is further correspondingly provided with a first USB3.0 control circuit and the first power management circuit;
  the second PCB circuit board is further correspondingly provided with a second USB3.0 control circuit and the second power management circuit;
  the main control circuit is provided with the Thunderbolt 4 controller U7;
  the TB4 upstream port is connected to s UFP port of the Thunderbolt 4 controller U7, a fourth DP signal port TBT-D of the Thunderbolt 4 controller U7 is connected to the HDMI port through the video conversion chip and a RXTX communication line;
  the PD control circuit includes two PD controllers;
  each of the TB4 upstream port and a PD I2C port of the Thunderbolt 4 controller U7 is connected to the PD controller through a PD I2C protocol bus, and the PD controller is connected to the TB4 downstream port through a CC fast charging cable;
  each of a second DP signal port TBT-B and a third DP signal port TBT-C of the Thunderbolt 4 controller U7 is also directly connected to two of the TB4 downstream ports through the RXTX communication line.

6. The universal docking station with high-speed data transmission and high resolution according to claim 5, wherein the USB2.0 control circuit includes a USB2.0 control chip UB6, and each of the first USB3.0 control circuit and the second USB3.0 control circuit is provided with a first USB3.0HUB chip UH3;
  a U2_P0_D+D-port of the USB2.0 control chip UB6 is connected to a USB2.0 port of the Thunderbolt 4 controller U7, and a first U2 D+D-port of the USB2.0 control chip UB6 is connected to the TB4 upstream port;
  a second U2 D+D-port of the USB2.0 control chip UB6 is connected to the first USB3.0HUB chip UH3;
  a third U2 D+D-port and a fourth U2 D+D-port of the USB2.0 control chip UB6 are connected to two of the TB4 downstream ports;
  a fifth U2 D+D-port of a USB2.0 HUB chip UB6 is connected to a dock management controller;
  the PD controller is also directly connected to the dock management controller; and
  the USB2.0 control chip UB6 is also connected to each PD controller through a DMC I2C protocol bus.

7. The universal docking station with high-speed data transmission and high resolution according to claim 6, wherein each of the first USB3.0HUB chip UH3 of the first USB3.0 control circuit and the second USB3.0 control circuit is directly connected to a port E port of the Thunderbolt 4 controller U7 through the RXTX communication line;

the first USB3.0HUB chip UH3 of the first USB3.0 control circuit is connected to three USBA 10 G ports through three P-type data lines;

the first USB3.0HUB chip UH3 of the second USB3.0 control circuit is connected to the USBC 10 G port compatible with the PD charging function through two P-type data lines, and the first USB3.0HUB chip UH3 of the second PCB circuit board is connected to one of the USBC 10 G ports through a third P-type data line and a differential channel multiplexer; and the first USB3.0HUB chip UH3 of the second USB3.0 control circuit is connected to two USBA 10 G ports via the second USB3.0HUB chip UH1 through two P-type data lines.

8. The universal docking station with high-speed data transmission and high resolution according to claim 7, wherein the second PCB circuit board is further correspondingly connected to a 4.0SD/TF port and a network port 2.5 G LAN;

the 4.0SD/TF port is connected to the second USB3.0HUB chip UH1 via one P-type data line through a card reader; and the network port 2.5 G LAN is connected to the second USB3.0HUB chip UH1 via another P-type data line through a network port chip.

9. The universal docking station with high-speed data transmission and high resolution according to claim 4, wherein the first PCB circuit board is further correspondingly connected to a headset port, a single audio output port, and an optical fiber connection port; and the headset port, the single audio output port, and the optical fiber connection port are correspondingly connected to the first USB3.0HUB chip UH3 through a sound recognition chip.

10. The universal docking station with high-speed data transmission and high resolution according to claim 5, wherein each of the first power management circuit and the second power management circuit includes a twenty-third buck-boost IC converter U23, a thirtieth operational amplifier UB30, a fifteenth operational amplifier UB15, a first synchronous buck converter SU1, a second synchronous buck converter SU2, and a third synchronous buck converter SU3.

* * * * *